US010176324B2

(12) United States Patent
Davidson et al.

(10) Patent No.: US 10,176,324 B2
(45) Date of Patent: Jan. 8, 2019

(54) SYSTEM, METHOD AND COMPUTER PROGRAM PRODUCT FOR PROTECTING SOFTWARE VIA CONTINUOUS ANTI-TAMPERING AND OBFUSCATION TRANSFORMS

(71) Applicant: UNIVERSITY OF VIRGINA PATENT FOUNDATION, Charlottesville, VA (US)

(72) Inventors: Jack W. Davidson, Charlottesville, VA (US); Jason D. Hiser, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 15/215,994

(22) Filed: Jul. 21, 2016

(65) Prior Publication Data

US 2016/0328559 A1 Nov. 10, 2016

Related U.S. Application Data

(63) Continuation of application No. 15/078,675, filed on Mar. 23, 2016, now abandoned, which is a
(Continued)

(51) Int. Cl.
*G06F 11/30* (2006.01)
*G06F 21/56* (2013.01)
(Continued)

(52) U.S. Cl.
CPC ............ *G06F 21/562* (2013.01); *G06F 21/10* (2013.01); *G06F 21/14* (2013.01); *G06F 21/52* (2013.01);
(Continued)

(58) Field of Classification Search
CPC .......... G06F 21/10; G06F 21/14; G06F 21/52; G06F 21/53; G06F 21/57; G06F 21/572;
(Continued)

(56) References Cited

U.S. PATENT DOCUMENTS 6,006,328 A   12/1999  Drake
6,594,761 B1   7/2003  Chow
(Continued)

FOREIGN PATENT DOCUMENTS

EP         1947584         7/2007
WO   PCT/CA99/000633      2/2000
(Continued)

OTHER PUBLICATIONS

ISR and Written Opinion PCT/US08/87712, dated Apr. 8, 2009.
(Continued)

*Primary Examiner* — Gary S Gracia
(74) *Attorney, Agent, or Firm* — Robert J. Decker; Tanner IP, PLLC

(57) ABSTRACT

Method, system and computer program product for applying existing anti-tampering and obfuscation techniques to virtual machine technology and offers several distinct advantages. The anti-tampering and obfuscation transforms can be applied continuously to prevent adversaries from gaining information about the program through emulation or dynamic analysis. In addition, the encryption can be used to prevent hackers from gaining information using static attacks. The use of a virtual machine also allows for low overhead execution of the obfuscated binaries as well as finer adjustment of the amount of overhead that can be tolerated. In addition, more protection can be applied to specific portions of the application that can tolerate slowdown. The in-corporation of a virtual machine also makes it easy to extend the technology to integrate new developments
(Continued)

and resistance mechanisms, leading to less development time, increased savings, and quicker deployment.

20 Claims, 38 Drawing Sheets

Related U.S. Application Data continuation of application No. 12/809,627, filed as application No. PCT/US2008/087712 on Dec. 19, 2008, now abandoned.

(60) Provisional application No. 61/016,009, filed on Dec. 21, 2007.

(51) Int. Cl.
| | |
|---|---|
| *G06F 21/14* | (2013.01) |
| *G06F 21/52* | (2013.01) |
| *G06F 21/53* | (2013.01) |
| *G06F 21/10* | (2013.01) |
| *G06F 21/57* | (2013.01) |
| *G06F 21/60* | (2013.01) |
| *G06F 21/30* | (2013.01) |

(52) U.S. Cl.
CPC .............. *G06F 21/53* (2013.01); *G06F 21/57* (2013.01); *G06F 21/572* (2013.01); *G06F 21/602* (2013.01); *G06F 2221/033* (2013.01); *G06F 2221/0724* (2013.01); *H04L 2209/16* (2013.01)

(58) Field of Classification Search
CPC ....... G06F 2221/033; G06F 2221/0724; G06F 21/562; G06F 21/602; H04L 2209/16
USPC .......................................................... 713/190
See application file for complete search history.

(56) References Cited

U.S. PATENT DOCUMENTS

| | | | |
|---|---|---|---|
| 6,668,325 | B1 | 12/2003 | Collberg et al. |
| 6,779,114 | B1 | 8/2004 | Chow |
| 6,842,862 | B2 | 1/2005 | Chow |
| 6,941,463 | B1 | 9/2005 | Atallah |
| 6,957,341 | B2 | 10/2005 | Rice |
| 7,325,141 | B2 | 1/2008 | Chow |
| 7,350,085 | B2 | 3/2008 | Johnson |
| 7,366,914 | B2 | 4/2008 | Graunke |
| 7,539,875 | B1* | 5/2009 | Manferdelli ............ G06F 21/10 380/277 |
| 8,214,799 | B2* | 7/2012 | Haselden .................. G06F 9/54 717/104 |
| 2002/0019814 | A1 | 2/2002 | Ganesan |
| 2003/0018906 | A1 | 1/2003 | Smith |
| 2003/0163718 | A1 | 8/2003 | Johnson |
| 2003/0221121 | A1 | 11/2003 | Chow |
| 2005/0050355 | A1 | 3/2005 | Graunke |
| 2005/0069131 | A1 | 3/2005 | De Jong |
| 2005/0183072 | A1* | 8/2005 | Horning .................. G06F 21/14 717/140 |
| 2005/0193373 | A1* | 9/2005 | Wannamaker ........ G06F 8/4434 717/118 |
| 2005/0246554 | A1 | 11/2005 | Batson |
| 2006/0031686 | A1 | 2/2006 | Atallah |
| 2006/0048223 | A1 | 3/2006 | Lee |
| 2006/0107070 | A1 | 5/2006 | Rice |
| 2006/0195906 | A1 | 8/2006 | Jin et al. |
| 2006/0253687 | A1* | 11/2006 | Jakubowski ............ G06F 21/14 712/210 |
| 2006/0294369 | A1* | 12/2006 | Matsushima ........... G06F 21/14 713/164 |
| 2007/0179904 | A1* | 8/2007 | Hofstee .................. G06F 21/57 705/67 |
| 2007/0234070 | A1 | 10/2007 | Horning et al. |
| 2009/0055657 | A1* | 2/2009 | Asai ........................ G06F 21/10 713/189 |

FOREIGN PATENT DOCUMENTS

| | | |
|---|---|---|
| WO | PCT/CA02/000754 | 11/2002 |
| WO | PCT/US05/012835 | 11/2005 |
| WO | PCT/US06/026932 | 1/2007 |
| WO | PCT/CA08/000331 | 2/2008 |
| WO | PCT/CA08/000333 | 8/2008 |

OTHER PUBLICATIONS

Extended Search Report EP 08872875.3, dated Nov. 21, 2013.
Collberg C et al: "A Taxonomy of Obfuscating Transformations", Technical Report Department of Computer Science University of Auckland, No. 148, pp. 1-25, Jul. 1, 1997.
Cohen F B: "Operating System Protection Through Program Evolution", Computers & Security, Elsevier Science Publishers, Amsterdam, NL, vol. 12, No. 6, pp. 565-584, Oct. 1, 1993.
Hiser, Jason D: "Protecting Media Players via Software Dynamic Translation" University of Virgina Charlottesville, VA, USA, Dec. 31, 2007.
Scott, Kevin and Davidson, Jack: "Strata: A Software Dynamic Translation Infrastructure" University of Virginia Charlottesville, VA, USA, 2001.
D. J. Albert and S. P. Morse. Combatting software piracy by encryption and key management. Computer, 17(4): 68-73, 1984.
D. Aucsmith. Tamper resistant software: an implentation. In Proceedings of the First International Workshop on Information Hiding, pp. 317-333. Springer-Verlag London, UK, 1996.
O. Billet, H. Gilbert, and C. Ech-Chatbi. Cryptanalysis of a white box AES implementation, 2004.
H. Chang and M. J, Atallah. Protecting software code by guards, Proceedings of the ACM Workshop on Security and Privacy in Digital Rights Management, pp. 160-175, 2000.
S. Chow, P. Eisen, H. Johnson, and P.C. van Oorschot. White-box cryptography and an AES implementation. Proceedings of the Ninth Workshop on Selected Areas in Cryptography (SAC 2002), 2002.
F.B. Cohen. Operating system protection through program evolution. Computers and Security, 12(6):565-584, 1993.
C. Collberg, C. Thomborson, and D. Low. Manufacturing cheap, resilient, and stealthy opaque constructs. In Proceedings of the 25th AGHSIGPLAN-SIGACT Symposium on Principles of Programming Languages, pp. 184-196. ACM Press New York, NY, USA, 1998.
C.S. Collberg and C. Thomborson, Watermarking, tamper-proofing, and obfuscation-tools for software protection. IEEE Transactions on Software Engineering, 28(8):735-746, 2002.
J.T. Giffin, M. Christodorescu, and L. Kruger. Strengthening software self-checksumming via self-modifying code. Proceedings of the 21st Annual Computer 25 Security Applications Conference, pp. 23-32, 2005.
Jason D. Hiser, Daniel Williams, Adrian Filipi, Jack W. Davidson, and Bruce Childers. Evaluating fragment creation policies for SDT systems. In Proceedings of the Second International Conference on Virtual Execution Environments, ATM Press, Ottawa, Canada, Jun. 2006.
B. Home, L.R. Matheson, C. Sheehan, and R,E. Tarjan, Dynamic self-checking techniques for improved tamper resistance. Digital Rights Management Workshop, pp. 141-159, 2001.
Wei Hu, Jason D. Hiser, Daniel Williams, Adrian Filipi, Jack W. Davidson, David Evans, John C. Knight, Anh Nguyen-Tuong, and Jonathan Rowanhill. Secure and practical defense against code-injection attacks using software dynamic translation. In Proceedings of the 2nd international Conference on Virtual Execution 5 Environments, pp. 2-12. ACM Press New York, NY, USA, 2006.
M. Jakobsson and M. Reiter. Discouraging software piracy using software aging. Digital Rights Management Workshop, pp. 1-12, 2001.

(56) References Cited

OTHER PUBLICATIONS

Y. Kanzaki, A. Monden, M. Nakamura, and K. Matsumoto. Exploiting self-modification mechanism for program protection. Proceedings of the 27th Annual International Computer Software and Applications Conference, pp. 170-179, 2003.
Gaurav S. Kc, Angelos D. Keromytis, and Vassilis Prevelakis. Countering code-injection attacks with instruction-set randomization. In Proceedings of the 10th ACM Conference on Computer and Communications Security, pp. 272-280, ACM Press, New York, NY, USA, 2003.
C. Kruegel, W. Robertson, F. Valeur, and G. Vigna. Static disassembly of obfuscated binaries. In Proceedings of the 13th USENIX Security Symposium, USENIX Association, Berkeley, CA, USA, 2004.
B.A. Kuperman, C.E. Brodley, H. Ozdoganogiu, TN Vijaykumar, and A. Jalote. Detection and prevention of stack buffer overflow attacks. Communications of the ACM, 48(11).50-56, 2005.
D. Lie, C. Thekkath, M. Mitchell, P. Lincoln, D. Boneh, J. Mitchell, and M. Horowitz. Architectural support for copy and and tamper resistant software. ACM SIG PLAN Notices, 35(11): 168-177, 2000.
H.E. Link and W.D. Neumann. Clarifying obfuscation: Improving the security of white-box encoding. Sandia National Laboratories, Albuquerque, NM, 2004.
C. Linn and S. Debray. Obfuscation of executable code to improve resistance to static disassembly. Proceedings of the 10th ACM conference on Computer and Communications Security, pp. 290-299, 2003.
C. Linn, S. Debray, and J. Kececioglu. Enhancing software tamper-resistance via stealthy address computations. Proceedings of the 19th Annual Computer Security Applications Conference (ACSAC 2003), 2003.
M. Madou, B. Anckaert, P. Moseley, S. Debray, B. De Sutter, and K. De Bosschere. Software protection through dynamic code mutation. Proceedings of the 6th International Workshop on Information Security Applications, WISA, pp. 194-206, 2005.
T. Maude and D. Maude. Hardware protection against software piracy. Communications of the ACM, 27(9):950-959, 1984.
G. Naurnovich and N. Mernon. Preventing piracy, reverse engineering, and tampering. Computer, 36(7):64-71, 2003.
A. Seshadri, M. Luk, E. Shi, A. Perrig, L. van Doorn, and P. Khosla. Pioneer: verifying code integrity and enforcing untampered code execution on legacy systems. Proceedings of the 20th ACM Symposium on Operating Systems Principles, pp. 1-16, 2005.
G.E. Suh, D. Clarke, B. Gassend, M. van Dijk, and S. Devadas. AEGIS: architecture for tamper-evident and tamper-resistant processing. Proceedings of the 17th Annual International Conference on Supercomputing, pp. 160-171, 2003.
Joan Daemen and Vincent Rijmen, "The Design of Rijndael: AES—The Advanced Encryption Standard." Springer-Verlag, 2002.
SK Udupa, SK Debray, and Matias Madou. Deobfuscation: Reverse engineering obfuscated code. Reverse Engineering, 12th Working Conference on, pp. 45-54, 2005.
P.C. van Oorschot, A. Somayaji, and G.Wurster. Hardware-assisted circumvention of self-hashing software tamper resistance. IEEE Transactions on Dependable and Secure Computing, 2(2):82-92, 2005.
C. Wang, J. Hill, J. Knight, and J. Davidson. Software tamper resistance: Obstructing static analysis of programs, University of Virginia, Charlottesville, VA, 2000.
G. Wurster, P.C. van Oorschot, and A. Somayaji. A generic attack on checksumming-based software tamper resistance. Proceedings of the 2005 IEEE Symposium on Security and Privacy, pp. 127-138, 2005.

\* cited by examiner

SYSTEM, METHOD AND COMPUTER PROGRAM PRODUCT FOR PROTECTING SOFTWARE VIA CONTINUOUS ANTI-TAMPERING AND OBFUSCATION TRANSFORMS

RELATED APPLICATIONS

The present invention claims priority from U.S. Provisional Application Ser. No. 61/016,009, filed Dec. 21, 2007, entitled "System and Related Method for Protecting Software Via Continuous Anti-Tampering and Obfuscation Transforms," U.S. application Ser. No. 12/809,627 filed on Oct. 15, 2010, which is a National Stage Entry of PCT/US08/87712 filed on Dec. 19, 2008; and U.S. application Ser. No. 15/078,675 filed on Mar. 23, 2016, the disclosures of which are hereby incorporated by reference herein in their entireties

GOVERNMENT SUPPORT

Work described herein was supported by Federal Grant No. CNS-0716446, awarded by the NSF. The Government has certain rights in the invention.

BACKGROUND OF THE INVENTION

Software programmers want the ability to make their computer software protected from undesired change. Such changes can be manual, such as a malicious user bypassing a licensing check in commercial software, or automatic, such as a virus modifying a binary to include a copy of the virus. To verify that it has not been modified, software attempts to monitor its own code, with execution changing when a modification to the code is detected (anti-tampering). To thwart a malicious user from locating and disabling self-checking code, code is made difficult to understand, and self-checking codes are hidden within the rest of the application code (obfuscation). Unfortunately, malicious attackers continue to thwart such checks using a variety of information gathered from the dynamic execution of the program. The issue of protecting software from unauthorized tampering is a critical problem in modem software deployment. Billions of dollars are lost in revenue each year due to the efforts of malicious hackers and software pirates. For example, malicious users may modify software to bypass a licensing check in commercial software or alter programs to include a copy of a computer virus. Anti-tampering methods are also of great importance in the growing area of digital rights management, where tampering results in the loss of significant royalties and license fees.

One popular method of protecting a program from modification is code obfuscation. Code obfuscation involves modifying computer code so that it is more difficult to understand. This then makes it more difficult for malicious hackers to figure out what parts of a program to modify. While a powerful tool in the fight to make software more secure, existing obfuscation techniques unfortunately possess several drawbacks. Much of the work in this area only involves making it more difficult to perform "static analysis" of programs. In other words, many techniques only deter knowledge of source code or object code but not knowledge of executing code ("dynamic analysis"), which can often be gained by piecing together the information from several different, runs of the program. Many obfuscation strategies also involve extremely high overhead, which may be unacceptable for many people and prevent adoption of the security measure. Other obfuscation strategies require the use of special hardware or fail to present complete and implementable solutions.

Previous work has, but not limited thereto, a variety of major drawbacks as discussed below.

Much work strives only to make the program hard to statically analyze [See 21, 33]. For example, an opaque predicate may be hard to analyze statically, but several runs of the program in a simulator can determine which branches are highly biased. That information can be fed into a static disassembler to identity the start of basic blocks. Also, that same run of the simulator can help reveal (the dynamically executed portions of) the control flow graph. Combining information from several runs of the program can yield a highly accurate representation of the instructions in a program, the opaque predicates, and the control flow graph.

Other work requires special hardware [See 28, 30, 24]. For example, a hardware device that stores a decryption key or a processor that only executes encrypted instructions can be used to guarantee that only programs that were generated with a proper encryption key can run. Unfortunately, specialized hardware may be expensive and not generally or widely available. Furthermore, users may reject hardware that is incapable of running a wide variety of programs.

Some previously proposed techniques have extremely high overhead [See 2]. In fact, some previous work provides such an unreasonable execution overhead that an overhead measurement is not even suggested. Realistic, usable solutions must provide minimal overhead or people will be unwilling to adopt the security measures.

Yet other work provides a threat model that does not meet the tamper-resistance needs of modem hardware, or provides only a partial or impractical solution [See 16, 18, 27]. Some previous techniques even assume that an optimal algorithm for performing a checksum calculation can be computed, that the optimal algorithm runs on a known hardware configuration (and even a pre-calculated clock rate) and that the result can transmitted over an unmonitored network within bounded time!

Thus, there is a continuing need for better ways to secure software, systems and content by providing a mechanism tor the protection of software from tampering and reverse engineering.

SUMMARY OF THE INVENTION

An aspect of various embodiments of the present invention provides, among other things, a mechanism for protection of software from tampering and reverse engineering. Efficient software dynamic translation is used to continually provide dynamic tamper-resistance and obfuscation. To prevent modifications to the pre-translated software version, encryption is used. Self-checking codes are hidden within tire encrypted code, which help protect both the original program code and the software dynamic translator's program code. The dynamic translator caches blocks of code from the original application in a code cache. To protect these cached blocks, the translator dynamically applies anti-tampering and obfuscation techniques. The cache is flushed periodically and randomized anti-tampering and obfuscation techniques are re-applied to protect dynamic information from being leaked by the execution of the program.

An aspect of an embodiment of the present invention utilizes recent trends that enable high-speed translation of program code, and the ever increasing computing power that is available in modern computer systems. An approach uses a portion of the CPU time to dynamically perform anti-tampering and obfuscating transformations.

An aspect of various embodiments of the present invention is that it may be utilized for a number of products, applications, implementations, and services. For instance, any vendor that produces software may be interested in using or implementing this technology (i.e., method, system, and/or computer program product). Examples may include, but not limited thereto, the following: Microsoft, including their Windows and Office lines of software; Adobe, including their Acrobat products, etc.; Sun Microsystems, including Solaris products, etc.; and Cloakware products and virtual machine.

An aspect of various embodiments of the present invention is applicable to "vaccinating" a computer system against viruses. Consequently major virus/worm/spyware/adware detection companies may be interested, including Symantec or the like.

Furthermore, malicious software detection programs have a direct need to avoid modification/disablement by a virus.

Digital rights management is an important aspect of the proposed technology as well. By protecting a media player, various embodiments of the present invention can be used to manage a key hidden within the media player, thus protecting the media itself.

Medical applications may be a particularly useful application area for various embodiments of the present invention. Especially, for example, as semi-robotic machines take over surgical tasks, it is important to know that a system is unmodified. Similarly, space exploration could benefit by detecting failure/modification of a sub-system with such a mechanism.

Military applications may benefit from the technology of the various embodiments of the present invention. Broadly applying such systems may thwart an "insider attack" on a system as the insider may not be able to tamper with the software.

Virtual machine technology applied to anti-tampering and obfuscation technology provide a stronger mechanism for anti-tampering and obfuscation than any previous technology. Accordingly, an aspect of various embodiments of the present invention may provide a number of advantages, such as but not limited thereto, the following:

Continuous application of anti-tampering and obfuscation transforms prevent an adversary from gaining information by using emulation.

Encryption prevents the adversary from gaining information about the application using static attacks.

Software dynamic translation technology allows for low overhead execution of obfuscated binaries.

Checksumming codes hidden within the encrypted portion ensure that the virtual, machine itself is not modified.

Allows software producer to tune the amount of protection based on the amount of overhead which can be tolerated.

More protection can be applied only to portions of the application that can tolerate slowdown.

Protection is complementary to other forms of protection. For example, if new mechanisms for hiding keys in applications are discovered, the virtual machine technology can provide continuous obfuscation and tamper resistance for the new mechanism.

Aspects of various embodiments of the present invention may provide, but not limited thereto, the following:

ability to prevent users from making small, meaningful changes to computer programs, such as overriding copy protection and timeouts in demonstration software and other software types.

protect computer software against reverse engineering which might be used to identify valuable intellectual property contained within a software algorithm or model. In hardware design, for example, vendors of application specific integrated circuit (ASIC) cell libraries often provide precise software models corresponding to the hardware, so that users can perform accurate system simulations. Because such a disclosure usually provides sufficient detail to reveal the actual cell design, it is desirable aspect of the present invention to protect the content of the software model.

hide secret keys in software programs and transmissions, so that software programs can sign, encrypt and decrypt transactions and other software modules. At the same time, these secret keys stays protected against being leaked.

An aspect of an embodiment of the present invention provides as method, system or computer Program product for applying existing anti-tampering and obfuscation techniques to virtual machine technology and offers several distinct advantages. The anti-tampering and obfuscation transforms can be applied continuously to prevent adversaries from gaining information about the program through emulation or dynamic analysis. In addition, the encryption of an embodiment of the present invention can be used to prevent hackers from gaining information using static attacks. The use of a virtual machine also allows for low overhead execution of the obfuscated binaries as well as finer adjustment of the amount of overhead that can be tolerated. In addition, more protection can be applied to specific portions of the application that can tolerate slowdown. The incorporation of a virtual machine also makes it easy to extend the technology to integrate new developments and resistance mechanisms, leading to less development time, increased savings, and quicker deployment.

An aspect of an embodiment or partial embodiment of the present invention (or combinations of various embodiments in whole or in part of the present invention) may comprise a computer method of increasing the tamper-resistance and/or obscurity of computer software code. The method may comprise preparing the computer software code for execution in a designated execution environment for making it difficult to execute the computer software code independently from the designated execution environment. The method may further comprise preparing the execution environment so that it impedes execution of computer software code in the execution environment except for a designated computer software code. The method may further include applying execution transformations during execution of a computer software code to improve tamper resistance and/or obscurity.

An aspect of an embodiment or partial embodiment of the present invention (or combinations of various embodiments in whole or in part of the present invention) may comprise a computer method for preparing the execution environment so that it impedes execution of computer software code in the execution environment except for a designated computer software code. The method further include applying execution transformations during execution of a computer software code to improve tamper resistance and/or obscurity.

An aspect of an embodiment or partial embodiment of the present invention (or combinations of various embodiments in whole or in part of the present invention) may comprise a computer method for increasing the tamper-resistance and/or obscurity of computer software code. The method may comprise applying execution transformations during execution of a computer software code to improve tamper resistance and/or obscurity. The method may further include preparing the computer software code for execution in a designated execution environment for making it difficult to execute the computer soft ware code independently from the designated execution environment.

An aspect of an embodiment or partial embodiment of tire present invention (or combinations of various embodiments in whole or in part of the present invention) may comprise a computer system of increasing the tamper-resistance and/or obscurity of computer software code. The system may comprise preparation means (or module, device, driver, engine, system, or hardware) for preparing the computer software code for execution in a designated execution environment for making it difficult to execute the computer software code independently from the designated execution environment. The system may further comprise a preparation means (module, device, system, or hardware) for preparing the execution environment so that it impedes execution of computer software code in the execution environment except for a designated computer software code. The system may further include an application means (or module, device, driver, engine, system, or hardware) for applying execution transformations during execution of a computer software code to improve tamper resistance and/or obscurity.

An aspect of an embodiment or partial embodiment of the present invention (or combinations of various embodiments in whole or in part of the present invention) may comprise a computer system of increasing the tamper-resistance and/or obscurity of computer software code. The system may comprise an execution transformer (or module, device, driver, engine, system, means, or hardware) for applying execution transformations during execution of a computer software code to improve tamper resistance and/or obscurity. The system may further comprise a preparation, means (or module, device, driver, engine, system, or hardware) for preparing the computer software code for execution in a designated execution environment for making it difficult to execute the computer software code independently from the designated execution environment.

An aspect of an embodiment or partial embodiment of the present invention (or combinations of various embodiments in whole or in part of the present invention) may comprise a computer program product comprising a computer useable medium having computer program logic tor enabling at least one processor in a computer system to increase the tamper-resistance and/or obscurity of computer software code. The computer logic comprising: preparing the computer software code for execution in a designated execution environment for making it difficult to execute the computer software code independently from the designated execution environment. The computer program product may further comprise preparing the execution environment so that it impedes execution of computer software code in the execution environment except for a designated computer software code. Further, the computer program product may include applying execution transformations during execution of a computer software code to improve tamper resistance and/or obscurity.

An aspect of an embodiment or partial embodiment of the present invention (or combinations of various embodiments in whole or in part of the present invention) may comprise a computer program product comprising a computer useable medium having computer program logic for enabling at least one processor in a computer system to operate. The computer logic may comprise preparing the execution environment so that it impedes execution of computer software code in the execution environment except for a designated computer software code. The computer program product may further include applying execution transformations during execution of a computer software code to improve tamper resistance and/or obscurity.

An aspect of an embodiment or partial embodiment of the present invention (or combinations of various embodiments in whole or in part of the present invention) may comprise a computer program product comprising a computer useable medium having computer program logic (or ambling at least one processor in a computer system to increase the tamper-resistance and/or obscurity of computer software code. The computer logic may comprise applying execution transformations during execution of a computer software code to improve tamper resistance and/or obscurity. The computer program product may further include preparing the computer software code for execution in a designated execution environment for making it difficult to execute the computer software code independently from the designated execution environment.

These and other objects, along with advantages and features of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, and serve to explain the principles of the invention. The drawings are provided only for the purpose of illustrating select embodiments of the invention and are not to be construed as limiting the invention.

FIG. 33 provides a schematic block diagram of the Strata architecture with anti-tampering and obfuscation modules, used to perform dynamic anti-tampering and obfuscation. FIG. 34 provides a graphical representation of the amount of application code (as a percent of total application code) that materializes into the code cache as a function of time. Higher flushing intervals achieve lower code visibility. FIG. 35 provides a graphical representation of the runtime overhead of Strata with code cache flushing. More frequently flushing causes higher overhead.

DETAILED DESCRIPTION OF THE INVENTION

Prepare Computer Software Code

Figure 2:
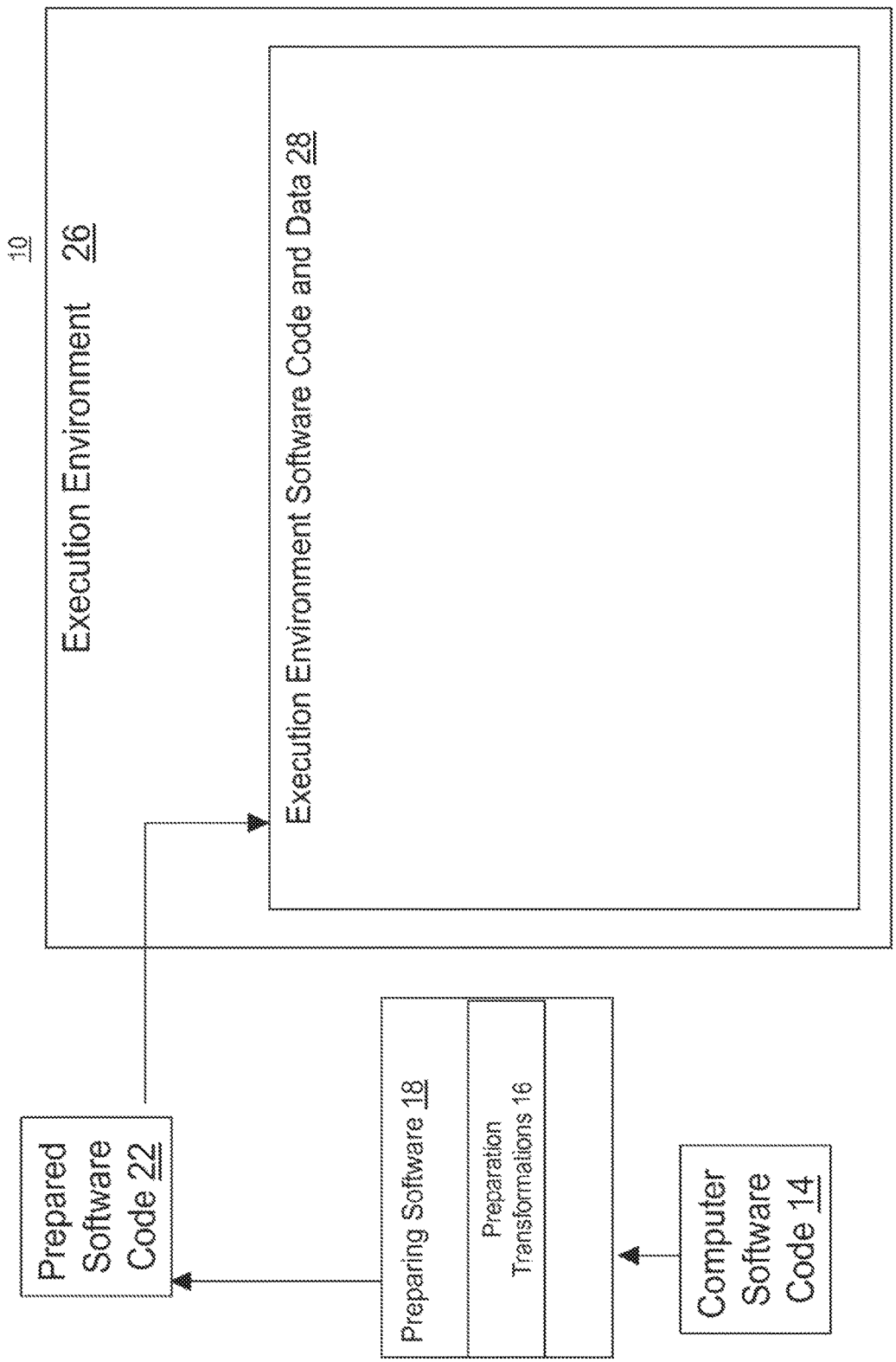

Referring to FIG. 2, there is provided a schematic block diagram of the computer method or system 10 (or related method or computer program product) for increasing the tamper-resistance and/or obscurity of computer software code 14. The method or related system may comprise preparing 18 the computer software code 14 for execution in a designated execution environment 26 tor making it difficult to execute the computer software code 14 independently from the designated execution environment 26.

In contrast, a previous approach may have allowed the execution of a computer software code within a generic (i.e., undesignated) execution environment. Additionally, a previous approach may have defined a wide range of static obscurity and/or static tamper resistance transformations (i.e., prior to run time or execution time). Whereas, an aspect of an embodiment of the present invention provides a method (or system or computer program product) for only allowing execution of a computer software code within a specified (i.e., designated) execution environment. That is, the computer software code is inextricably bound to the designated execution environment. As an example, codes to verify integrity of the specified execution environment can be inserted in the computer software code, thereby increasing the obscurity of the computer software code and the binding the computer software code to the designated execution environment. For instance, an example of an application may involve, but not limited there to, a cell phone, whereby the cell phone may have a Java VM as the execution environment. See, for example, Tim Lindholm and Frank Yellin. *The Java Virtual Machine specification*, second edition. Addison-Wesley, 1999, of which is hereby incorporated by reference herein in its entirety. And one may consider a Java game as a computer software code. An embodiment of the present invention provides a method (or system or computer program product) that allows the insertion of checks into the Java game to verily the Java VM's integrity. Note that this cell phone VM may be different than other Java VM, even on the same model phone by the same manufacturer and/or may be ultimately unique to the user.

The preparation may comprise applying one or more computer software preparation transformations 16 to the computer software code 14. Further, the computer software preparation transformation 16 may comprise encrypting the computer software code. It should be appreciated that the encryption may be any wide variety of available encryption techniques. The encryption, for example, may use a plurality of hidden keys. Moreover, the keys may be hidden within the execution environment 26 and/or prepared software code 22. Similarly, the computer software preparation transformation 16 may comprise adding additional codes and/or data to the computer software to verify the integrity of the execution environment 26. Still yet, the computer software preparation transformation 16 may comprise providing additional codes and/or data to the computer software to verify the integrity of the prepared software code. Still further yet, the computer software preparation transformation 16 may comprise altering the computer software code such that proper execution (of the prepared software code, for example, but not limited thereto) is difficult without undoing the alterations. The altering may include at least one of the following; altering constant operands, program control flow, program data layout, data initialization information, instruction encoding, or file format, or any combination thereof.

Prepare the Execution Environment

Figure 15:
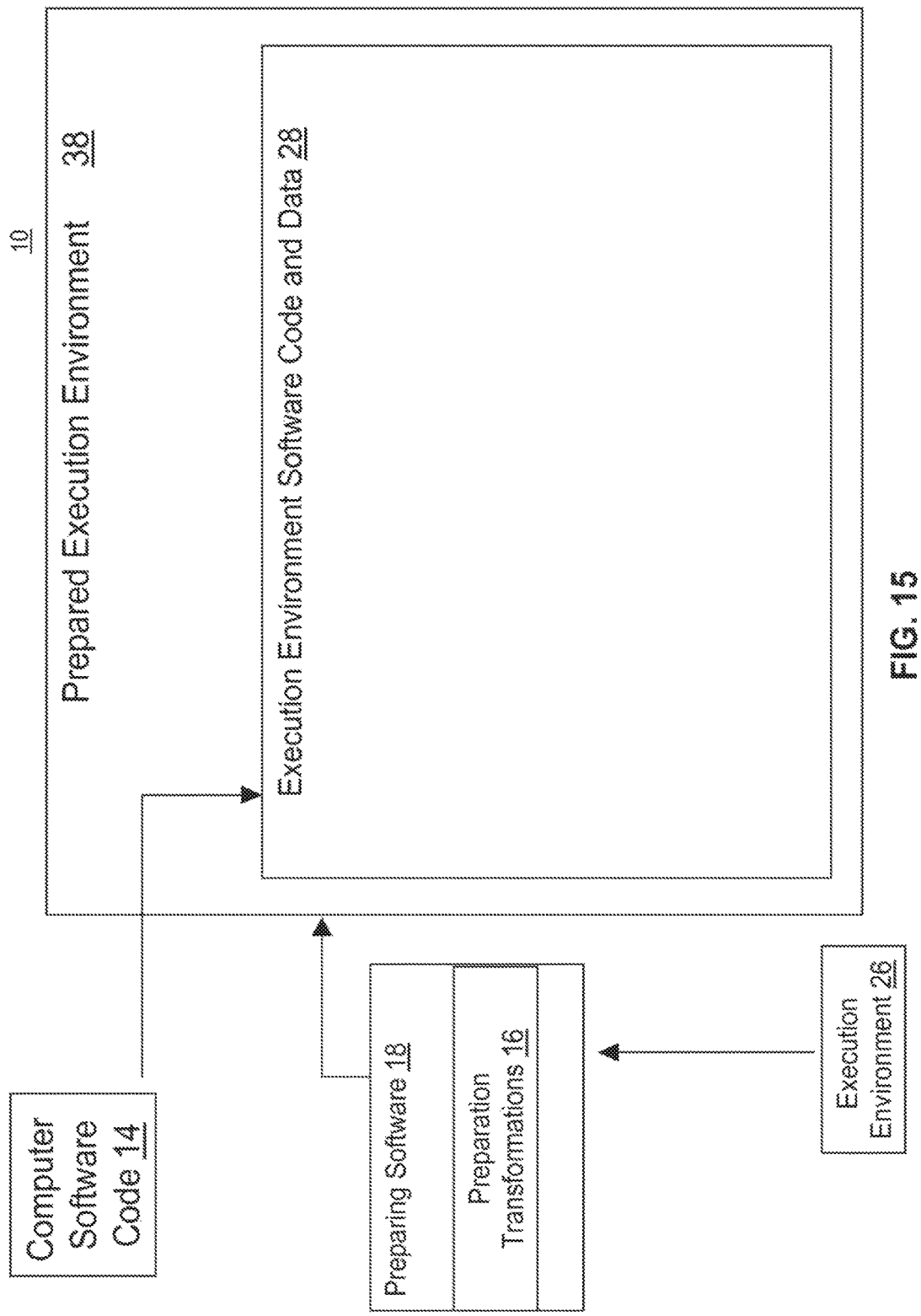

Referring to FIG. 15, there is provided a schematic block diagram of the computer method or system 10 that may comprise preparing the execution environment 26 such that it impedes the execution of computer software code 14 in the execution environment except for a designated computer software code.

In contrast, a previous approach may have allowed the execution of a computer software code within a generic (i.e., undesignated) execution environment. Additionally, a previous approach may have defined a wide range of static obscurity and/or static tamper resistance transformations (i.e., prior to run time or execution time) that could be applied to an execution environment. Whereas, an embodiment of the present invention provides a method (or system or computer program product) for only allowing execution of a designated computer software codes within an execution environment. That is, the execution environment is inextricably bound to the designated computer software code. As an example, codes to verify integrity of the specified designated computer software codes can be inserted into the execution environment, thereby increasing the obscurity of the execution environment and the binding the designated computer software codes to the execution environment. For instance, an example of an application may involve, but not limited there to, a cell phone manufacturer that may wish to have a Java VM that only executes the manufacturer's Java programs. The manufacture could insert integrity checks into the Java VM to verify that only the manufacturer's program can be run.

The preparation may comprise: applying one or more preparation transformations 34 to the execution environment 26 computer software code 14. The preparation transformation 16 may comprise encrypting some or all of the execution environment 26. The encryption may use a plurality of hidden keys. Further, the keys may be hidden within the execution environment. 26 and/or prepared software code 18. Moreover, the preparation transformation 16 may comprise adding additional codes and/or data to the computer software to verify the integrity of the computer software code 14. Still yet, the preparation transformation 34 may comprise providing additional codes and/or data to the computer software to verify the integrity of the prepared execution environment 38.

Figure 16:
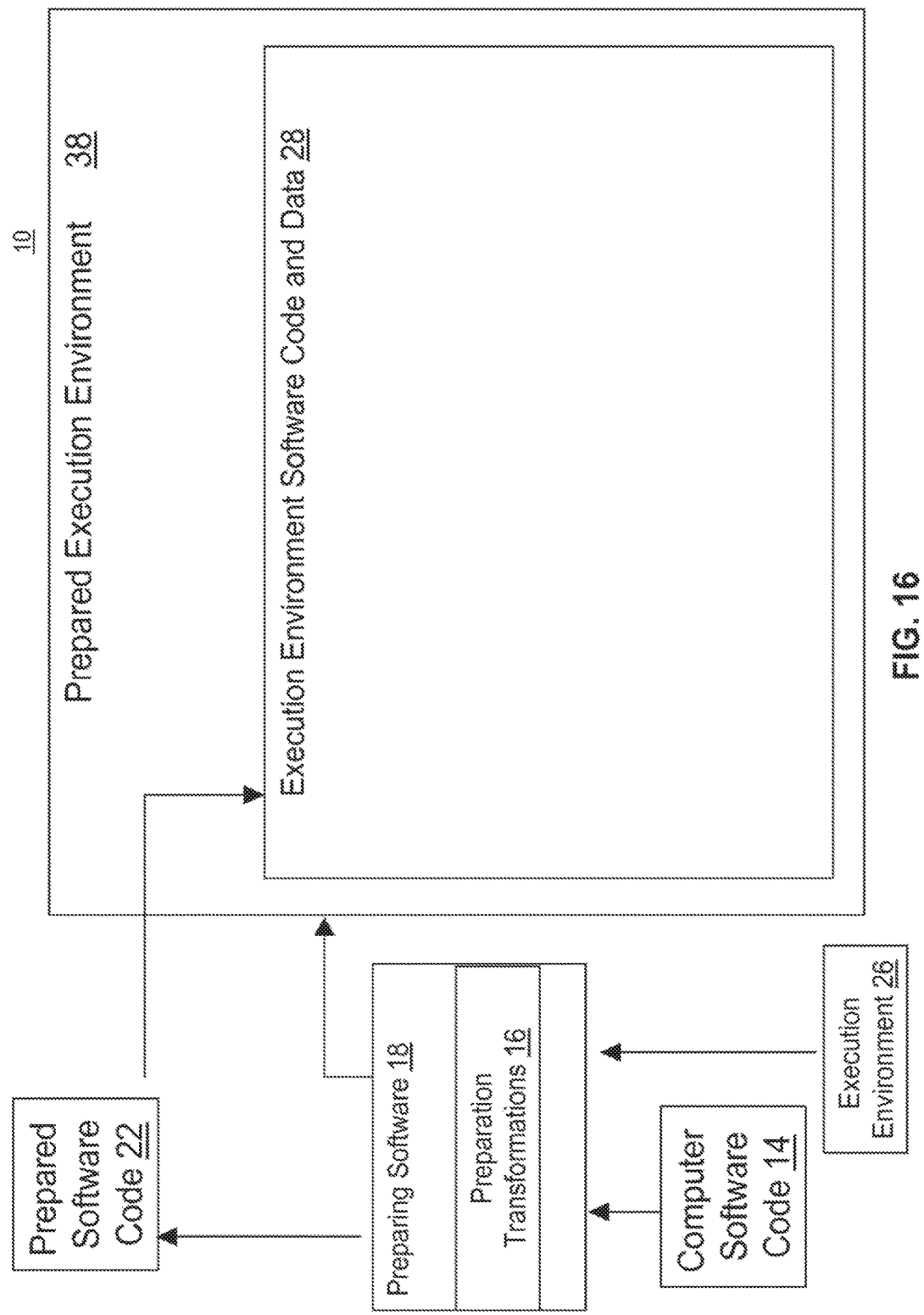
Figure 17:
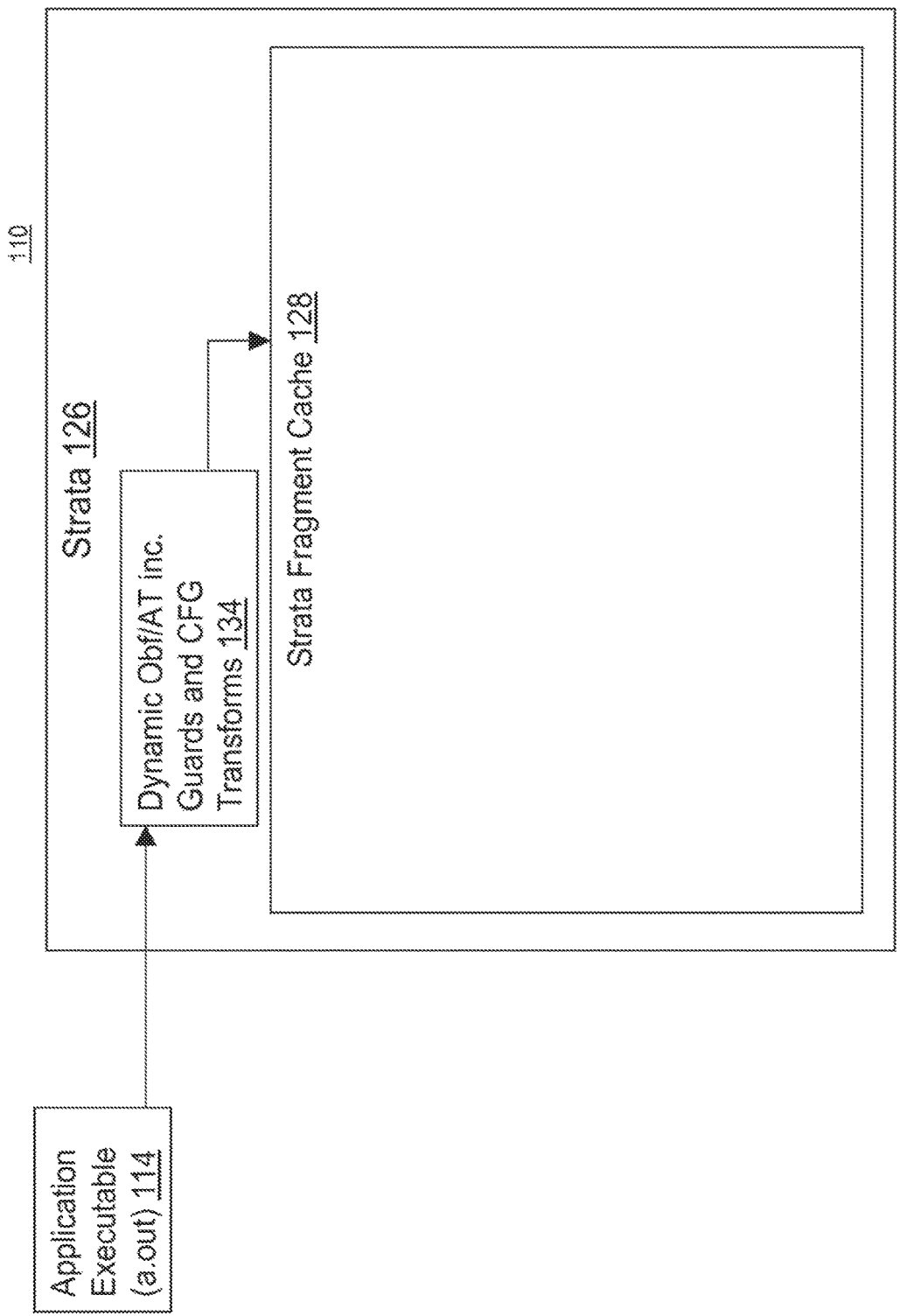
FIGS. 17-32 pertains to specific exemplary (and non-limiting) embodiments as they may pertain to the approach illustrating the present invention computer method or system embodiments of FIG. 1-16, respectively.
Figure 18:
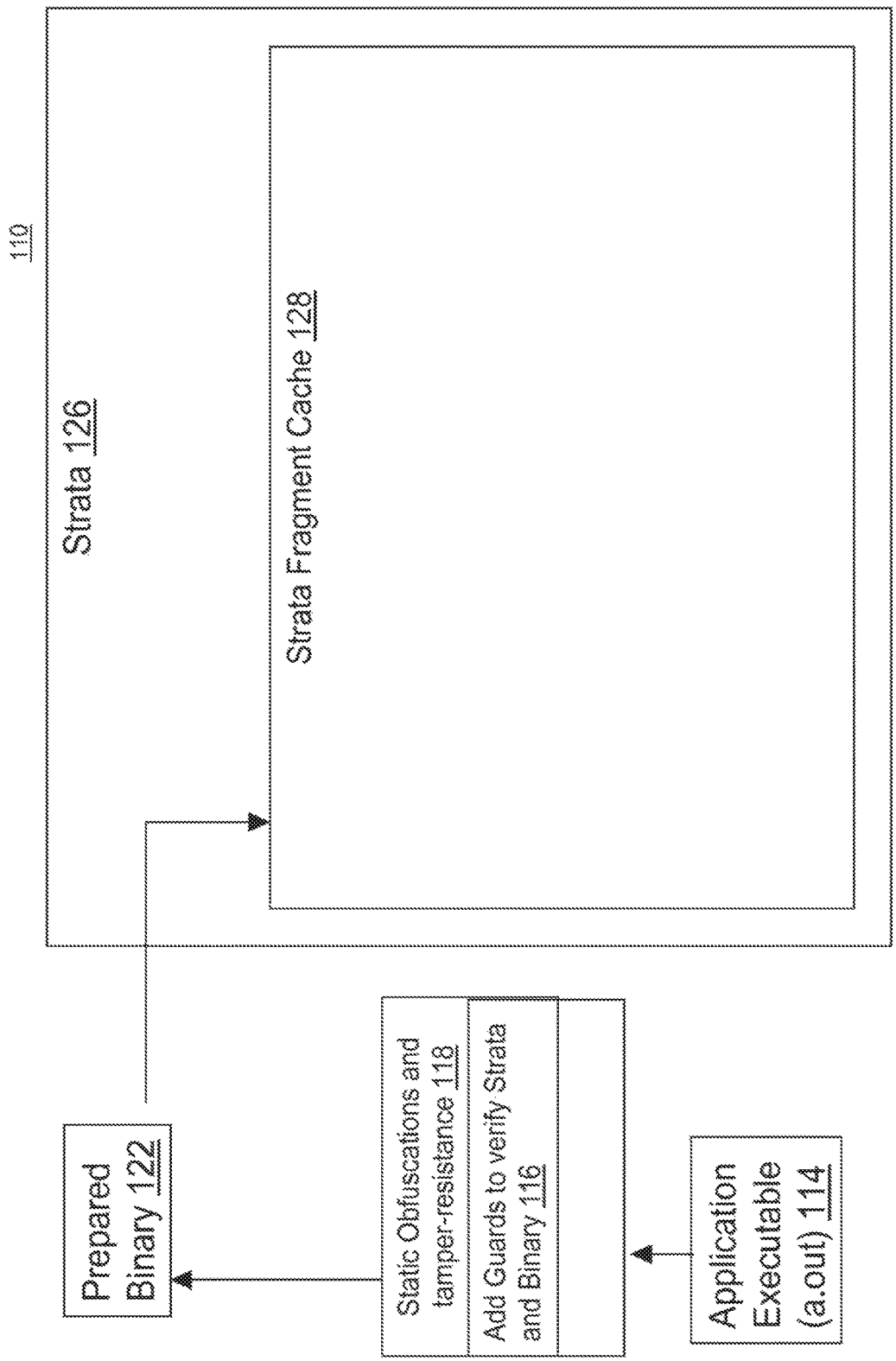
Figure 19:
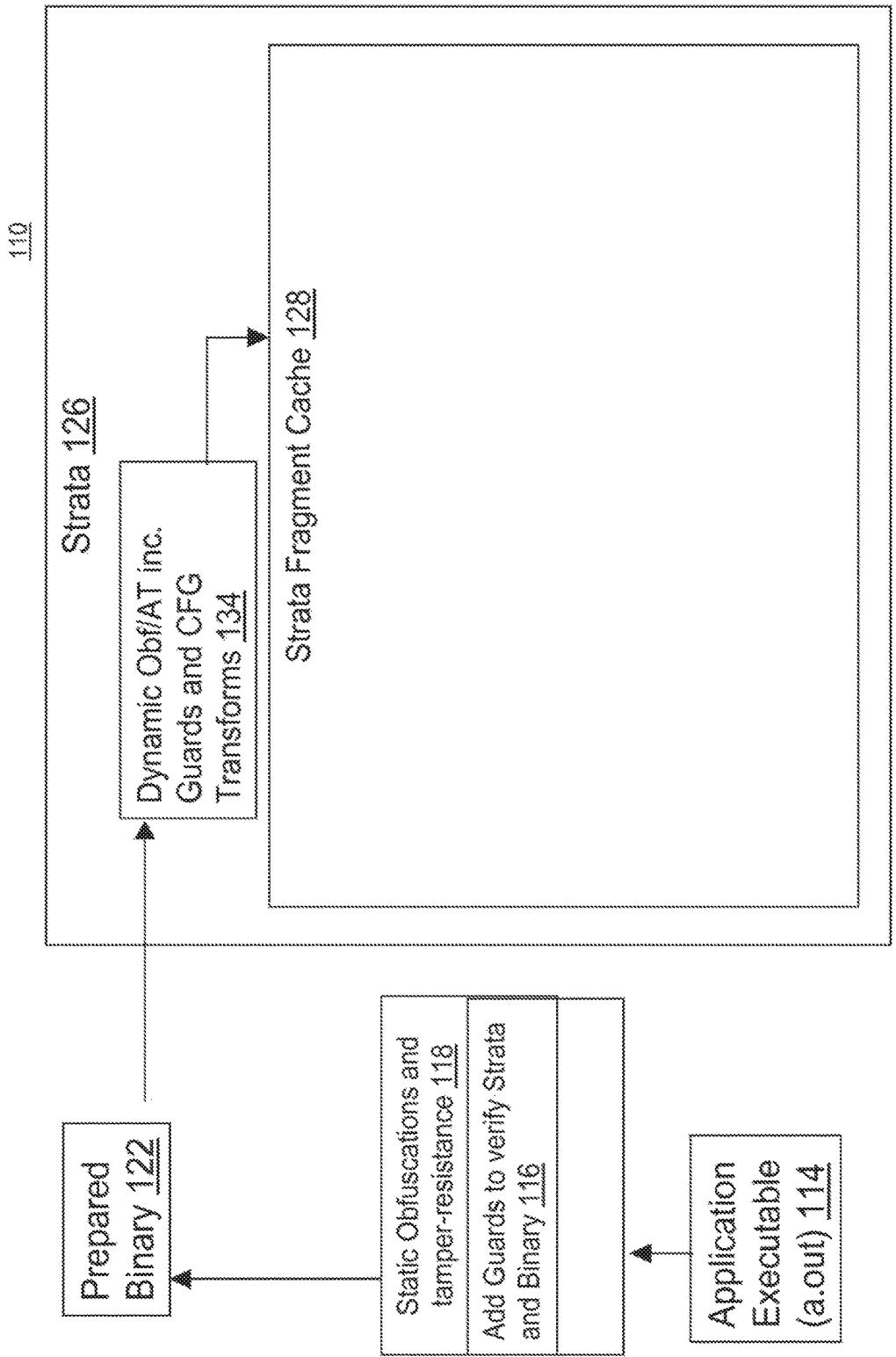
Figure 20:
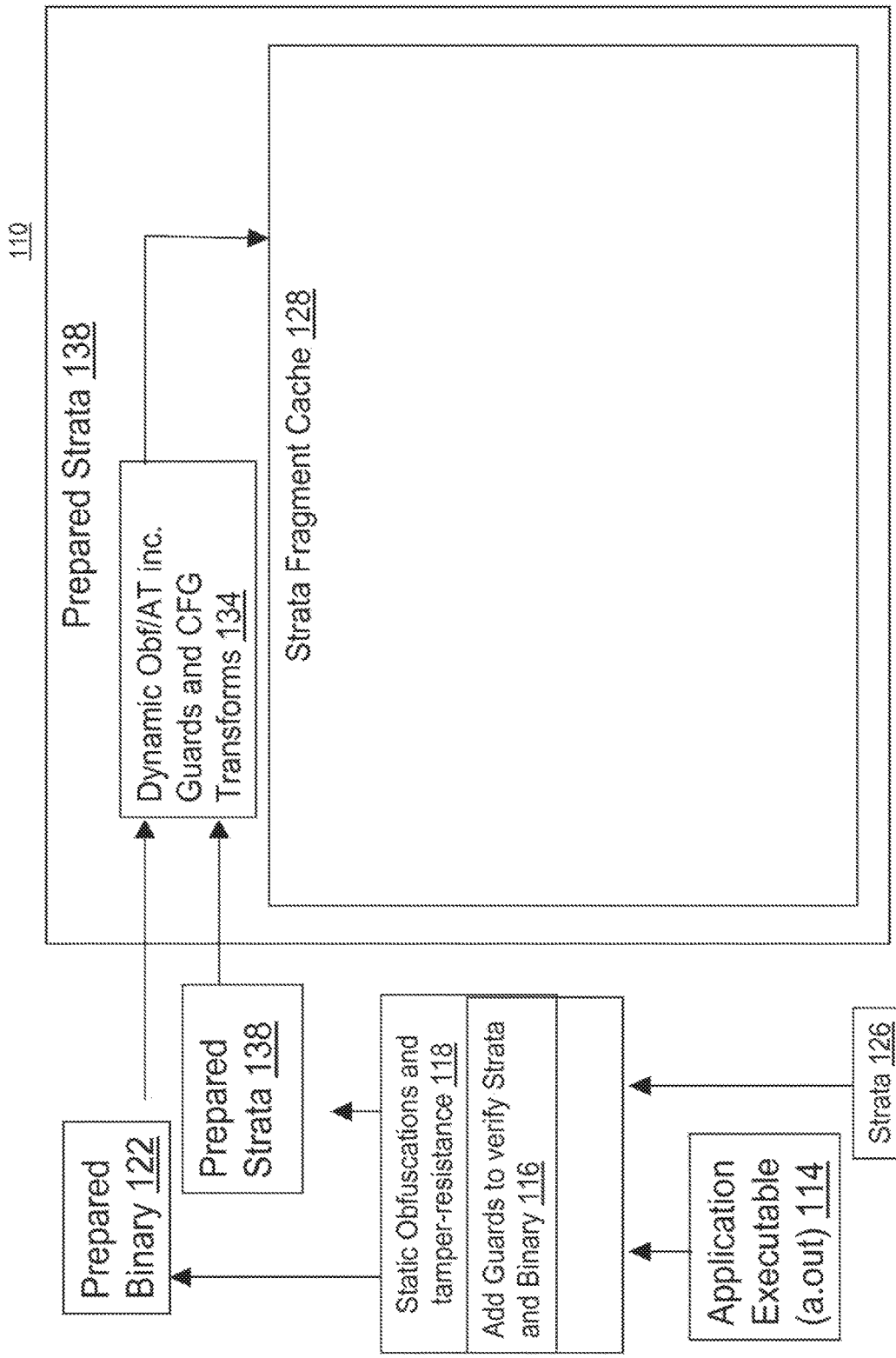
Figure 21:
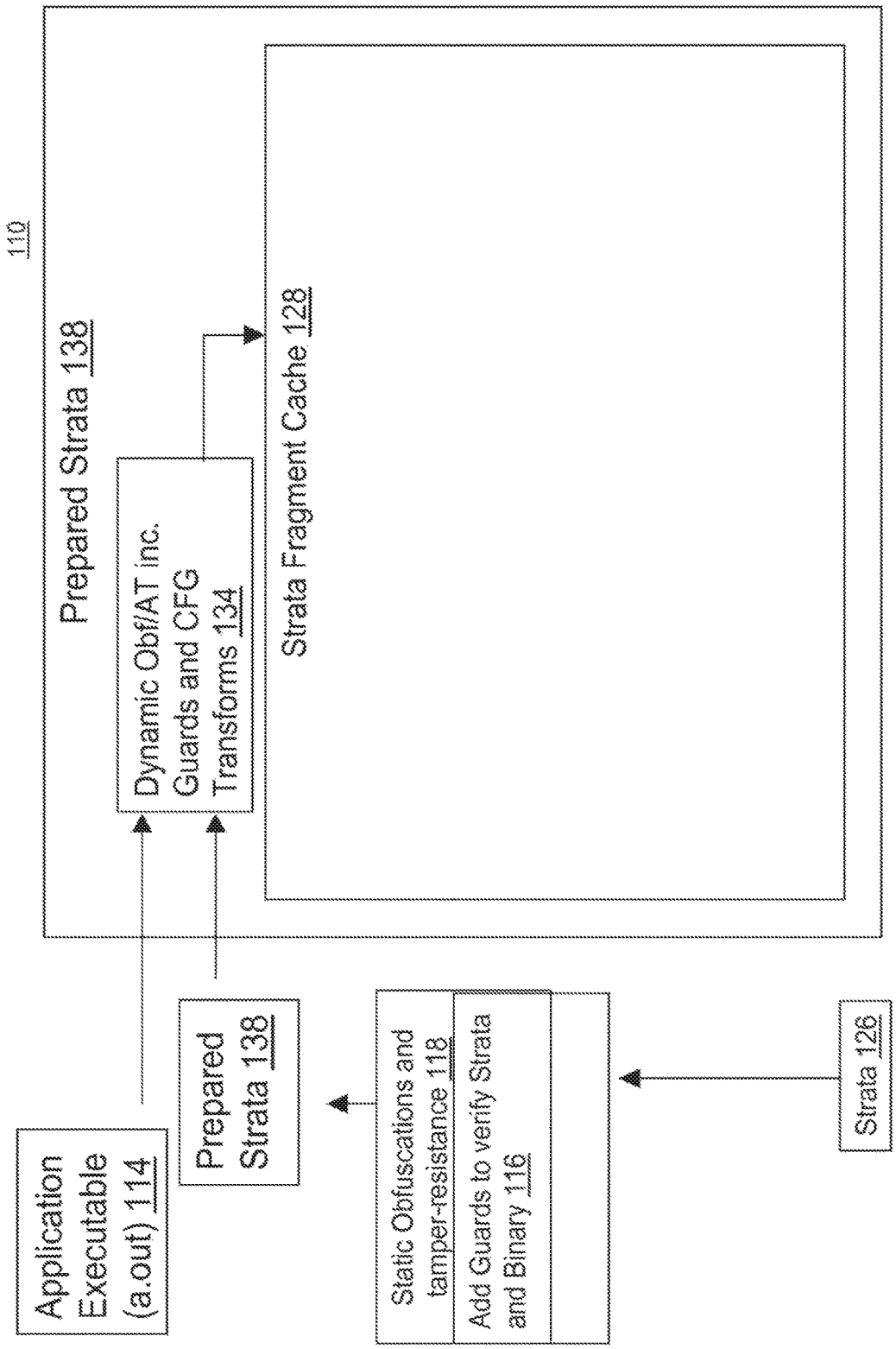
Figure 22:
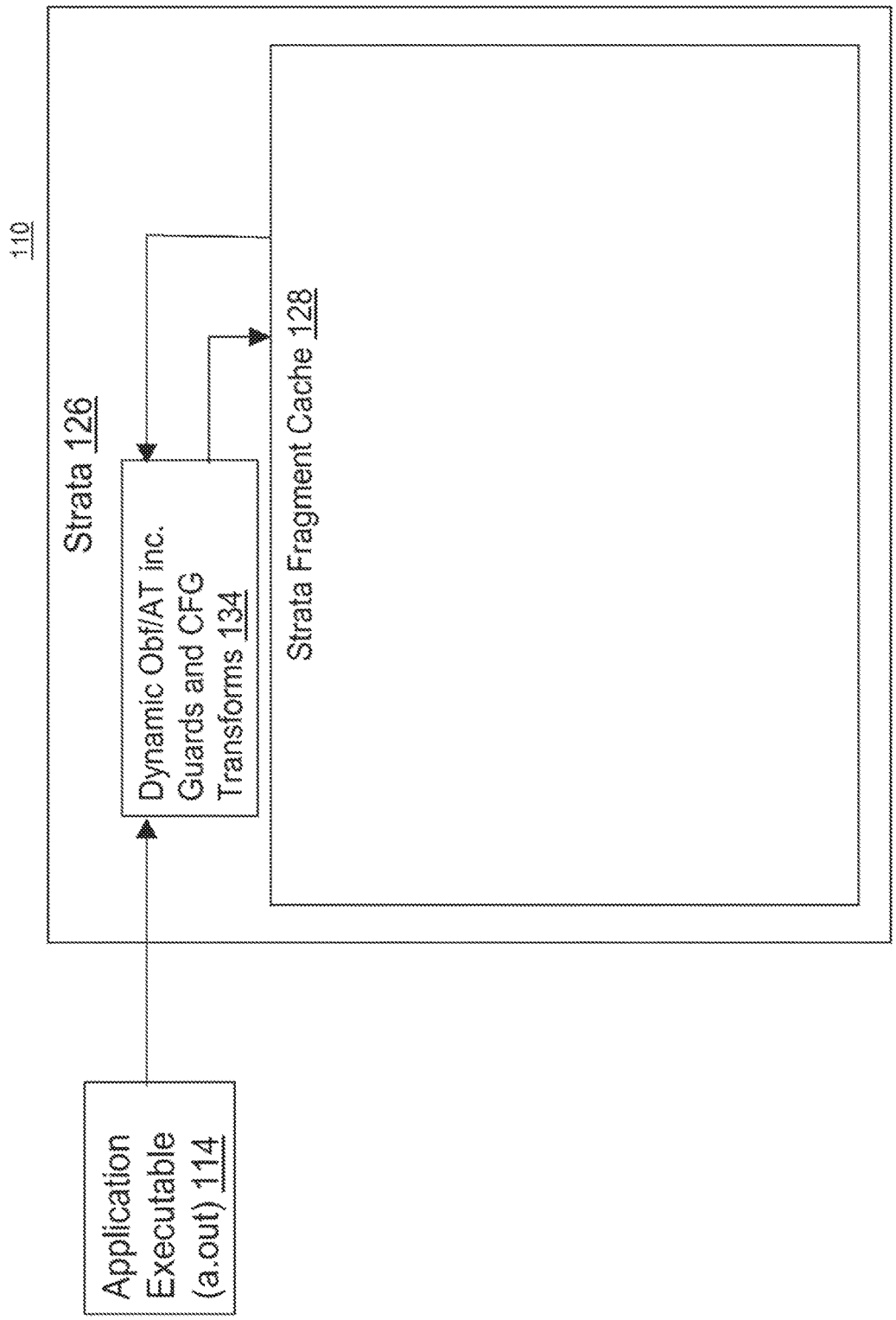
Figure 23:
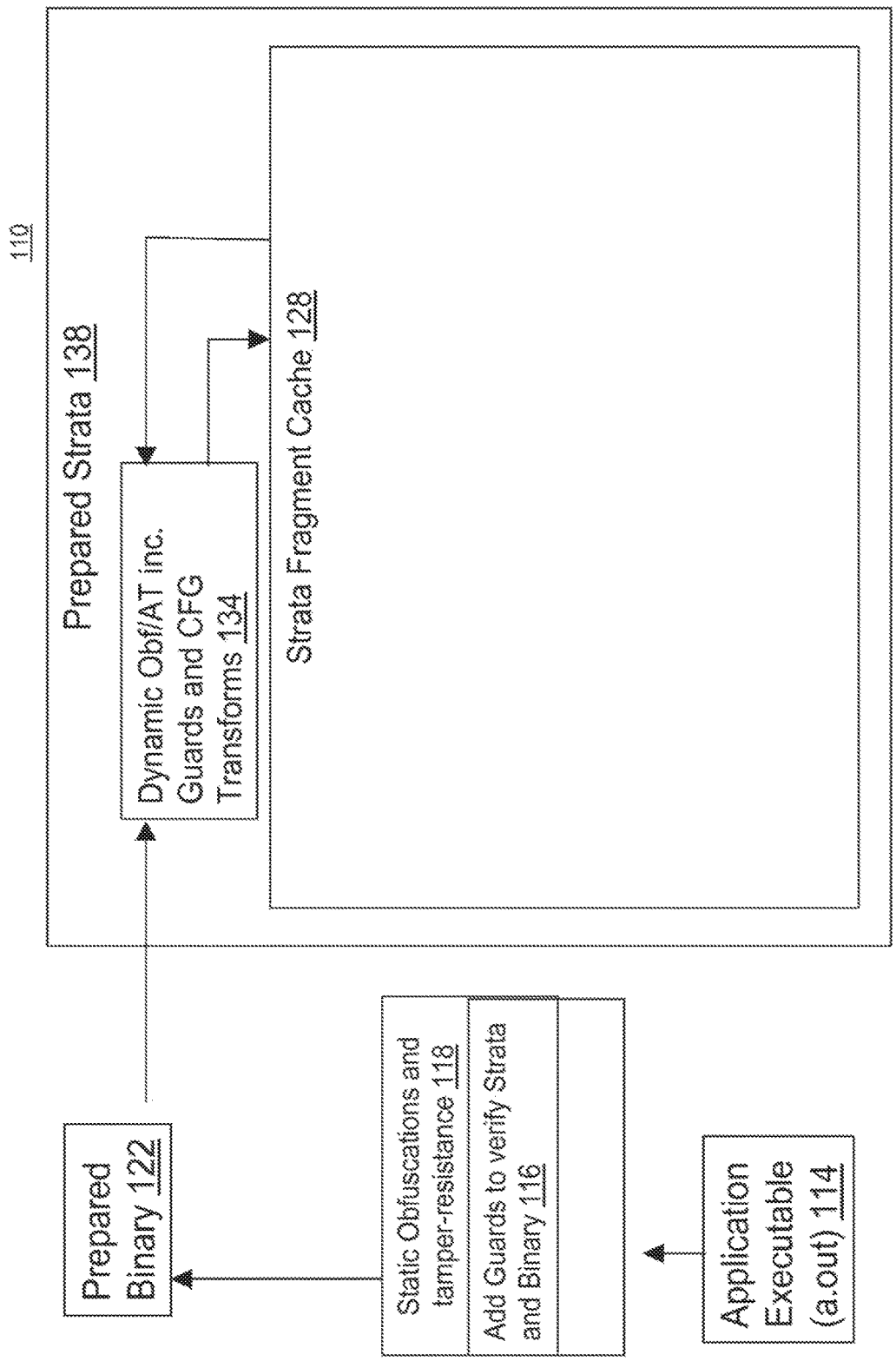
Figure 24:
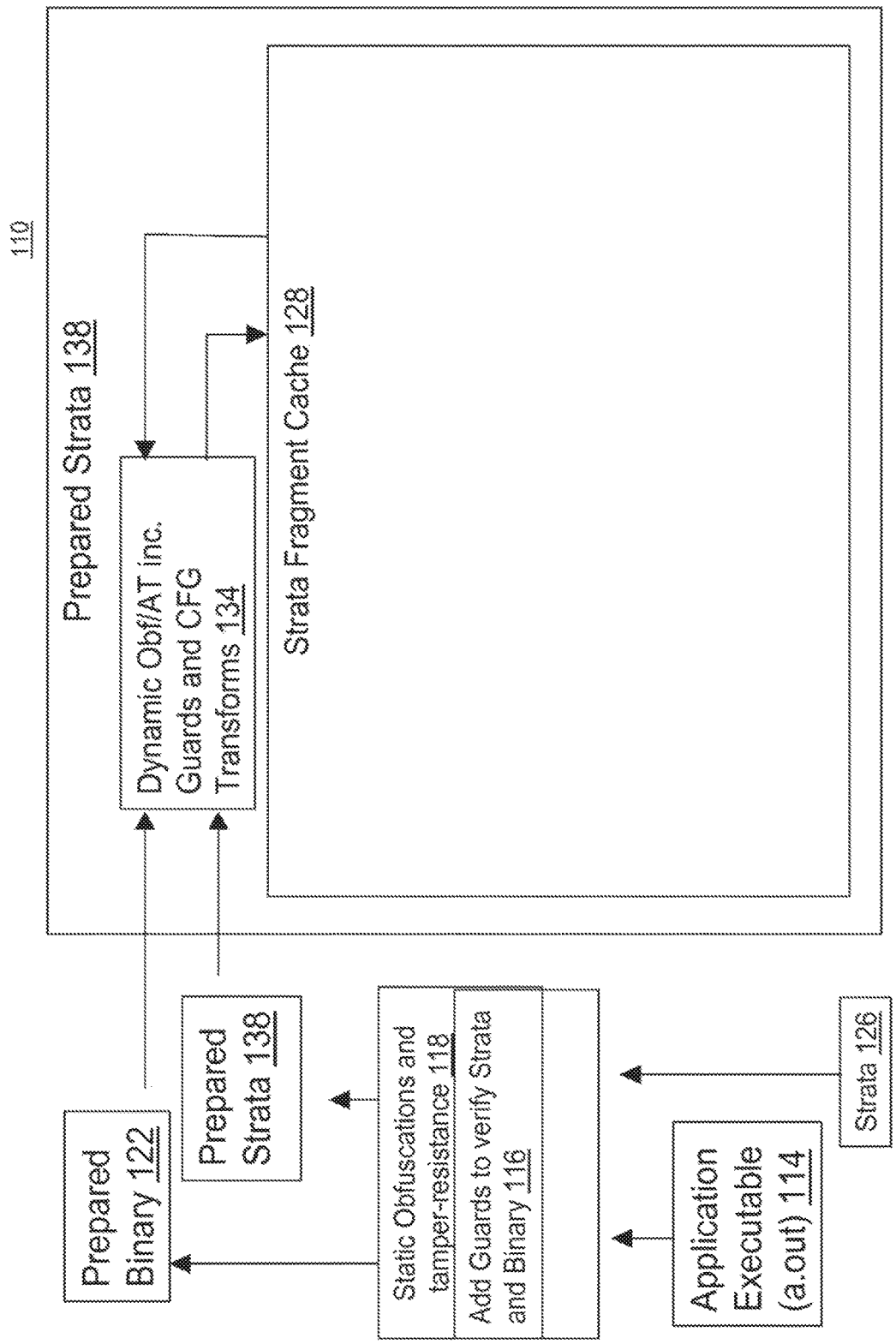
Figure 25:
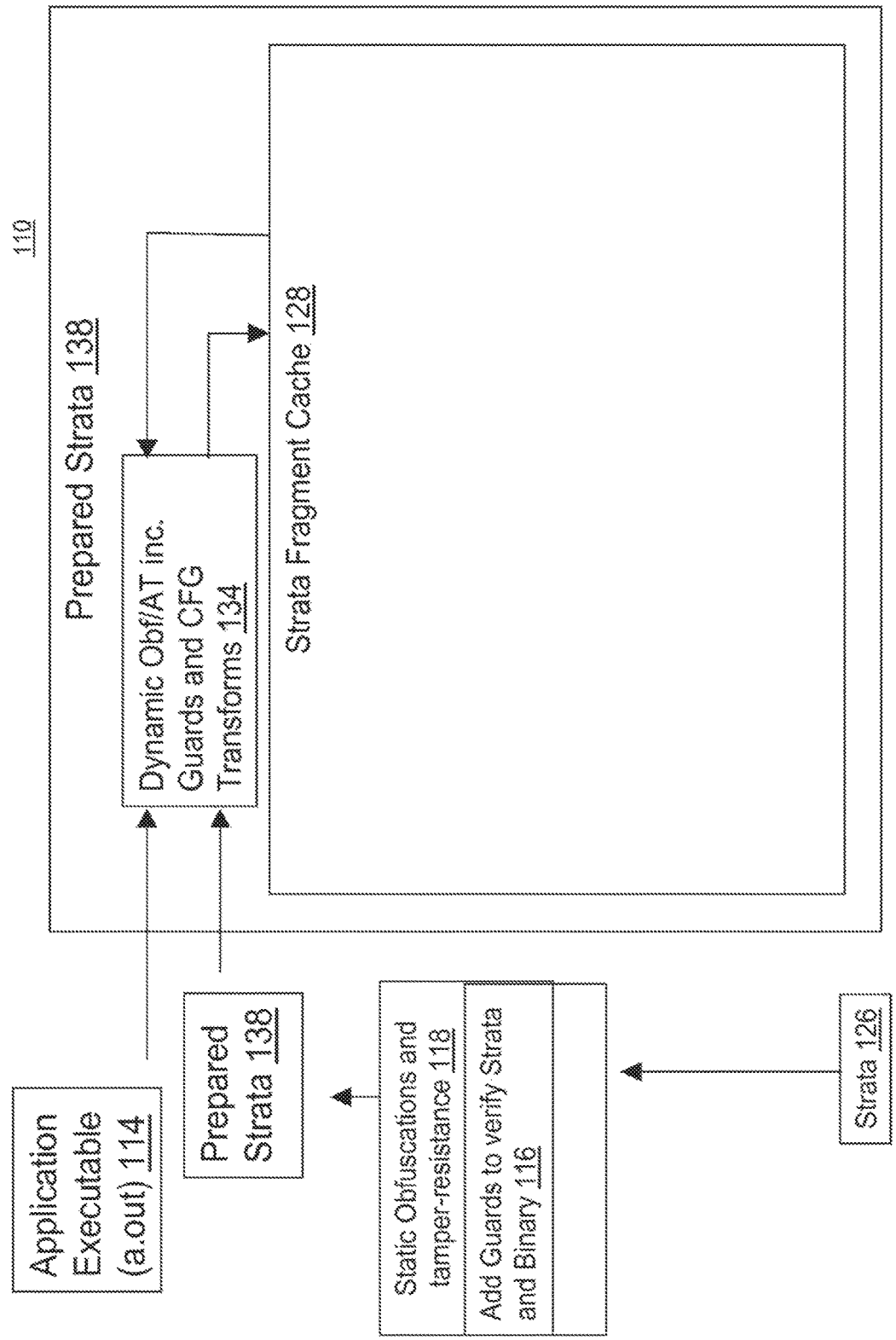
Figure 26:
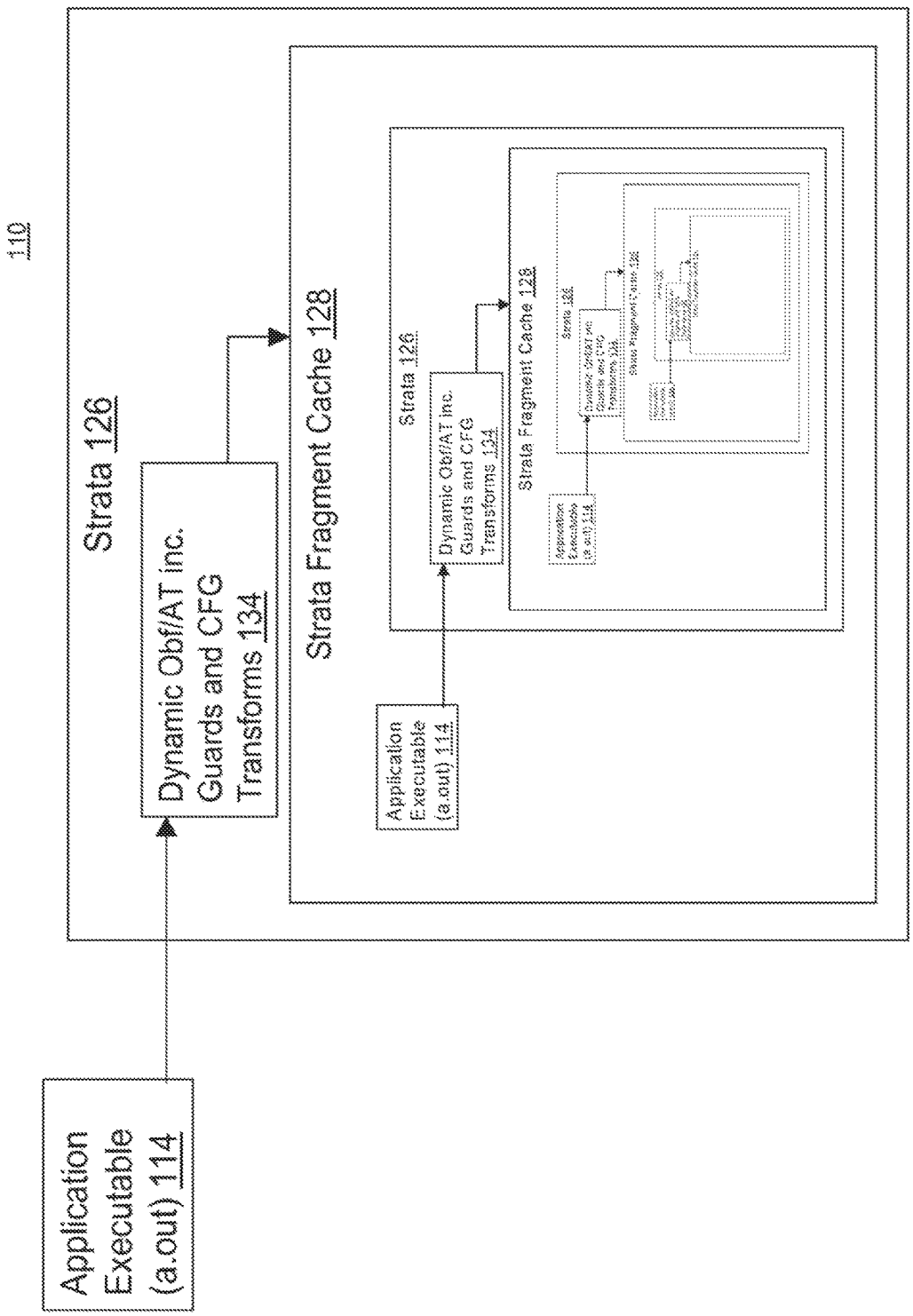
Figure 27:
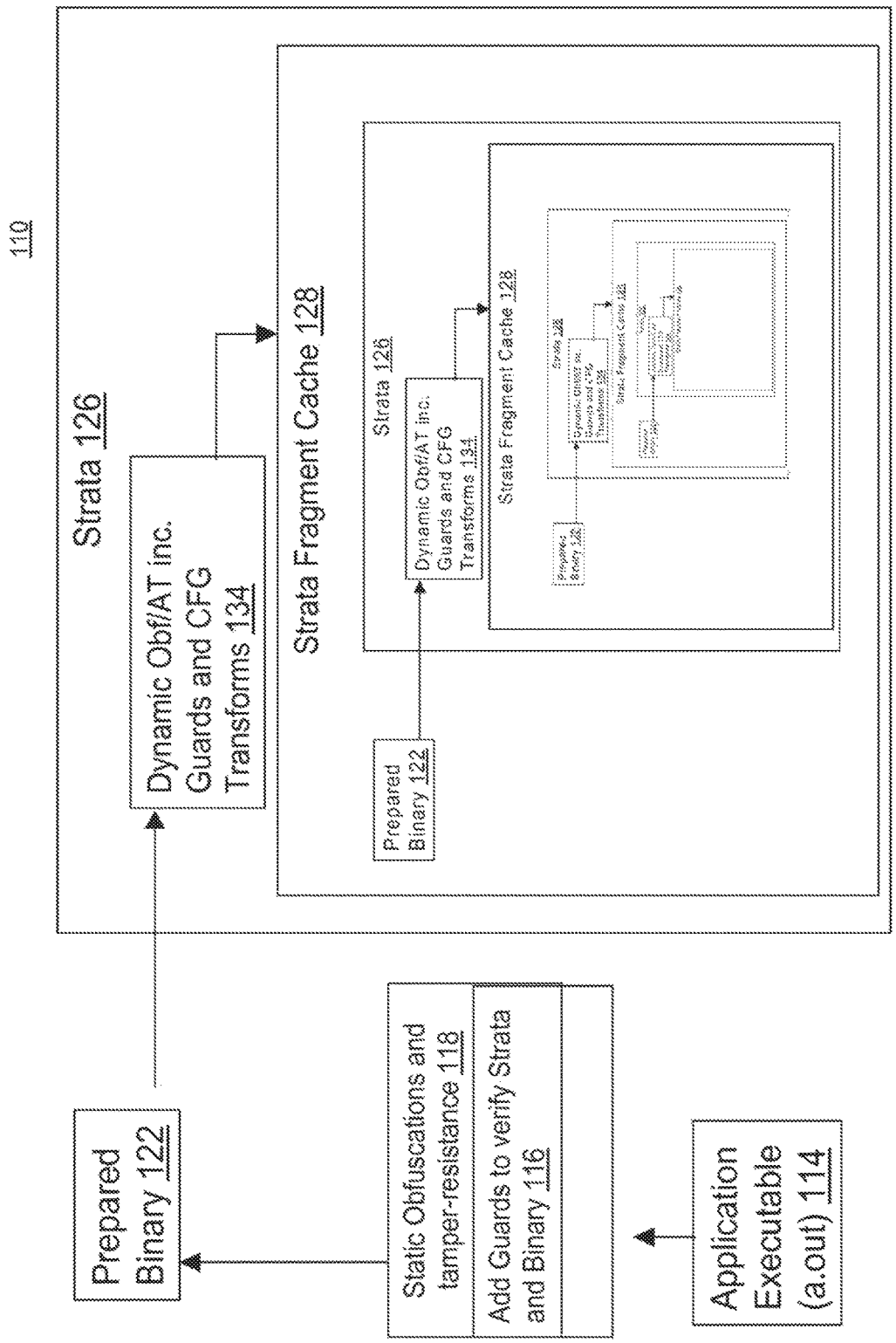
Figure 28:
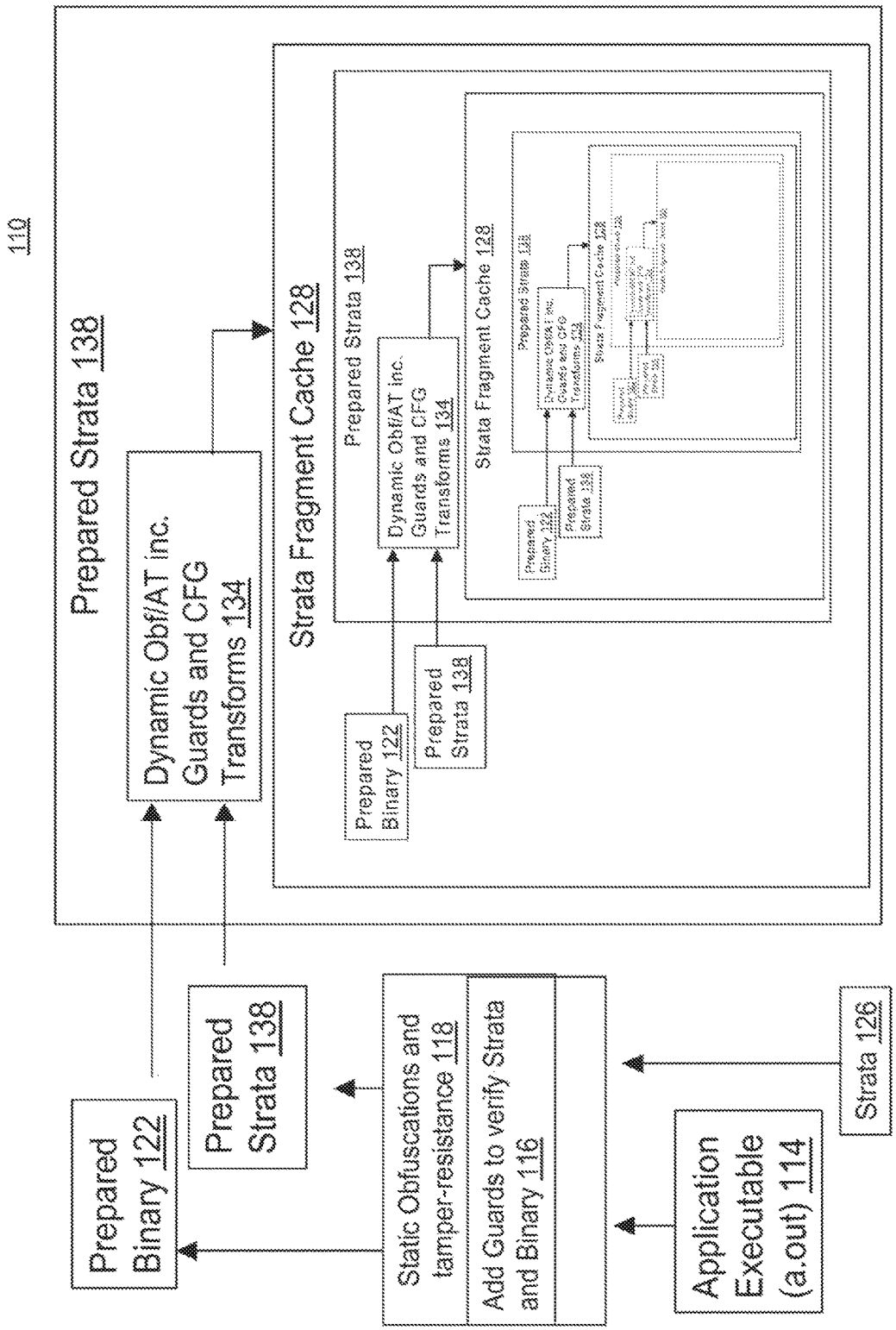
Figure 29:
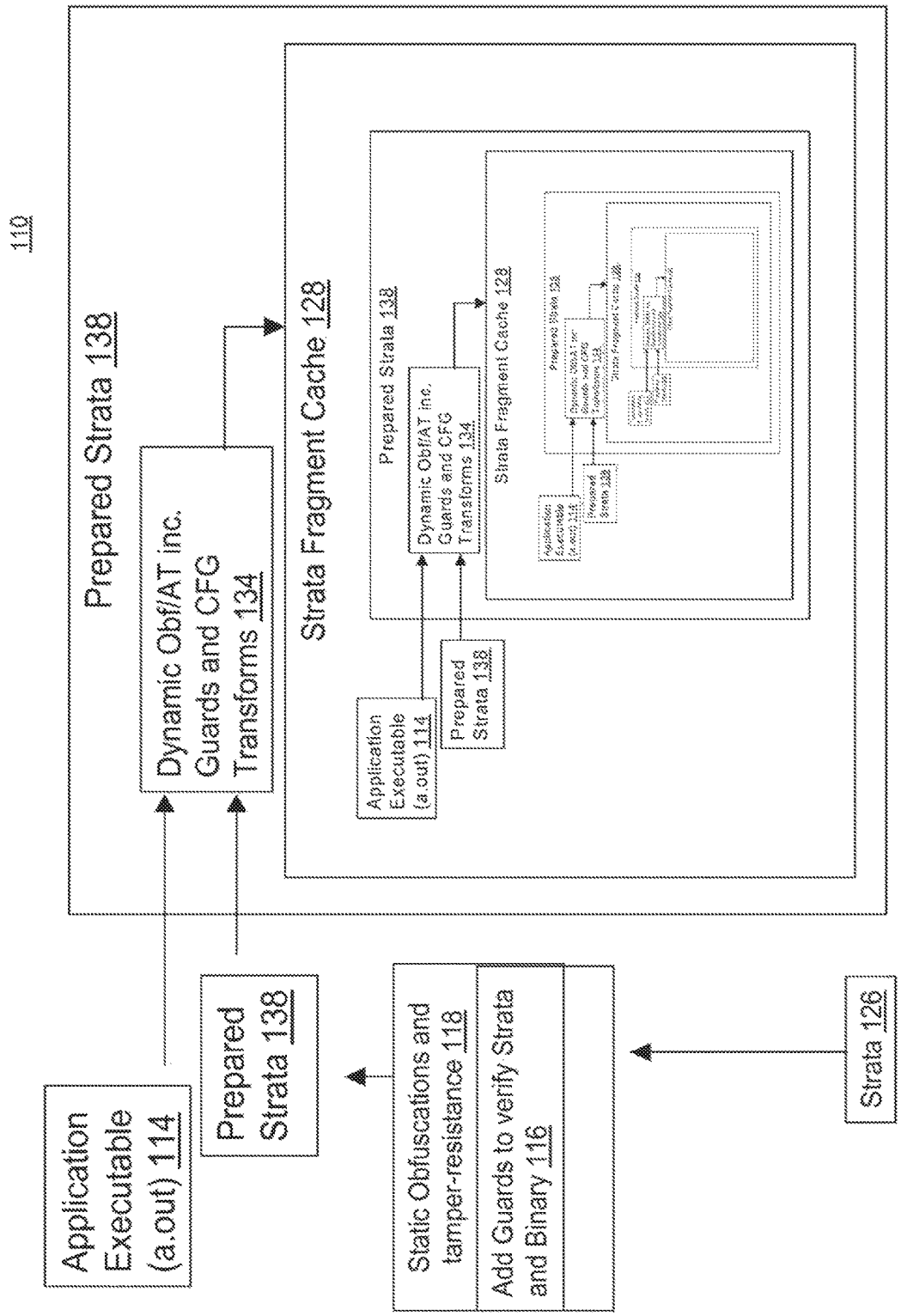
Figure 30:
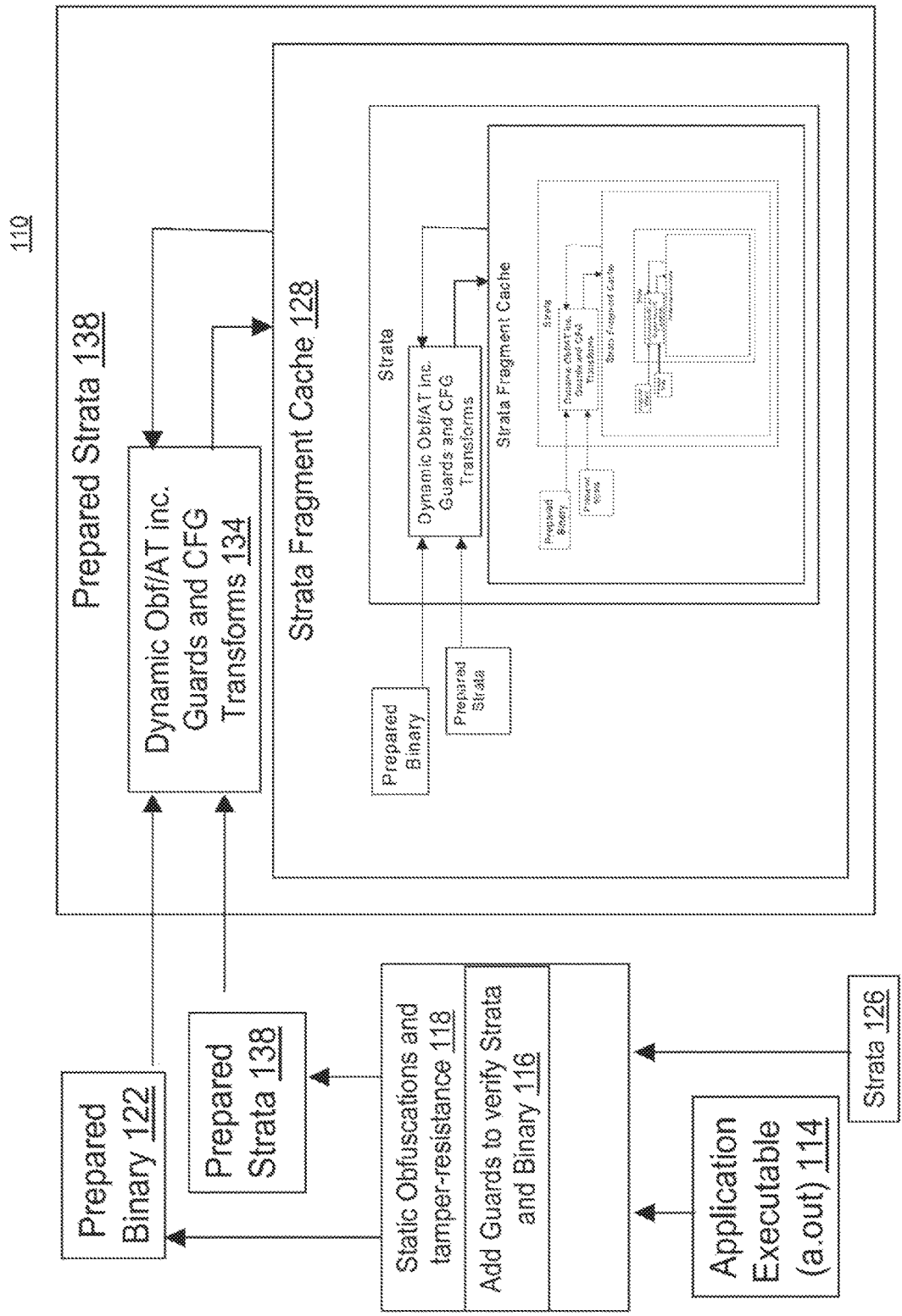
Figure 31:
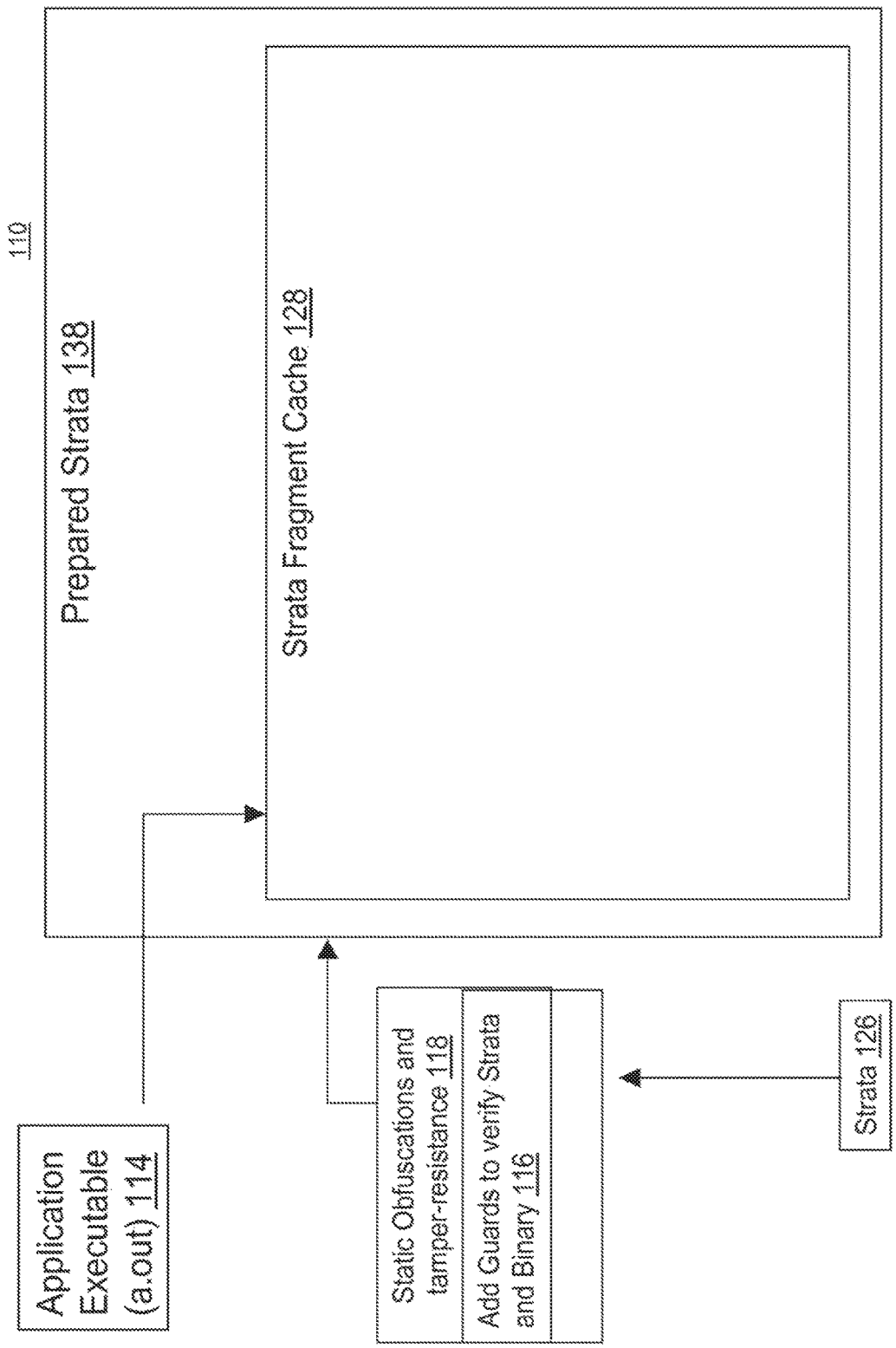
Figure 32:
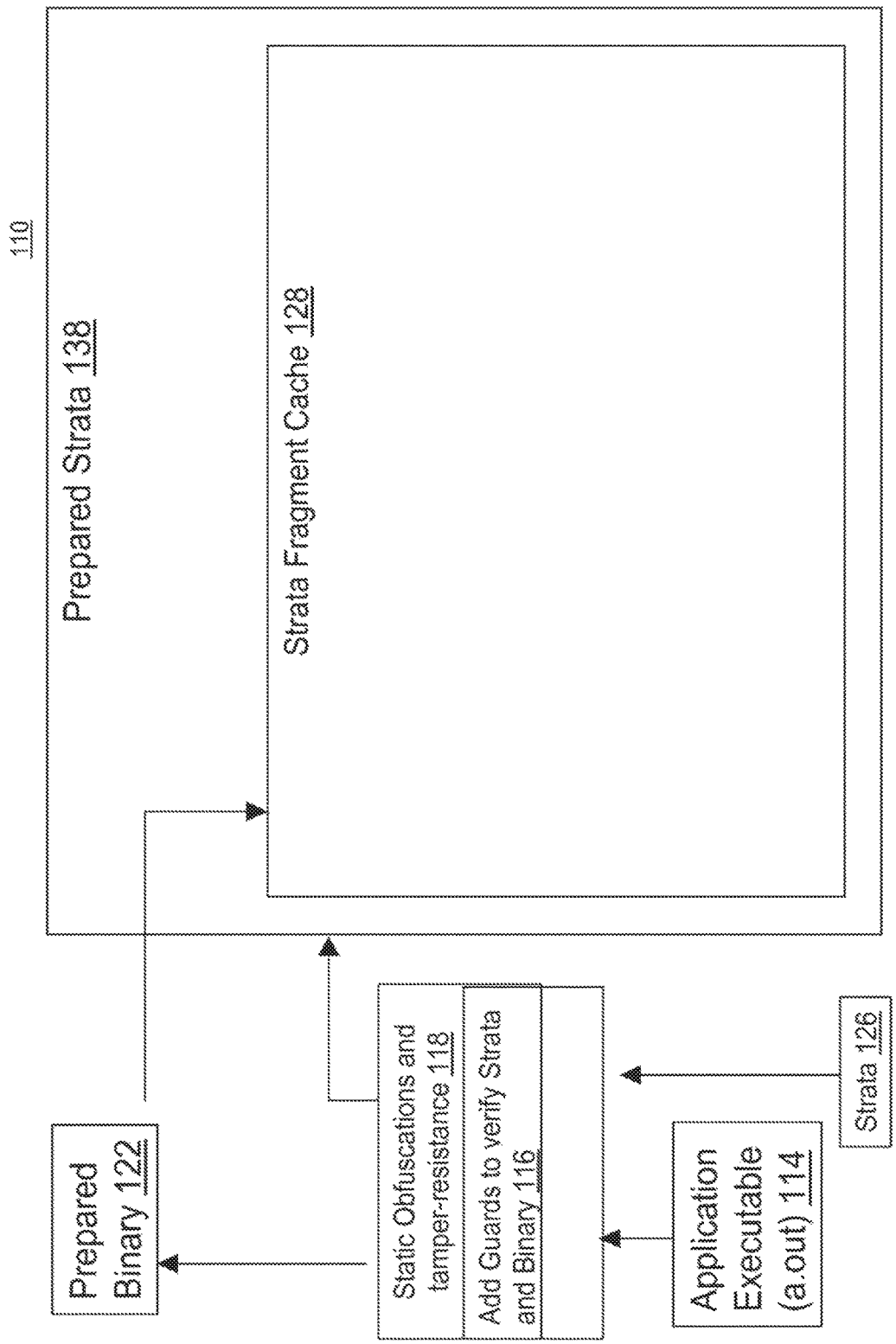

Next, referring to FIG. 16, provided is a non-limiting example of a schematic block diagram of the computer method or system of increasing the tamper-resistance and/or obscurity of computer software code 14 by preparing both the compute software code 14 and the execution environment 26 as similarly discussed pertaining to FIGS. 2 and 16 above.

Apply Execution Transformations During Execution of a Computer Software Code

Figure 1:
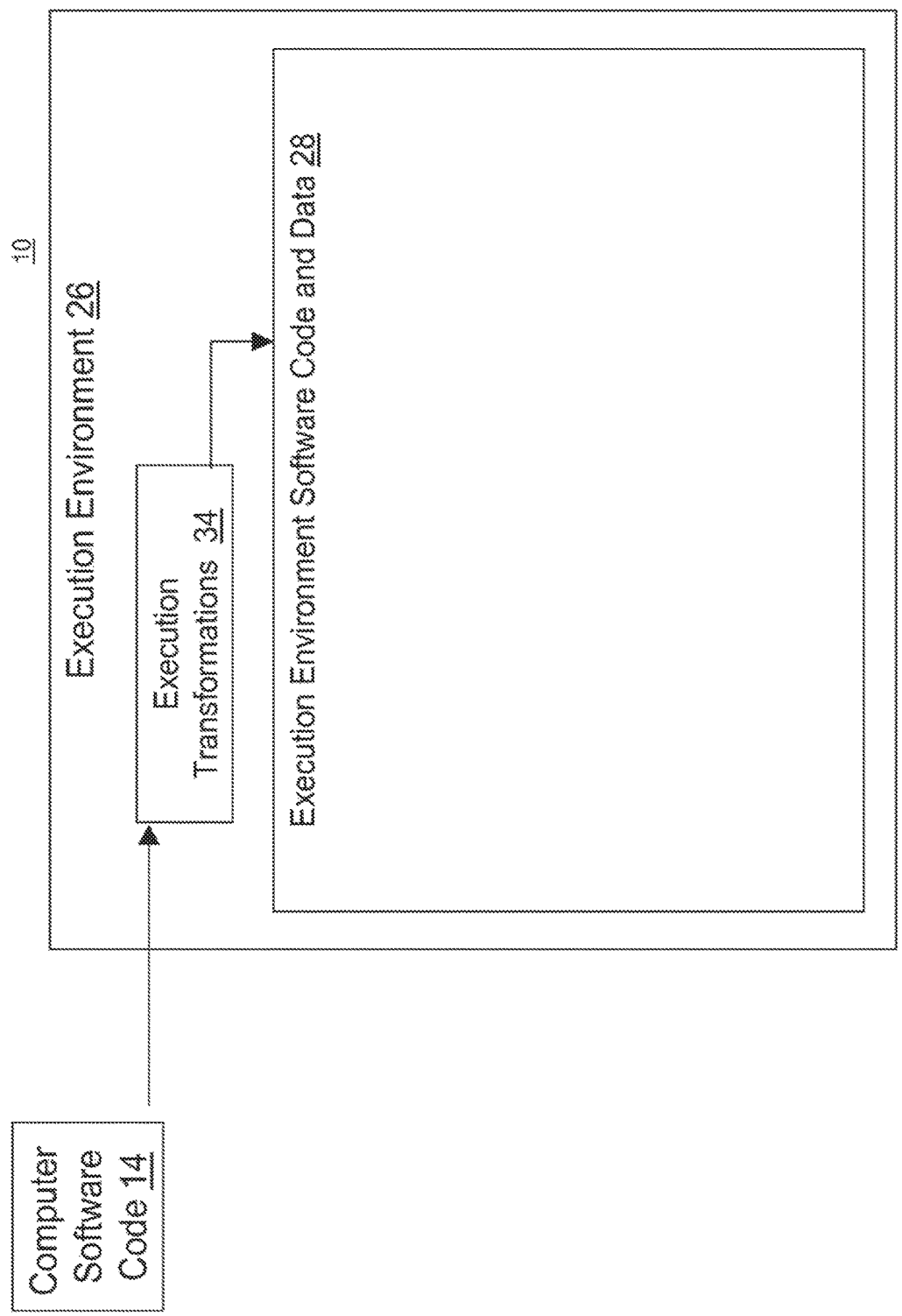
FIGS. 1-16 provide a schematic block diagram for various embodiments of the present invention computer method or system for increasing the tamper-resistance and/or obscurity of computer software code or other related.

Referring to FIG. 1, there is provided a schematic block diagram of the computer method or system 10 for increasing the tamper-resistance and/or obscurity of computer software code 14.

In contrast, a previous approach may have allowed applied obscurity and/or tamper resistance transforms statically (i.e., prior to the execution of the computer software code). Whereas, an embodiment of the present invention provides a method (or system or computer program product) for applying obscurity and/or tamper resistance transforms dynamically (i.e., during execution of the computer software codes), that which may possibly in a continuous manner or possibly periodic or random manner. Furthermore, an embodiment of the present invention provides a method (or system or computer program product) whereby previously transformed code and/or data may subsequently be retransformed, thereby further increasing obscurity and/or tamper resistance. For instance, an example of an application may involve, but not limited there to, the data layout of access controlled software in proprietary television set top boxes that can be changed (i.e. transformed by the execution environment) every 300 hundred milliseconds of execution, for example. Set top boxes are subject to parsons attempting to gain unauthorized access to set top services.

The method or system 10 may comprise applying execution transformations 34 during execution of a computer software code 14 to improve tamper resistance and/or obscurity. The execution transformation may comprise the execution environment changing the layout of computer software code data. And whereby, the computer software code data may be data that is used for the execution environment or data to execute the computer software code 14 or data to execute prepared software code (as well be discussed below). Further, the execution transformation may comprises the execution environment using conditions generated during execution, whereby the conditions are difficult to programmatically decipher to assist in the tamper-resistance and/or obscurity transforms. Still yet, the execution transformations may include relocating operational locations to increase the difficulty of determining operation locations for making operation's locations difficult to determine. For instance, disassembly technique. See for example, 22, C. Linn, S. Debray, and J. Kececioglu. Enhancing software tamper-resistance via stealthy address computations. Proceedings of the 19th Annual Computer Security Applications Conference (ACSAC 2003), 2003, of which is hereby incorporated by reference in its entirety. Further yet, the execution transformations may include inserting additional software code and/or data to make the execution flow and/or control flow difficult to determine. The execution transformations may include rearranging, eliminating, or adding execution flow for making execution flow and/or control flow difficult to determine. For instance, a control flow flatting technique. See for example, 33, C. Wang, J. Hill, J. Knight, and J. Davidson. Software tamper resistance: Obstructing static analysis of programs. University of Virginia, Charlottesville, Va. 2000, of which is hereby incorporated by reference in its entirety. Also, the execution transformations may include creating software code that has operations that are difficult to determine. Moreover, the execution transformations may include inserting operations that cannot be feasibly executed, but appear as though execution is possible. Additionally, the execution transformations may include inserting incorrect codes that are intentionally similar to other correct software codes. Yet again, the execution transformations may include randomizing operation order. Further, the execution transformations may insert operations to verify the integrity of software code and/or software data. Moreover, any one of the execution transformations may comprise at least one of the following: control flow flattening, guards, disassembly resistance, self checksumming codes, dynamic disassembly resistance, control flow obfuscations, ABI transforms, API transforms, sequence transforms, calling convention transforms or data transform, or any combination thereof.

It should be appreciated that the execution environment may be a variety of available types, including but not limited thereto the following: software dynamic translation (SDT), virtual machine (VM), Java VM, Strata VM, program simulators, program emulators, or virtualization systems, or any combinations thereof.

It should be appreciated that the c computer software code may be a variety of available types, including but not limited thereto the following: binary, byte code, program source, program assembly, program scripts, machine language, or program intermediate formats, or any combination thereof. Further, it should be appreciated that the program scripts may be a variety of available types, including but not limited thereto the following: Perl, PHP, python, CGI, Java, Java Script, ASP script, MySQL, Borne shell, bash, tesh, or csh, or any combinations thereof.

Figure 3:
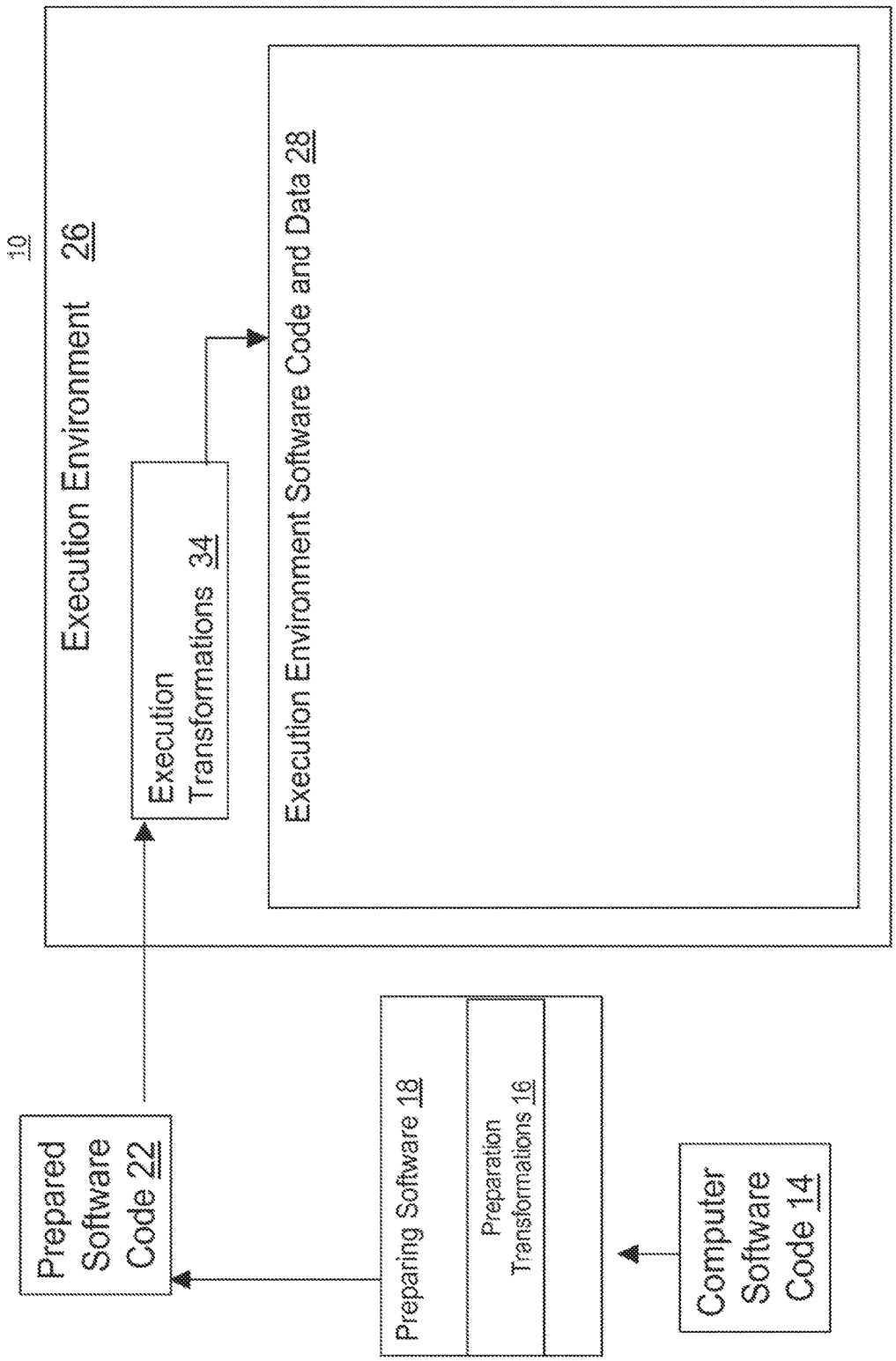

Further yet, it should be appreciated that the computer software code 14 and/or computer software code data may comprises at least one of the following: prepared computer software code and/or data, unprepared computer software code and/or data, prepared execution environment code and/or data, unprepared execution environment code and/or data, or previously transformed computer software code and/or data, or any combinations thereof. It should be appreciated that the previously transformed computer software code and/or data may comprises at least one of the following: cache, fragment cache, disk, disk drive, RAM, tape, magnetic tape drive, optical disk drive, or flash memory, or any combination thereof. For instance, referring to FIG. 3, there is provided a schematic block diagram of the computer method or system 10 (or related method or computer program product) whereby execution transformation occurs on the prepared software code 22. For instance, referring to FIG. 6, there is provided a schematic block diagram of the computer method or system 10 (or related method or computer program product) whereby the execution transformation 14 occurs not only on the computer software code 14, but also on the previously transformed computer software code and/or data of the execution environment software code and/or data 28.

Figure 5:
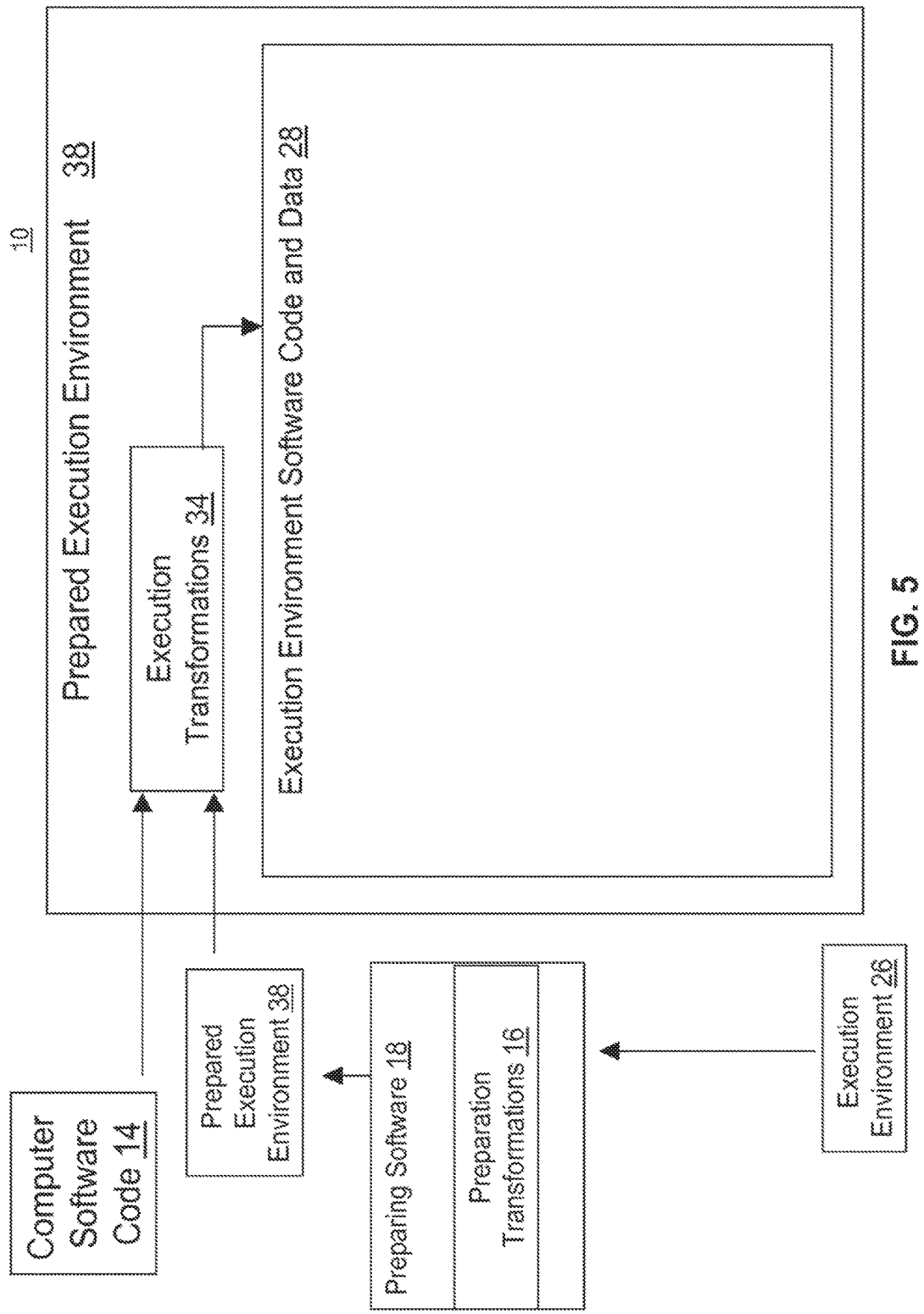

Similarly, referring to FIG. 5, there is provided a schematic block diagram of the computer method or system 10 (or related method or computer program product) whereby execution transformation 34 occurs not only on the computer software code 14, but also on the prepared execution environment software code and data 38.

Figure 7:
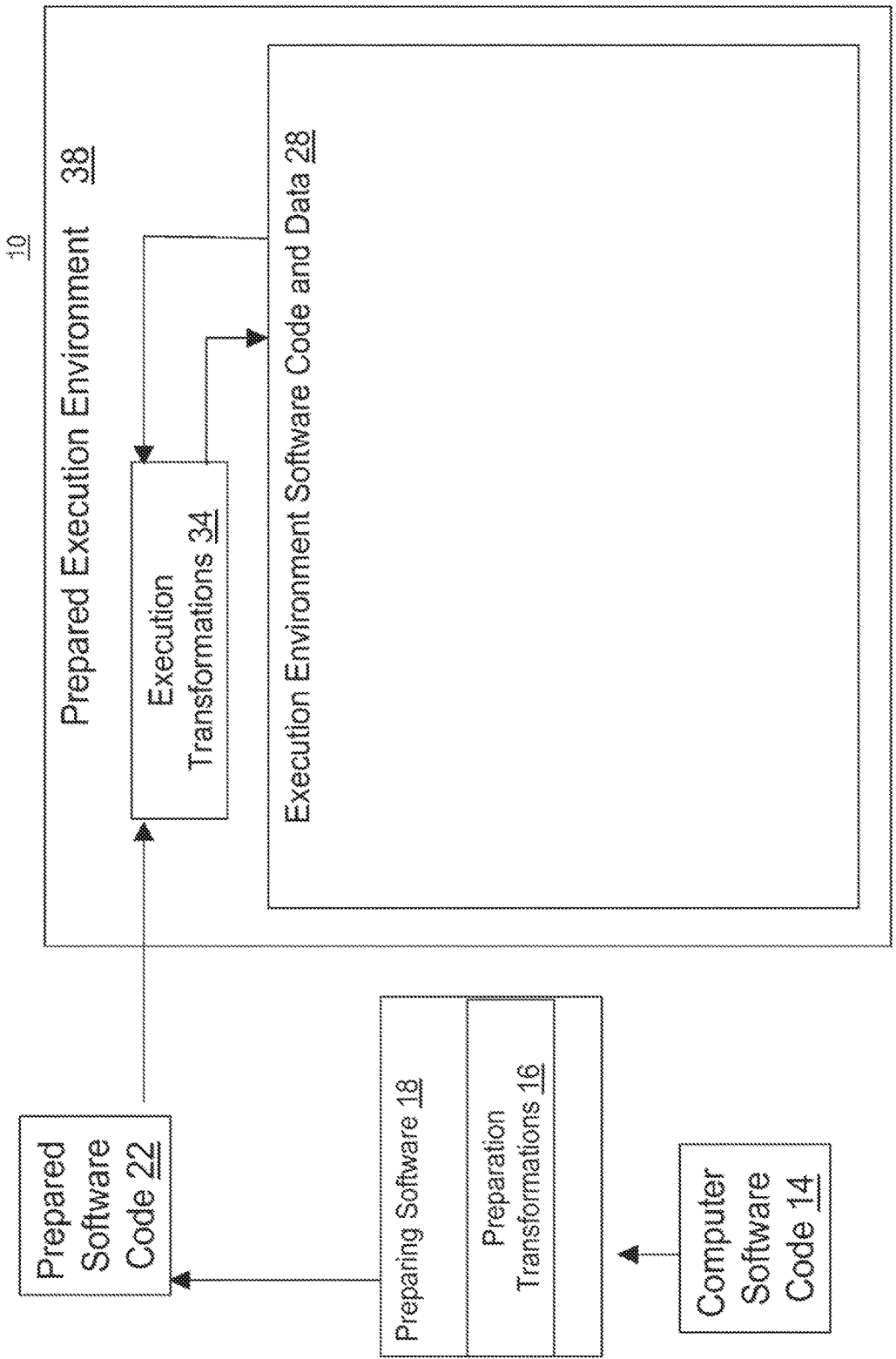

Similarly, referring to FIG. 7, there is provided a schematic block diagram of the computer method or system 10 (or related method or computer program product) whereby execution transformation 34 occurs not only on the prepared software code 22, but also on the previously transformed computer software code of the execution environment software code and data 28.

Figure 9:
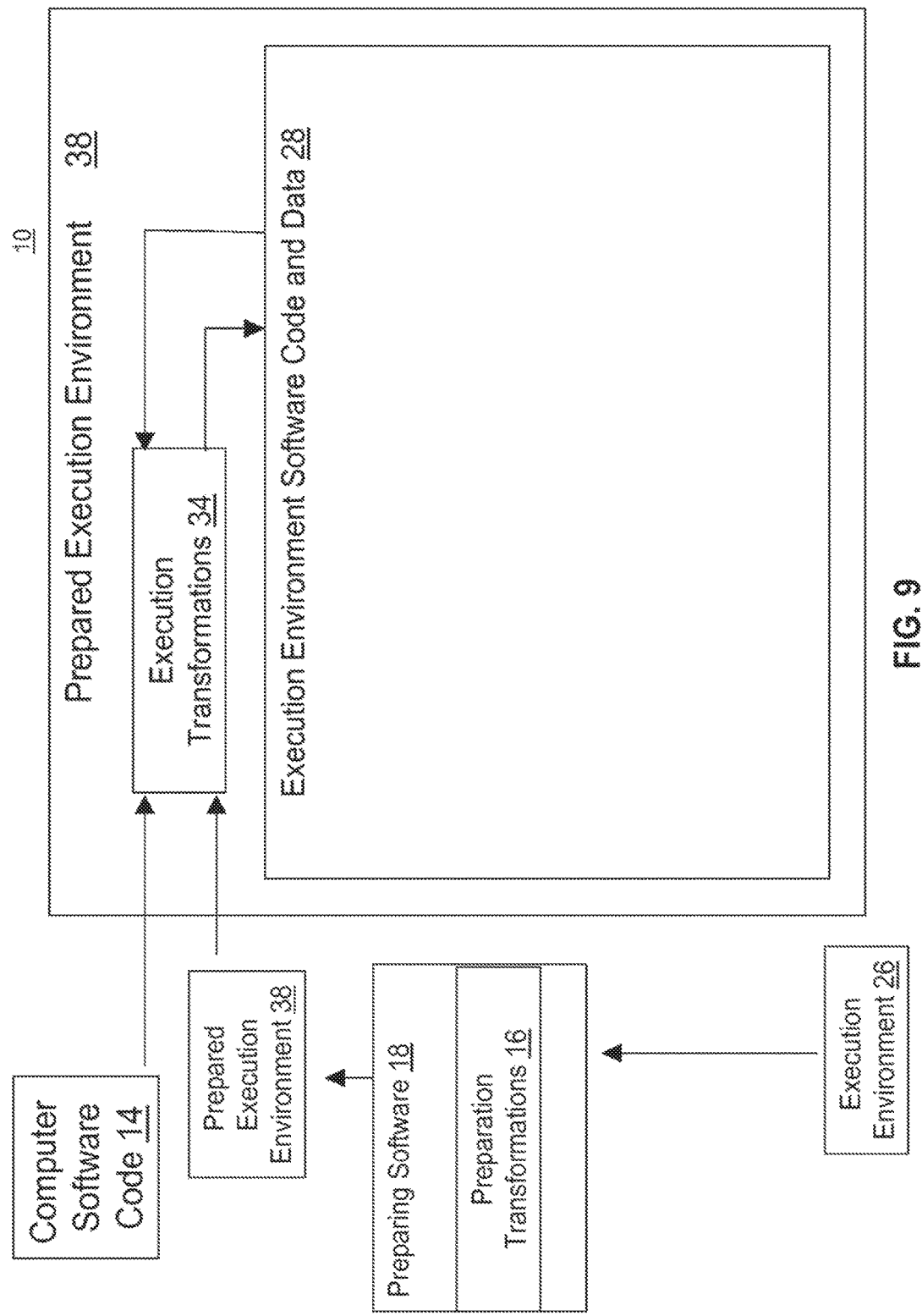

Similarly, referring to FIG. 9, there is provided a schematic block diagram of the computer method or system 10 (or related method or computer program product) w hereby execution transformation 34 occurs not only on the computer software code 14, but also on the prepared execution environment software code and data 38, as well as on the previously transformed computer software code or data of the execution environment software code and data 28.

Figure 6:
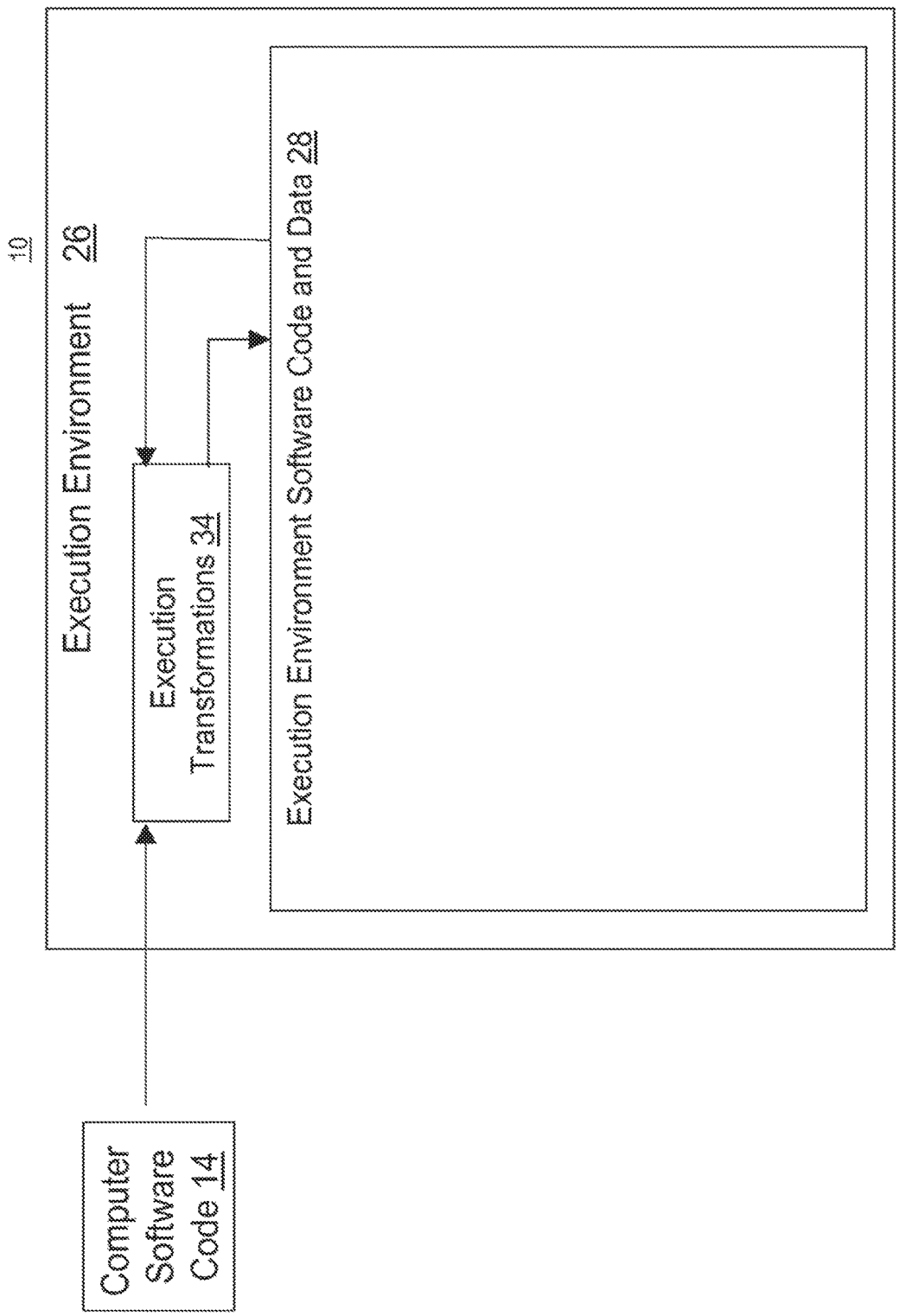
Figure 10:
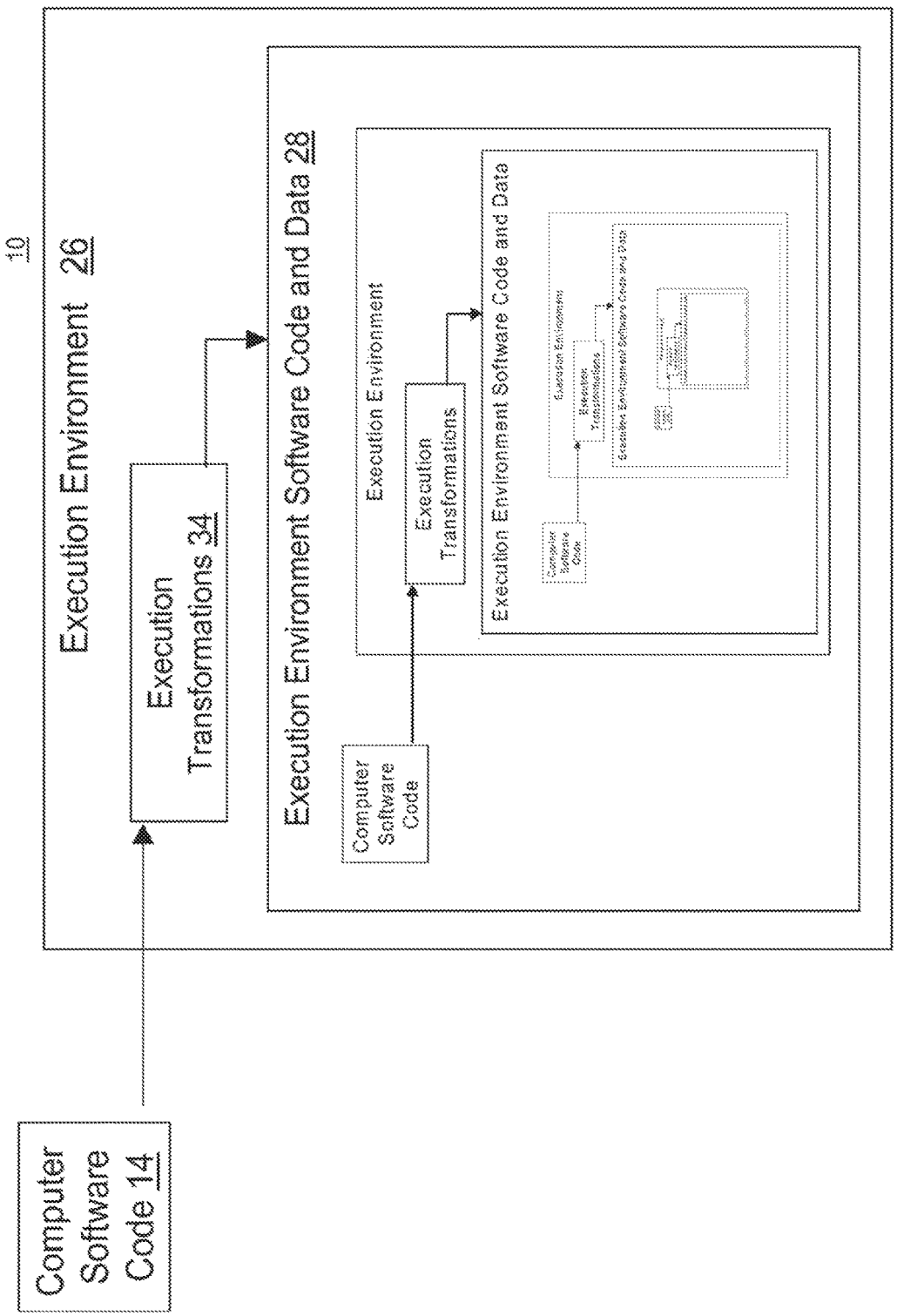

Similar to FIG. 6, FIG. 10 provides a schematic block diagram of the computer method or system 10 (or related method or computer program product) whereby execution transformation 34 occurs not only on the computer software code 14, but also on the previously transformed computer software code and/or data of the execution environment software code and data 28.

Figure 11:
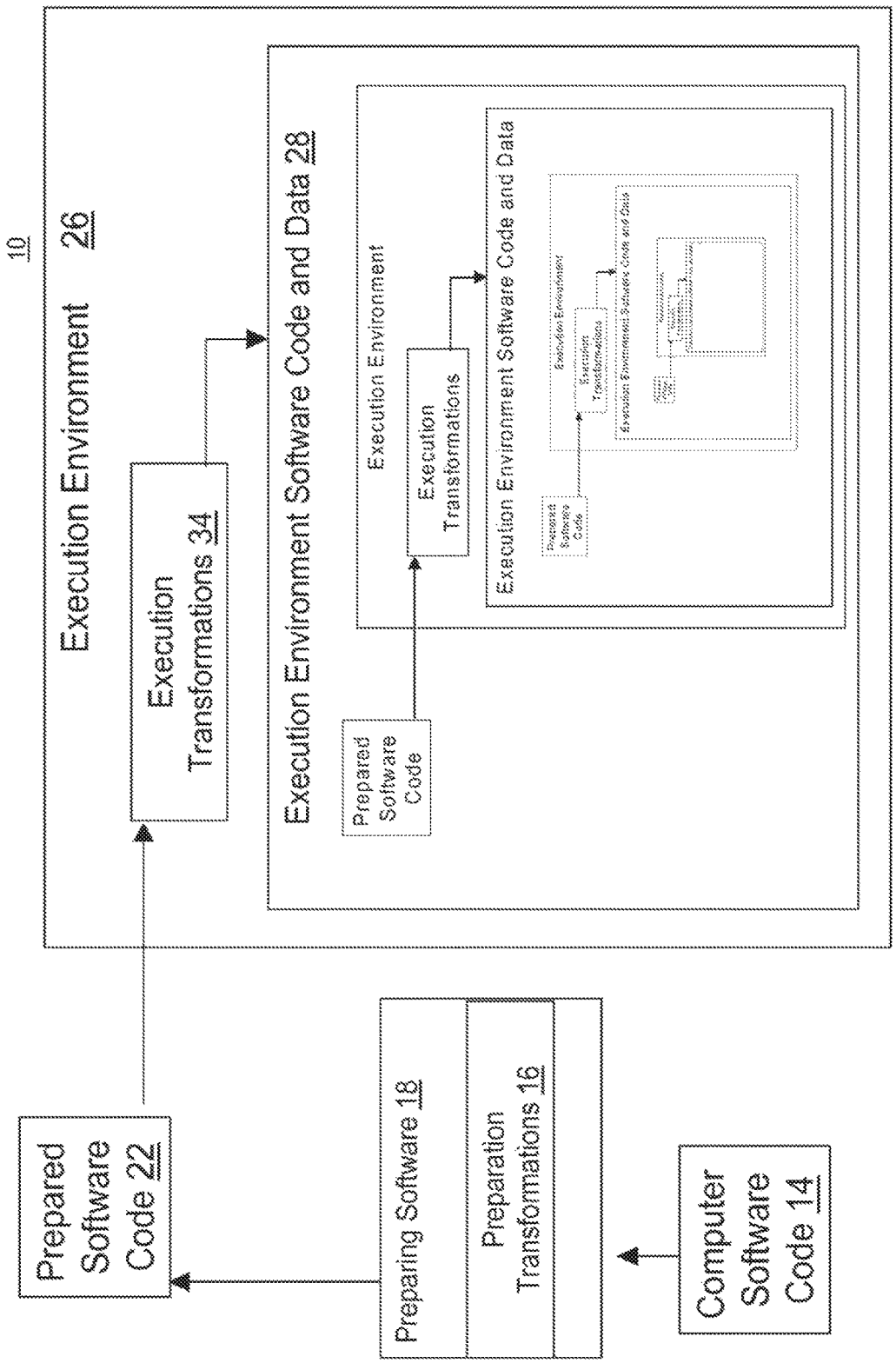

Referring to FIG. 11, there is provided a schematic block diagram of the computer method or system 10 (or related method or computer program product) comprising preparing 18 the computer software code 14 for execution in an execution environment 26, but also applying execution transformation 34 so that it occurs not only on the prepared software code 22, but also on the previously transformed computer software code and/or data of the execution environment software code and data 28. Further, the execution transformation may comprise undoing the preparation transformations on the prepared software codes.

Figure 13:
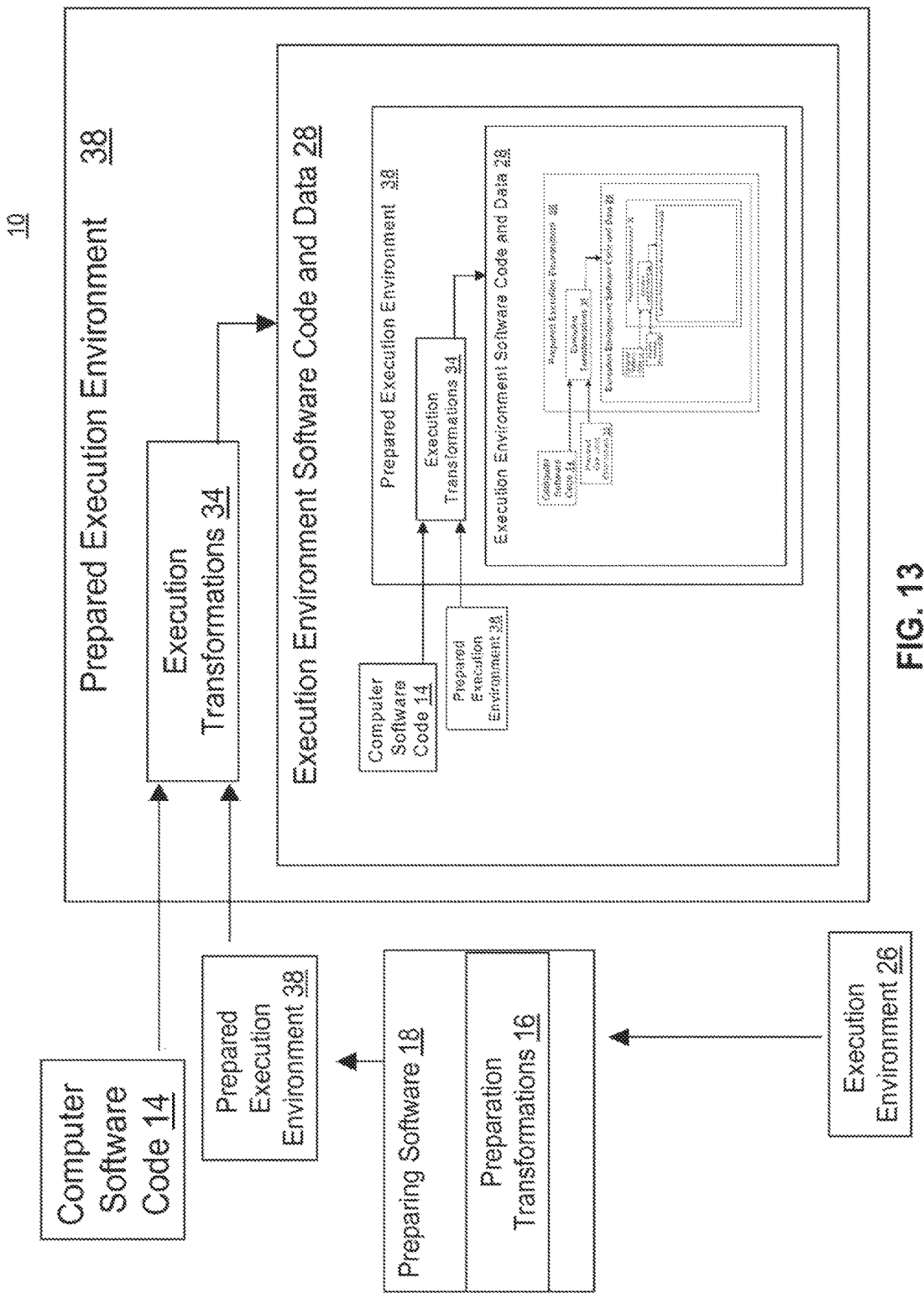

Similar to FIG. 9, referring to FIG. 13, there is provided a schematic block diagram of the computer method or system 10 (or related method or computer program product) whereby execution transformation 34 occurs not only on the computer software code 14, but also on the prepared execution environment software code and data 38, as well as on the previously transformed computer soft ware code and/or data of the execution environment software code and data.

Figure 4:
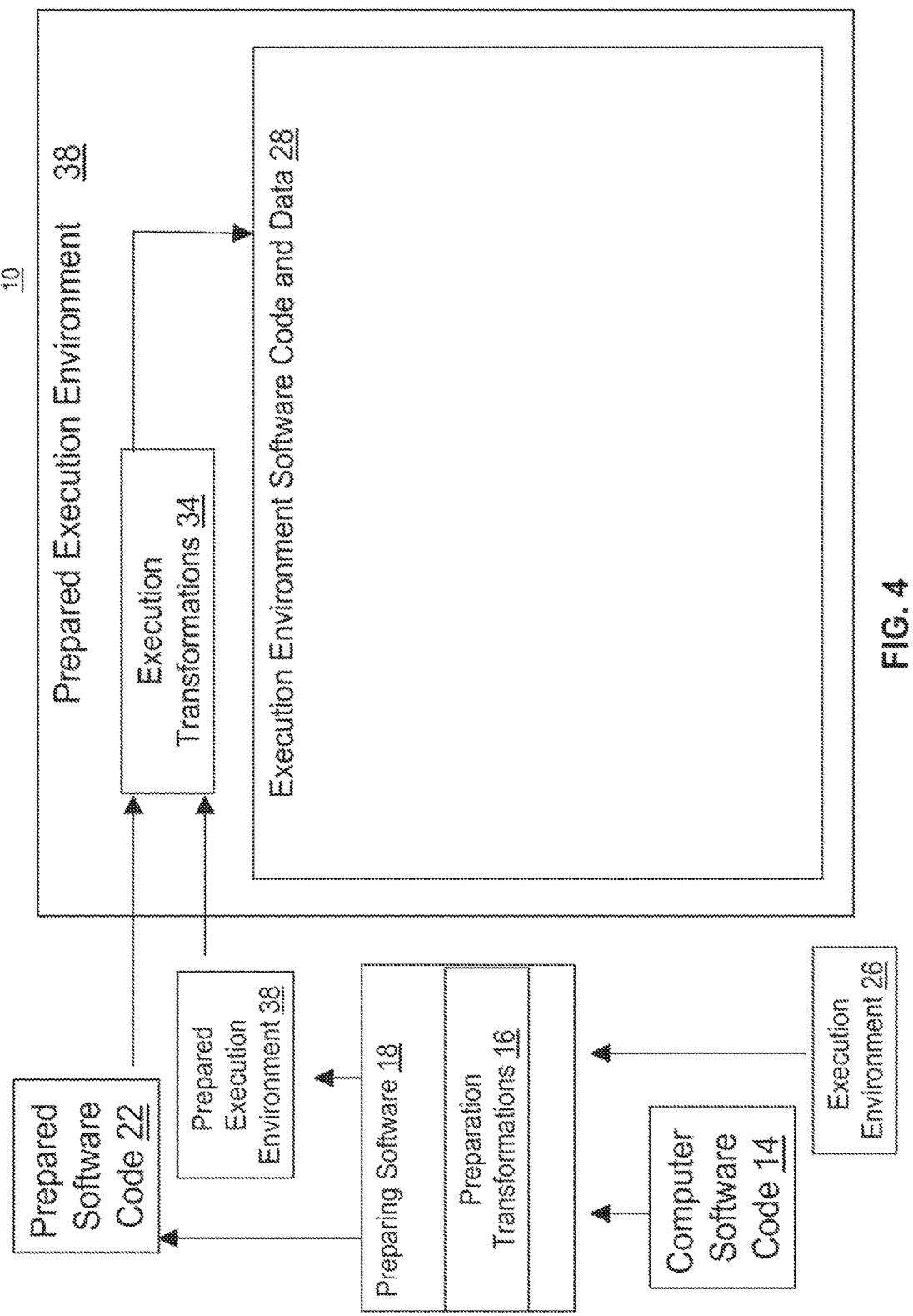

Referring to FIG. 4, there is provided a schematic block diagram of tire computer method or system 10 (or related method or computer program product)comprising preparing 18 the computer software code 14 for execution in an execution environment 26, but also applying execution transformation 34 on both the prepared software code 22 and prepared execution environment 38, Further, the execution transformation may comprise undoing the preparation transformations on the prepared software codes.

Figure 8:
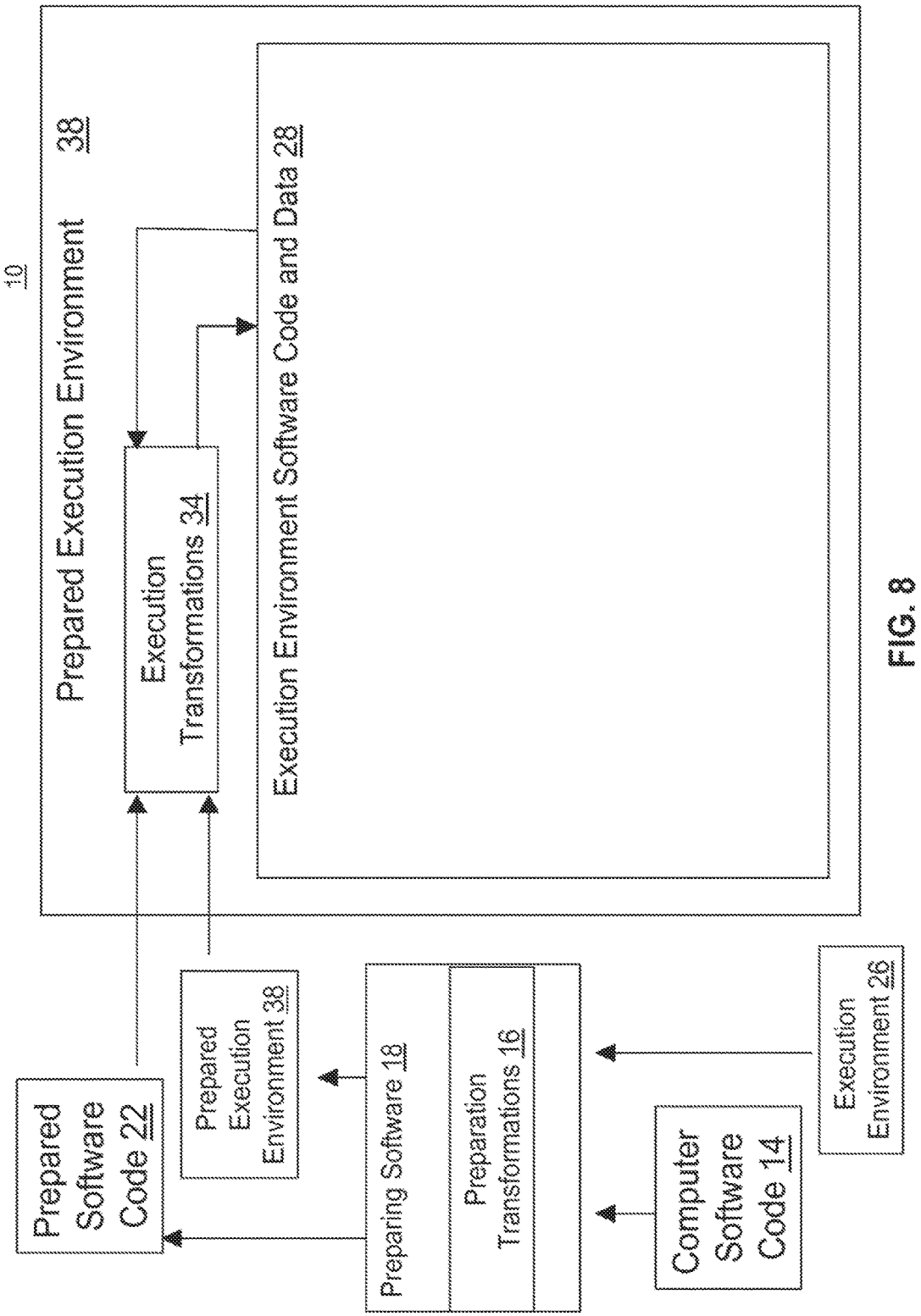

Referring to FIG. 8, there is provided a schematic block diagram of the computer method or system 10 (or related method or computer program product)comprising preparing 18 the computer software code 14 for execution in an execution environment 26, but also applying execution transformation 34 on both the prepared software code 22 and the prepared execution environment 38 and on the previously transformed computer software code and/or data of the execution environment software code and data 28. Further, the execution transformation may comprise undoing the preparation transformations on the prepared software codes.

Figure 12:
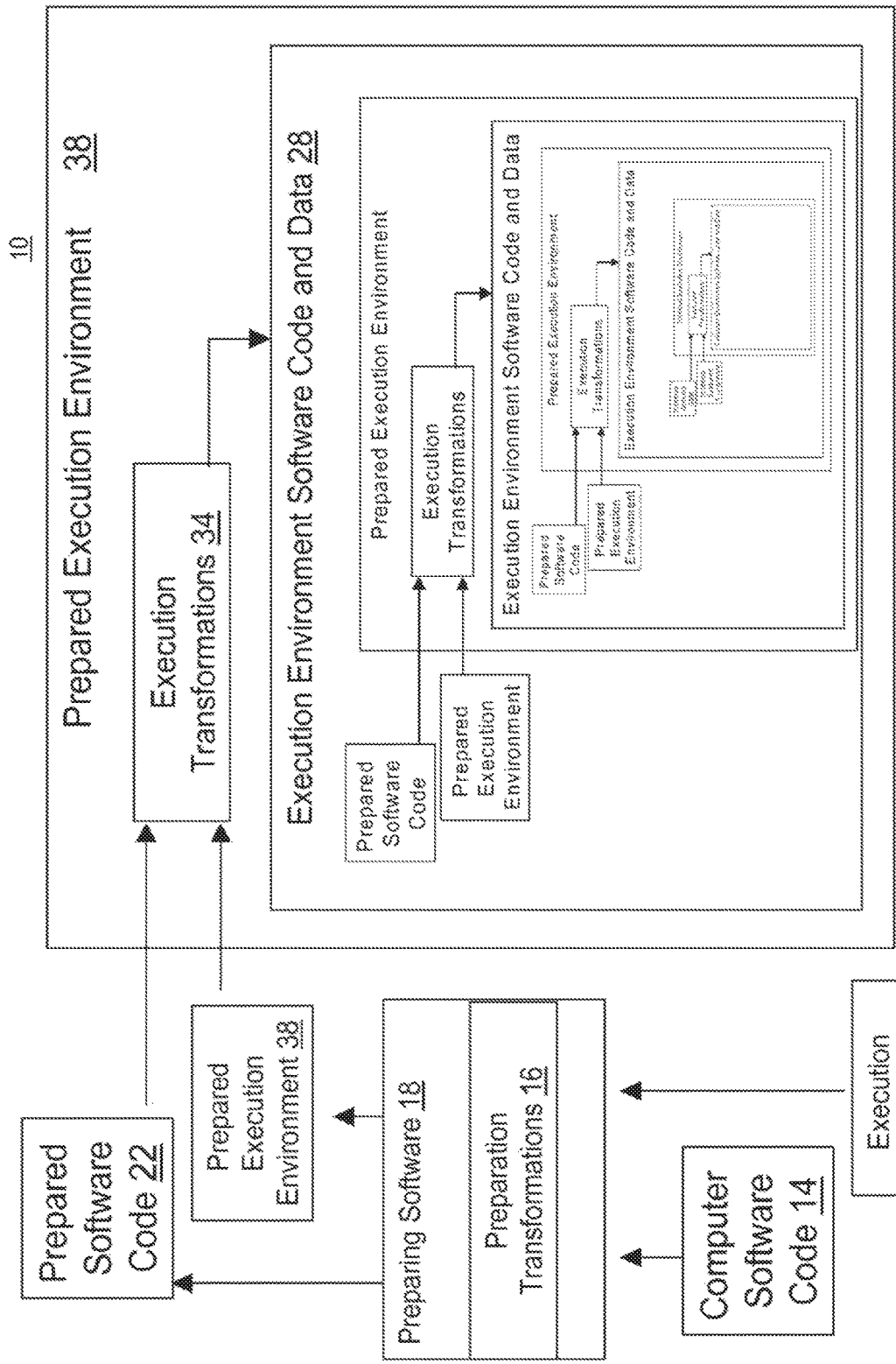

Referring to FIG. 12, there is provided a schematic block diagram of the computer method or system 10 (or related method or computer program product) comprising preparing 18 the computer software code 14 for execution in an execution environment 26, but also applying execution transformation 34 on the prepared software code 22 and prepared execution environment 38 and on the previously transformed computer software code and/or data of the execution environment software code and data 28.

Figure 14:
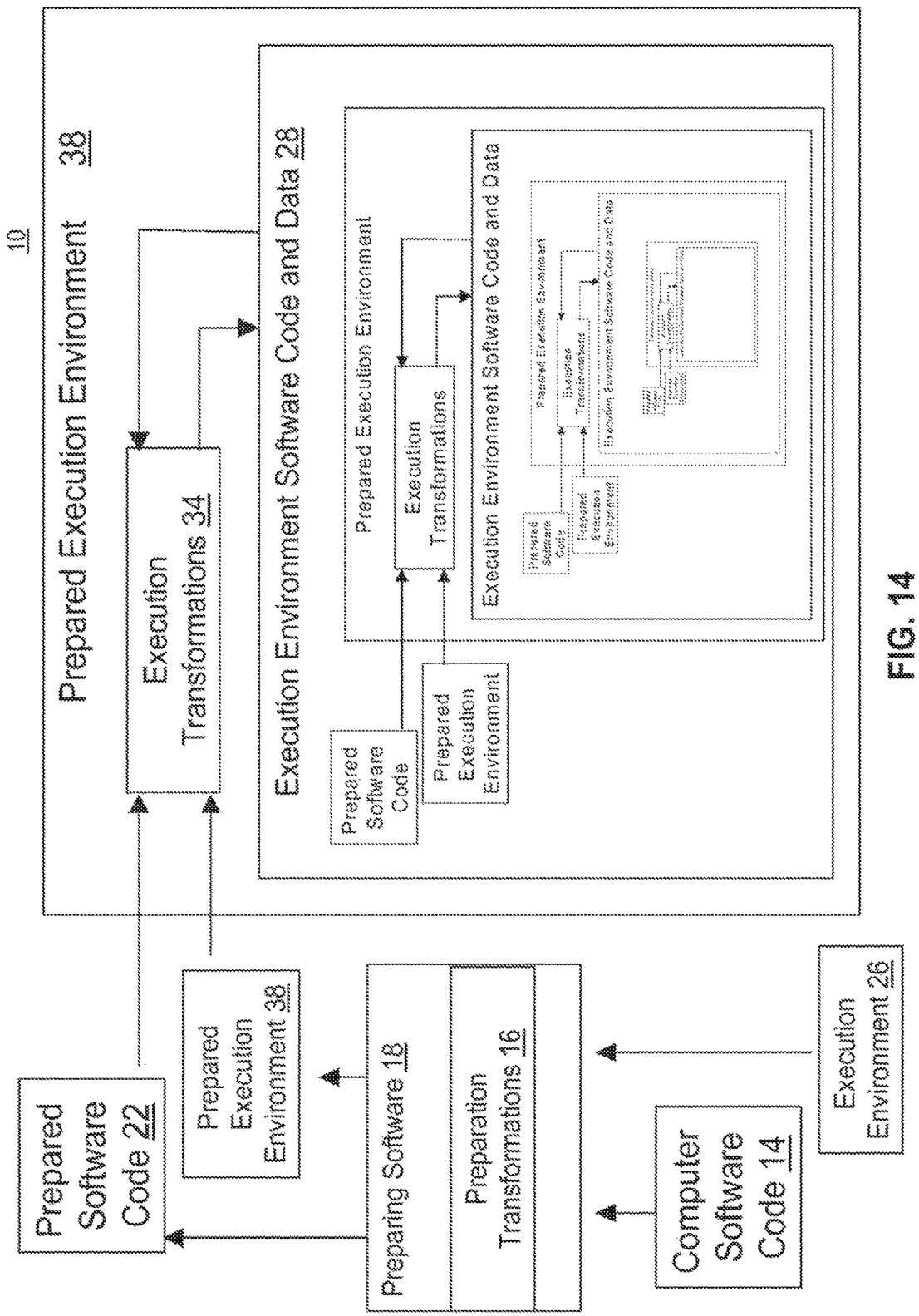

Referring to FIG. 14, there is provided a schematic block diagram of the computer method or system 10 (or related method or computer program product) comprising preparing 18 the computer software code 14 for execution in an execution environment 26, but also applying execution transformation 34 on both the prepared software code 22 and on the previously transformed computer software code and/or data of the execution environment software code and data 28, and repeat the process accordingly. Further, the execution transformation may comprise undoing the preparation transformations on the prepared software codes.

Figure 36A:
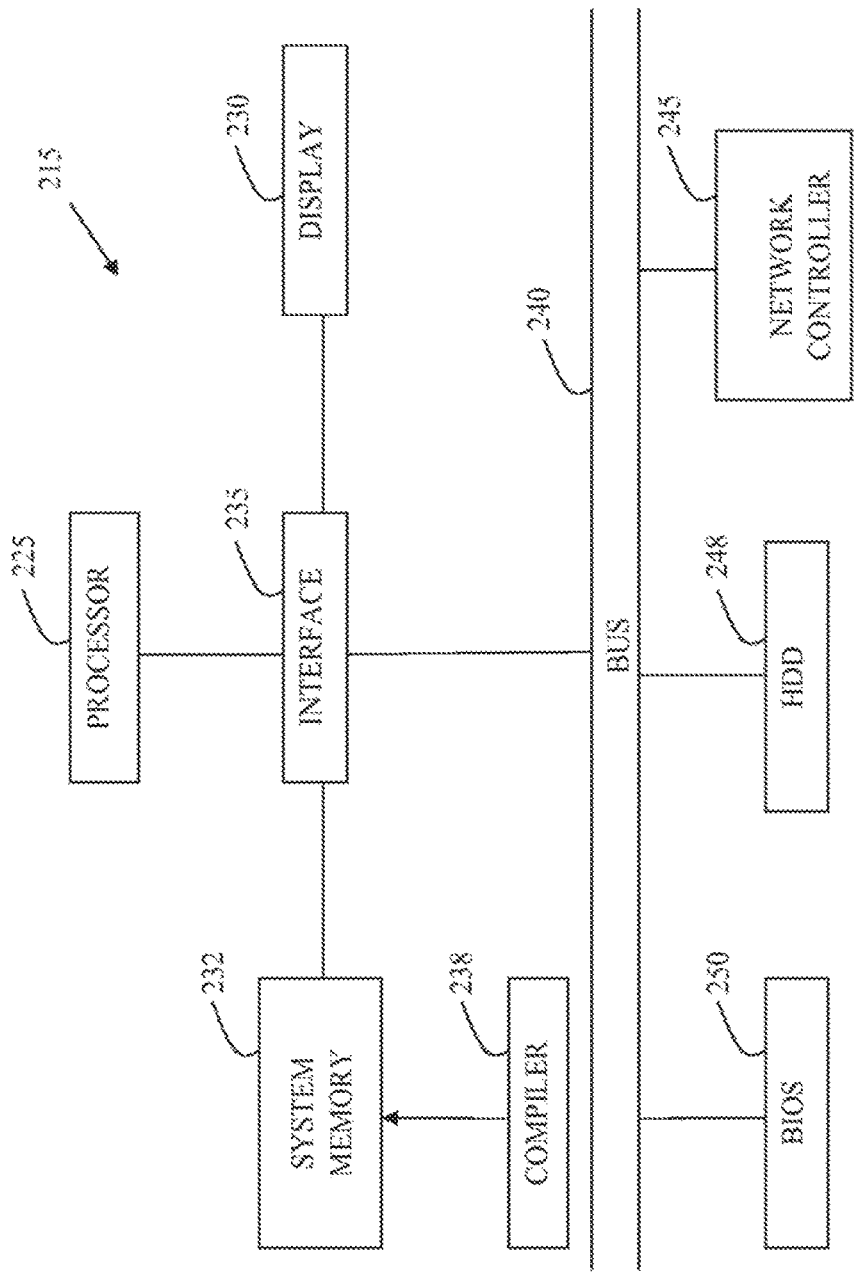
FIG. 36(A) is a block diagram of a processor-based system for use with air embodiment of the present invention.

Some embodiments of the present invention may be implemented in software for execution by a processor-based system 215, as shown in FIG. 36(A). For example, embodiments may be implemented in code and may be stored on a storage medium having stored thereon instructions which can be used to program a system, such as a wireless device to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

In many embodiments of the present invention, the processor-based system 215 may include a processor 225 coupled to a display 230 and a system memory 232 through an interlace 235. Illustrative interface 235 may be a bridge circuit in one embodiment, or may include one or more buses in another embodiment. The compiler 238, such as a commercial compiler, may be loaded into the system memory 232 according to operations consistent with certain embodiments of the present invention.

In the processor-based system 215, a primary bus 240 conforming to the peripheral component interface (PCI) standard, for example, may couple a network controller 245. a hard disk drive (HDD) 248 and a basic input/output system (BIOS) to the processor 225 through the interface 235. In this manner, the primary bus 240 may couple to the interface 235 while providing an interface to peripheral devices. For some embodiments of the present invention, the processor-based system 215 may be responsible for distributing the compiler-modified code, for example. Other systems may be implemented in other embodiments of tire present invention.

Figure 36B:
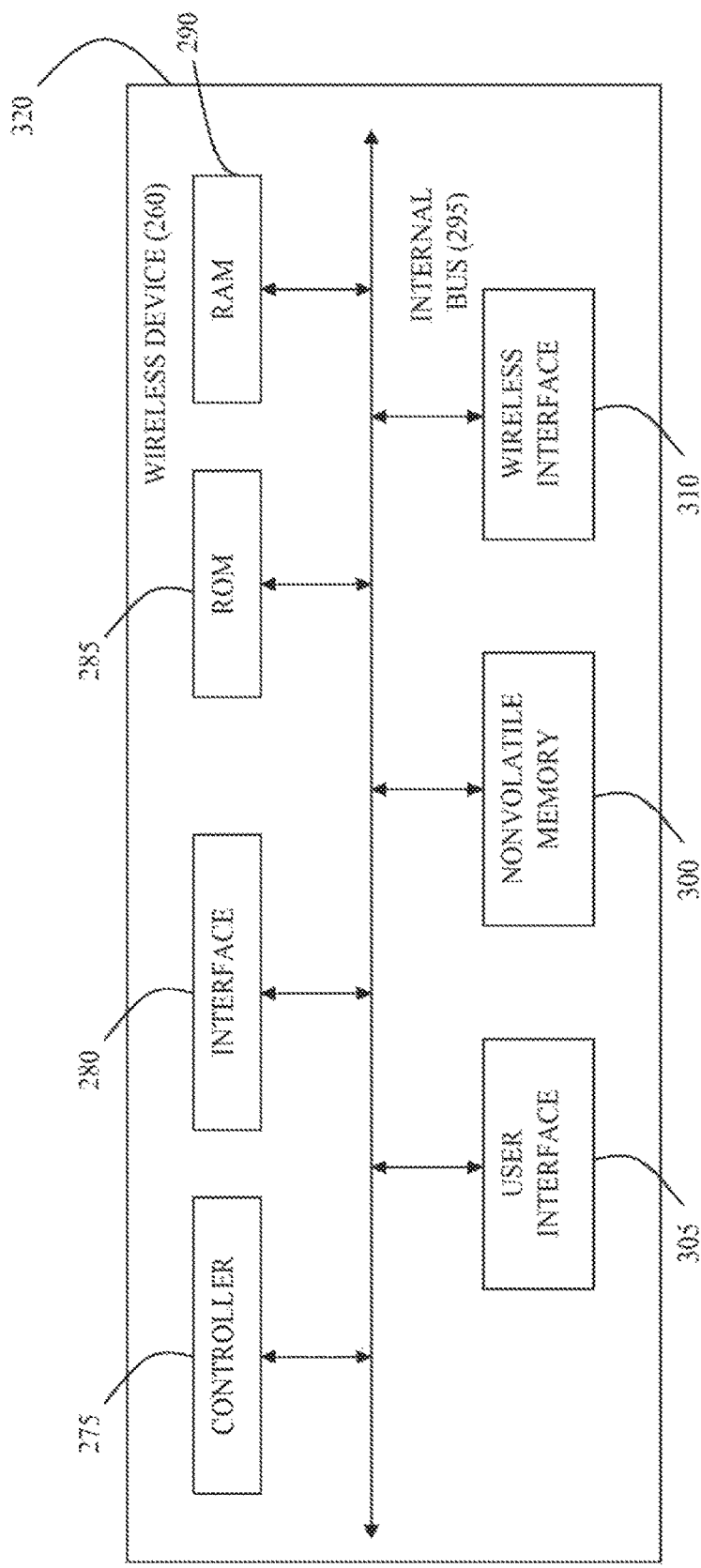
FIG. 36(B) is a block diagram of a wireless device for use with one embodiment of the present invention.

In different embodiments, however, wireless devices may be used. A wireless device 260 in accordance with one embodiment of the present invention, as shown in FIG. 36(B) may include a semiconductor nonvolatile memory 300, a user interface 305, a wireless interface 310, and an antenna 320. In various embodiments, antenna 320 may be a dipole, helical, global system for mobile (GSM) communication antenna, or the like. Components of the wireless device 260, which may be a processor-based device may further include a controller 275, an interface 280, a read only memory (ROM) 285, and a random access memory (RAM) 290 coupled via an internal bus 295, according to one embodiment of the present invention. The interface 280 may enable communication via the wireless interface 310 and the antenna 320 to a platform that may distribute content, e.g., the compiler-modified code, for example. Examples of the wireless device 260 may include mobile devices and/or cellular handsets that may be targeted for providing various subscriber services by commercial vendors or service providers. To manipulate such services or simply to activate or reconfigure a device, content, e.g., the compiler-modified code, for example, may be received via an over the air interface at the wireless device 260 in one embodiment.

Figure 37:
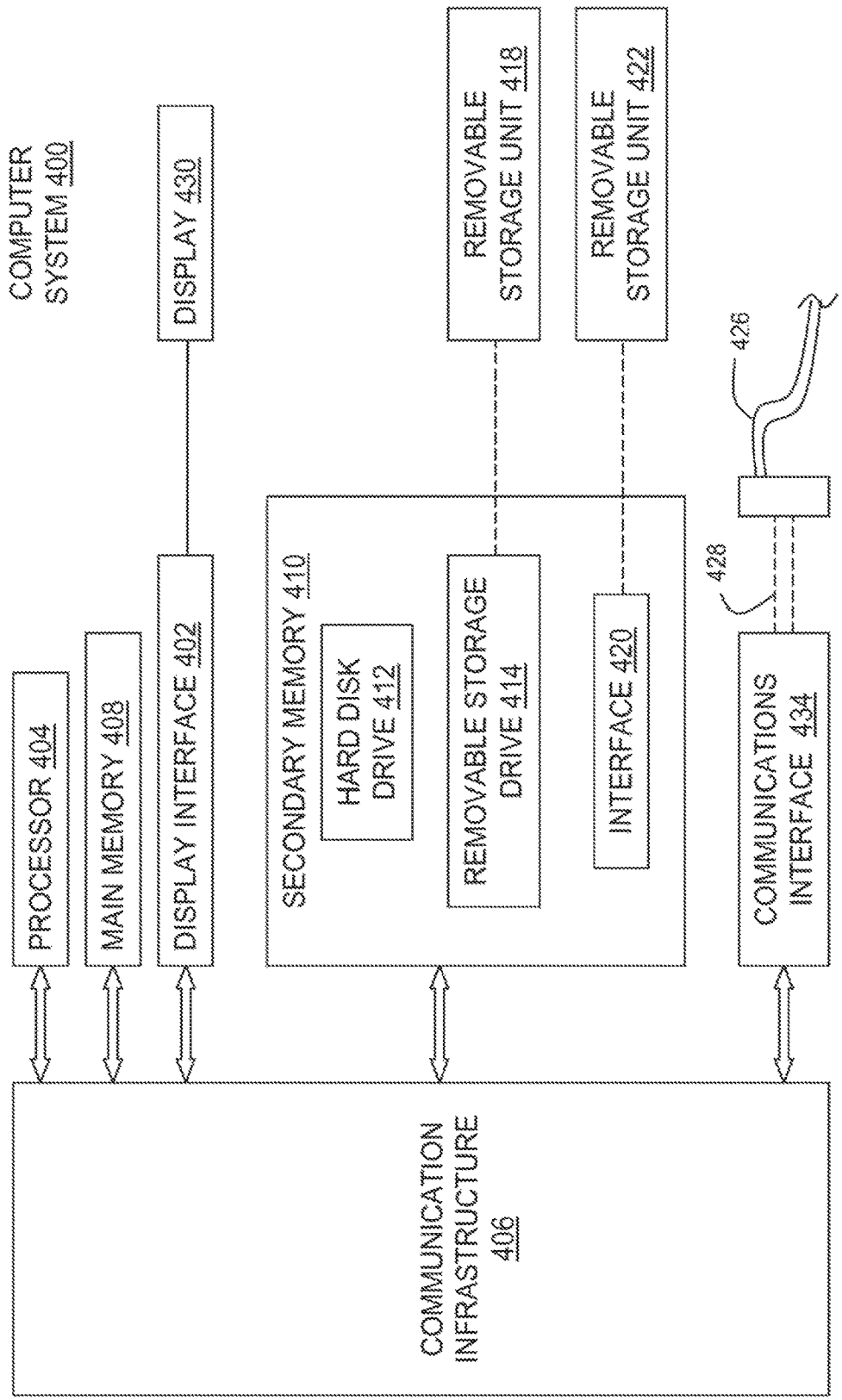
FIG. 37 is a schematic block diagram tor a system or related method of an embodiment of the present invention hi whole or in part.

Turning to FIG. 37, FIG. 37 is a functional block diagram for a computer system 400 for implementation of an exemplary embodiment or portion of an embodiment of present invention. For example, a method or system of an embodiment of the present invention may be implemented using hardware, software or a combination thereof and may be implemented in one or more computer systems or other processing systems, such as personal digit assistants (PDAs) equipped with adequate memory and processing capabilities. In an example embodiment, the invention was implemented in software running on a general purpose computer 400 as illustrated in FIG. 37. The computer system 400 may includes one or more processors, such as processor 404. The Processor 404 is connected to a communication infrastructure 406 (e.g., a communications bus, cross-over bar, or network). The computer system 400 may include a display interface 402 that forwards graphics, text, and/or other data from the communication infrastructure 406 (or from a frame buffer not shown) for display on the display unit 430. Display unit 430 may be digital and/or analog.

The computer system 400 may also include a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, a flash memory, etc. The removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other means for allowing computer programs or other instructions to be loaded into computer system 400. Such means may include, for example, a removable storage unit 422 and an interface 420. Examples of such removable storage units/interfaces include a program cartridge and cartridge interface (such as that found in video game devices), a removable memory chip (such as a ROM, PROM, EPROM or EEPROM) and associated socket, and other removable storage units 422 and interfaces 420 which allow software and data to be transferred from the removable storage unit 422 to computer system 400.

The computer system 400 may also include a communications interface 424. Communications interface 424 allows software and data to be transferred between computer system 400 and external devices. Examples of communications interface 424 may include a modem, a network interface (such as an Ethernet card), a communications port (e.g., serial or parallel, etc.), a PCMCIA slot and card, a modem, etc. Software and data transferred via communications interface 424 are in the form of signals 428 which may be electronic, electromagnetic, optical or other signals capable of being received by communications interface 424. Signals 428 are provided to communications interface 424 via a communications path (i.e., channel) 426. Channel 426 (or any other communication means or channel disclosed herein) carries signals 428 and may be implemented using wire or cable, fiber optics, blue tooth, a phone line, a cellular phone link, an RF link, an infrared link, wireless link or connection and other communications channels.

In this document, the terms "computer program medium" and "usable medium" are used to generally refer to media or medium such as various software, firmware, disks, drives, removable storage drive 414, a hard disk installed in hard disk drive 412, and signals 428. These computer program products ("computer program medium" and "computer usable medium") are means for providing software to computer system 400. The computer program product may comprise a computer useable medium having computer program logic thereon. The invention includes such computer program products. The "computer program product" and "computer useable medium" may be any computer readable medium having computer logic thereon.

Computer programs (also called computer control logic or computer program logic) are may be stored in main memory 408 and/or secondary memory 410. Computer programs may also be received via communications interface 424. Such computer programs, when executed, enable computer system 400 to perform the features of the present invention as discussed herein. In particular, the computer programs, when executed, enable processor 404 to perform the functions of the present invention. Accordingly, such computer programs represent controllers of computer system 400.

In an embodiment where the invention is implemented using software, the software may be stored in a computer program product and loaded into computer system 400 using removable storage drive 414, hard drive 412 or communications interface 424. The control logic (software or computer program logic), when executed by the processor 404, causes the processor 404 to perform the functions of the invention as described herein.

In another embodiment, the invention is implemented primarily in hardware using, for example, hardware components such as application specific integrated circuits (ASIC's). Implementation of the hardware state machine to perform the functions described herein will be apparent to persons skilled in the relevant art(s).

In yet another embodiment, the invention is implemented using a combination of both hardware and software.

In an example software embodiment of the invention, the methods described above maybe implemented in SPSS control language or C++ programming language, but could be implemented in other various programs, computer simulation and computer-aided design, computer simulation environment, MATLAB, or any other software platform or program, windows interface or operating system (or other operating system) or other programs known or available to those skilled in the art.

Further, it should be appreciated that software or code and data transferred via communications interface or other give modules may be in the form of signals which can be electronic, electromagnetic, optical or other signals capable of being received by communications interface or other modules. The invention is described in these terms for convenience purposes only. Further, it should be clear to one skilled in the art that the invention may be applied to a variety of computer or control systems. Such systems would include all manner of appliances having computer or processor control including telephones, mobile telephones, cellular telephones, televisions, multimedia, games, video games, television set top units, lap top computers, personal digital assistants (PDAs), satellites, mobile computers, media players, satellite set top, cable set top, digital rights management (DRM), digital rights adapters (DTAs;, music players, and automobiles or other land, air, or water vehicles.

Further, it should be appreciated that any of the modules, apparatuses, machines, sub-machines, components, sub-components, systems, sub-systems, software, hardware, firmware, means, drivers, engines, integrated circuits (ICs), and/or application specific integrated circuits (ASICs) disclosed herein may be interchangeable with one another to practice the invention.

It should be appreciated that any of the modules, apparatuses, machines, sub-machines, components, sub-components, systems, sub-systems, software, hardware, firmware, means, drivers, engines, integrated circuits (ICs), and/or application specific integrated circuits (ASICs) disclosed herein may be integrally or separately formed with one another.

It should be appreciated that any of the modules, apparatuses, machines, sub-machines, components, sub-components, systems, sub-systems, software, hardware, firmware, means, drivers, engines, integrated circuits (ICs), and/or application specific integrated circuits (ASICs) disclosed herein may be communicated locally and, or remotely with any user, operator, soldier, clinician, patient, astronaut, pilot, driver, technician, navigator, officer, employee, or machine, system, computer, processor. It should be appreciated that any of the modules, apparatuses, machines sub-machines, components, sub-components, systems, sub-systems, software, hardware, firmware, means, drivers, engines, integrated circuits (ICs), and/or application specific integrated circuits (ASICs) disclosed herein may be may be in communication via wireless and/or hardwire or other desirable and available communication means, systems and hardware.

It should be appreciated that any means-plus function arrangement technique may be replaced with or equivalent, to any module, apparatuses, machine, sub-machine, component, sub-component, system, sub-system, software, hardware, firmware, driver, engine, integrated circuit (ICs), and/or application specific integrated circuit (ASIC) disclosed herein.

Further, it should be clear to one skilled in the art that the invention may be applied to a variety of computer or control systems and their intended applications such as business policy, business assets, various applications such as data bases in enterprise data centers to consumer devices.

An aspect of various embodiments of the present invention may provide a number of novel and nonobvious features, elements and characteristics, such as but not limited thereto, the following:

A strong method for binding a software dynamic translation system (or any virtual machine) to an application, such that the application cannot be run without the SDT;

Dynamically generating and inserting opaque predicates into running code via a virtual machine;

Dynamically applying program obfuscation within a virtual machine;

A new approach to self-checksumming that is more difficult to circumvent than previously proposed techniques;

The various embodiments of the invention may be used to vaccinate an executable from attack via a virus. Since the executable is resistant even from manual modification, viruses cannot automatically insert copies of themselves;

Use of a strong encryption algorithm (such as an encryption algorithm like PKI, symmetric and asymmetric) to guarantee that application text cannot be modified to remove self checksumming guard code;

Code cache flushing to reduce dynamic information leakage and present an attacker (or attacking program) constantly morphing code. This morphing can prevent significant dynamic information leakage; and/or Using dynamic obfuscations specifically designed to keep an intelligent adversary from manually or programmatically merging code fragments from different executions of the program.

EXAMPLES AND EXPERIMENTAL RESULTS

Practice of the invention will be still more fully understood from the following examples and experimental results, which are presented herein for illustration only and should not be construed as limiting the invention in any way.

Example Nos. 1-16

See FIGS. 17-32, which pertain to specific exemplary (and non-limiting) embodiments as they may pertain to the approach illustrating the present invention computer method, system or computer program product embodiments of FIG. 1-16, respectively.

Example No. 17

An aspect of the embodiment of the present invention provides a way to protect an application using a virtual machine and a variety of mechanisms to make sure that the virtual machine cannot be modified. First, the application's code segment is encrypted. The encrypted text has code to checksum itself and the virtual machine. As the application requests new fragments to execute, the virtual machine decrypts portions of the application's code segment, applies anti-tampering (including dynamic self-checksumming) and obfuscation (including dynamic resistance to disassembly, dynamic control flow graph hiding, dynamic instruction isomorphisms, dynamic dead code, and dynamic code scheduling) techniques to prevent revealing the application's instructions during execution. Combined with frequent flushing of the virtual machine's fragment cache, this invention provides significantly stronger protection than statically-applied anti-tampering and obfuscation alone.

Most anti-tampering and obfuscation schemes require the application to be in an executable format. Whereas an aspect of the present invention leverages the security of a strongly encrypted binary by relying on Strata to perform just-in-time decryption.

Figure 33:
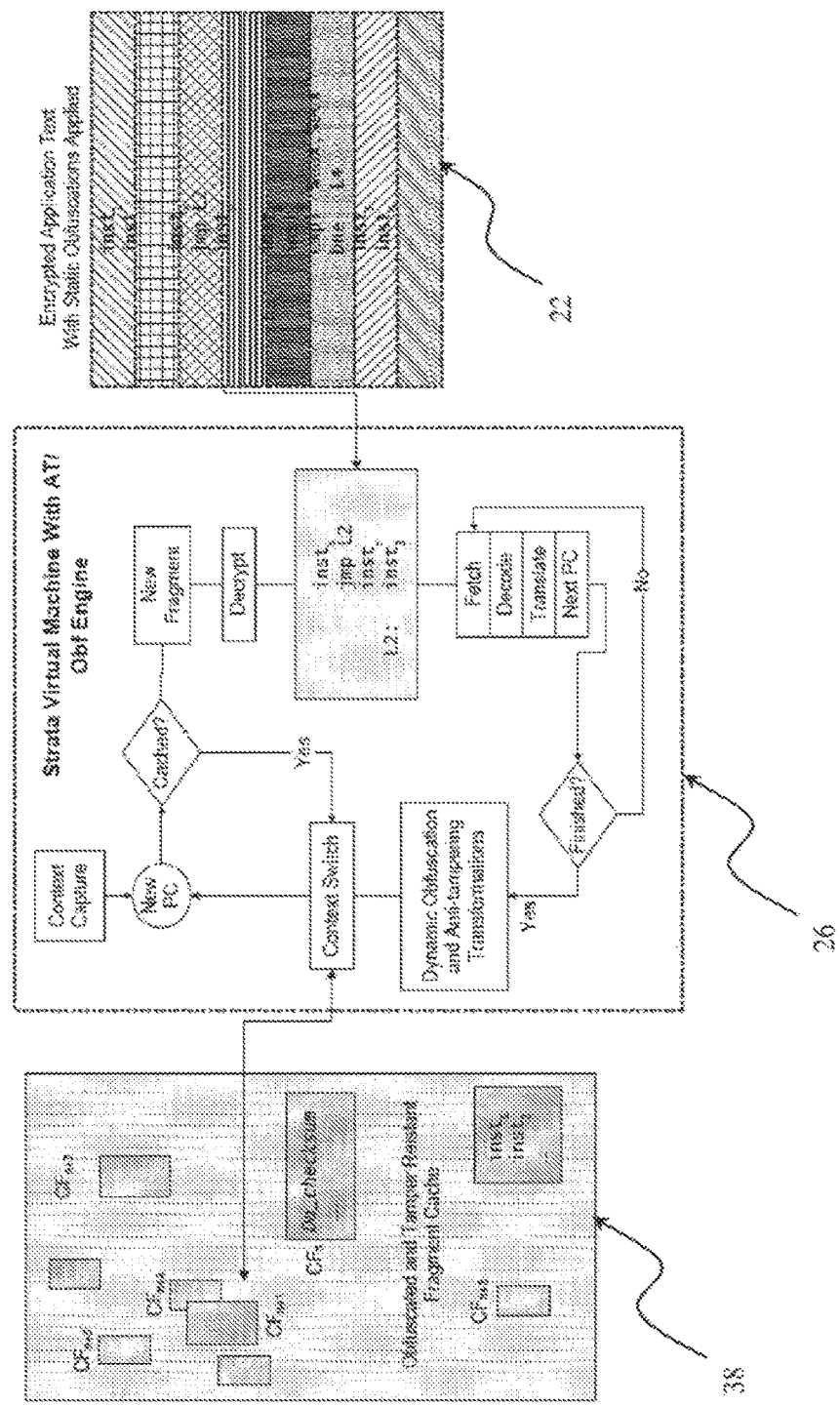
FIGS. 33-35 pertain to an exemplary embodiment of the present invention computer method or system (and related computer program product) as it pertains to increasing the tamper-resistance and/or obscurity of computer software code and related.

To provide strong assurance against any static attacks, the invention uses a proven strong encryption algorithm, such as AES [See 29, D. Lie, C, Thekkath, M. Mitchell, P. Lincoln, D. Boneh, J. Mitchell, and M. Horowitz. Architectural support for copy and tamper resistant software. ACM SIGPLAN Notices, 35(11):168 177, 2000, of which is hereby incorporated by reference in its entirety]. The entire text segment of the application is encrypted and remains that way for the entire execution of the program. When a new PC from the executable is requested to be translated, the block(s) containing the application code are copied to a buffer, and the buffer is decrypted, the requested instruction(s) are translated into the fragment cache, and the buffer is zeroed to prevent decrypted code from being present longer than necessary. FIG. 33 shows an illustration. In the figure, the "hatched" portion on the right represents the application which has been encrypted—prepared software code 22. Strata 26, of course, needs to run on the processor to decrypt the application, and cannot be encrypted. Likewise, the fragment cache 38 cannot be encrypted.

Strata itself can remain unencrypted as understanding Strata provides little understanding of the encrypted application. That is not to say that Strata does not need protection from tampering, but the understanding of Strata need not be kept secret. The fragment cache, however, can neither be encrypted (as it must contain instructions that run on standard hardware) nor can it be easily left unprotected as it contains the instructions needed to rim the application.

Like the fragment cache, the decryption key must be protected. If this key is available (dynamically or statically), then the adversary can scan memory to discover it, and easily decrypt the entire text segment and find out the contents of the original Strata must have the ability to decrypt the application text in order to run the program. However, in most circumstances it is not necessary to have a 128-bit encryption key unprotected in memory. The approach we use to protect the key is the same as outlined by Chow [See 5, S. Chow. P. Eisen, H. Johnson, and P. C. van Oorschot. White-box cryptography and an AES implementation. Proceedings of the Ninth Workshop on Selected Areas in Cryptography (SAC 2002), 2002. and See 20, H. E. Link and W. D. Neumann. Clarifying obfuscation: Improving the security of white-box encoding. Sandia National Laboratories, Albuquerque. N. Mex., downloaded from eprint.iacr.org/2004/025.pdf, 2004, both of which are hereby incorporated by reference herein in their entirety]. Basically, the constant key is propagated throughout the decryption routine, and random bijections are used at each step of the AES computation to make the key significantly harder to extract. Unfortunately, the key is not impossible to extract, but it does take significant computation time [See 3, O. Billet, H. Gilbert, and C. Ech-Chatbi. Cryptanalysis of a white box AES implementation, 2004, of which is hereby incorporated by reference herein in its entirety]. An embodiment of the invention may counter this weakness by having different portions of an application encrypted by different keys (represented by different patterning in FIG. 33). Some portions are encrypted repeatedly, to make it harder for the attacker to recover AES keys and decrypt the binary.

By having the key(s) protected in this manner, it is difficult for an attacker to extract the key(s) needed to decrypt the program. Furthermore, even if they can observe the decryption buffer, it is very difficult for an attacker to make small changes to the applications text segment. For example, if a decryption block contains a guard, and other instructions necessary for the program to run, the attack cannot convert the guard code to no-operation instructions without knowing the key used to encrypt that block. An embodiment of the invention can provably avoid the ability for an attacker to encrypt code to make small changes by using an encryption algorithm (e.g., symmetric and asymmetric).

For the encryption to be useful, the embodiment of the invention shall ensure that even if an adversary is able to decrypt the binary, which the binary may only run under Strata's control. To achieve this goal, the embodiment of the invention provides two mechanisms. The first is that there are self-checksumming guards within the encrypted executable, These guards not only checksum the application, but also checksum Strata's code. Secondly, the decrypted code need not execute properly on any standard machine. A variety of obfuscations are possible that would break normal code, but under Strata's control can be "undone" at translation times. For example, most call instructions specify a target address. The binary form could have an address f (addr) specified, and when Strata translates the instruction it applies $f^1$ (addr) to the address. There are an infinite number of one-to-one onto functions that could be applied to varying types of instructions: Opcodes could be shuffled, addressing mode bits could be shuffled, instruction lengths could be arbitrarily increased, the "next instruction" calculation could be changed, or a variety of difficult to undo transformations applied. Together, these techniques make it very difficult for an attacker to successfully run the program without Strata performing the translation.

Although the static protection model outlined above is quite strong, it may still be possible for an adversary to monitor the dynamic execution of the program. For example, the adversary may be able to snapshoot the contents of the fragment cache at any point. If the fragment cache is an exact (or close) representation of the entire program, the adversary can easily snapshot the program and perform standard attacks on the unprotected code.

To combat this problem, an embodiment of the invention applies a variety of dynamic protections.

A key to software dynamic translation Is the fragment cache and good locality of the code within it. Unfortunately, for anti-tampering and obfuscation, this locality is perhaps also SDT's greatest weakness. As the program executes, the program's encrypted code gets decrypted (as needed) and materializes in the fragment cache. If an adversary can capture the contents of the code cache just before program termination, they can get a snapshot of all the instructions needed to run the program. Luckily a solution is easy: flush the fragment cache periodically. Taken to the limit, the fragment cache could be flushed after each instruction is executed. Per instruction flushing would leak the minimum amount of information about the application as it executes; an adversary would never learn more than one application instruction from any inspection of memory. Unfortunately flushing the code cache after every instruction causes the system to spend most of its time flushing and regenerating fragments into the code cache, and very little time executing application instructions.

Figure 34:
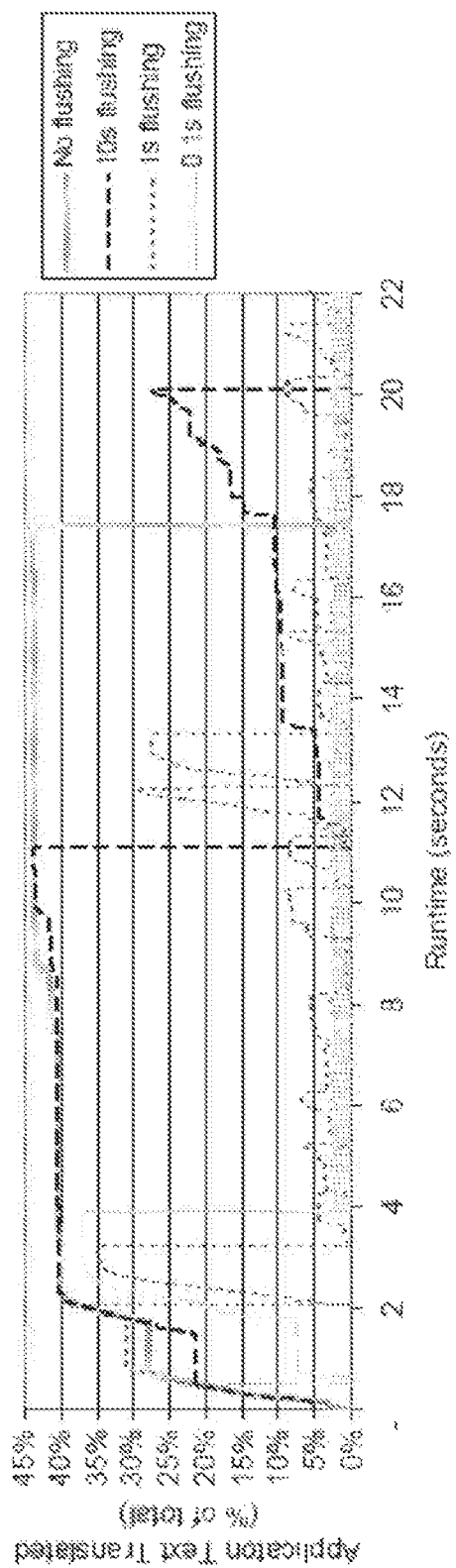

Instead, the code cache needs to be flushed at an interval in which little information is leaked about the application instructions, yet high efficiency is maintained. Flushing the code cache periodically hides information from an adversary, but if much of the application materializes in the code cache very quickly (say, in half the flushing interval or less), the amount of hiding may be minimal. To determine how much information hiding is occurring, consider FIG. 34. The figure shows the percentage of gcc's application text that is materialized into the code cache over the course of a single execution of the program. From the figure, we can conclude that even basic software dynamic translation keeps less than 45% of the application text from being visible. Flushing every 10 seconds does provide some benefit, much of the application is needed only during startup or shutdown, and is discarded shortly after 10 seconds into the execution of the program. Flushing every second does significantly better at keeping the application's text hidden. For a majority of the program's execution, loss than 10% of the application's text resides in the fragment cache! Flushing every 0.1 seconds does even better; most of the time less than 3% of gcc's text is visible in the code cache.

Figure 35:
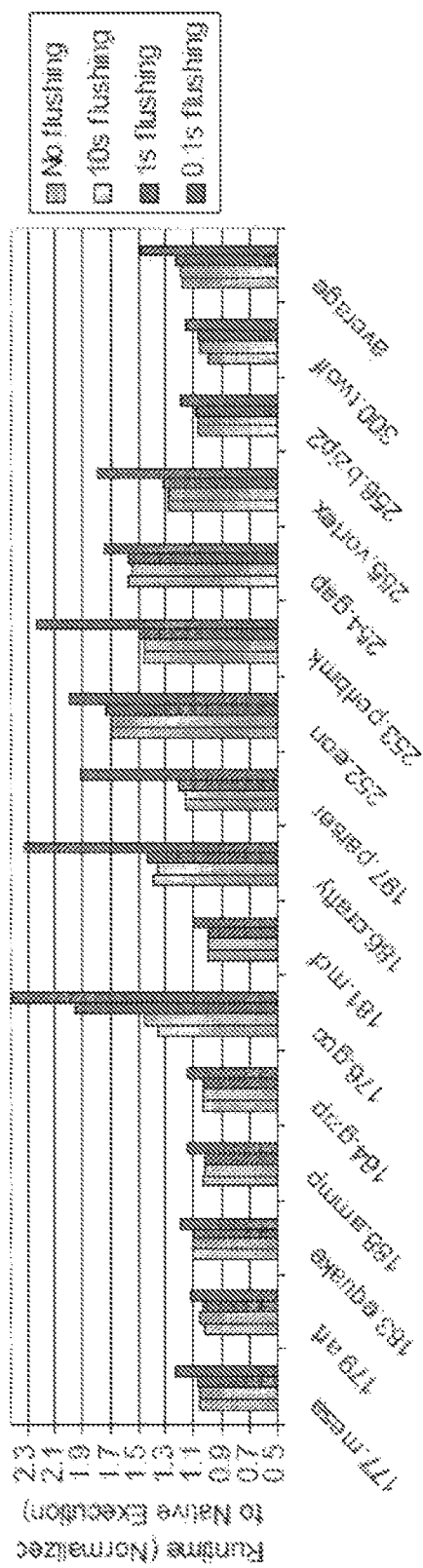

We have performed preliminary measurements on the cost of flushing the fragment cache, shown in FIG. 35. The graph shows the performance of our SDT system, Strata, for the C benchmarks in the SPEC2000 benchmark suite. The first bar shows the overhead with no fragment cache flushing. Overhead averages about 18% slower than native execution. The next three bars show flushing the cache every 10 seconds, 1 second, and 0.1 seconds. Overhead averages 19%, 23%, and 47% respectively. Obviously, blindly flushing every 10th of a second provides significant overhead, but results are encouraging that Hushing every 1 second provides less than 5% additional overhead. Furthermore, we believe that flushing intelligently may have additional benefits. For example, by selectively flushing only fragments that have not been used recently we can hide dynamic information, from an adversary without impacting performance. Also, we expect (selectively) flushing the code cache after a program phase is complete can hide information with little performance loss.

In our prototype implementation, the operating system must send a signal to the application in order for Strata to know that the code cache should be flushed. A malicious operating system could bypass the flushing mechanism by not delivering the signal Other techniques, such as having fragments "expire" after being executed a predetermined number of times can provide a stronger guarantee about ensuring the code cache is flushed after a certain number of fragments are executed.

Flushing the code cache can keep any one snapshot from revealing much about the application, but an adversary may take multiple snapshots of memory and attempt to piece together the contents of the entire application. To prevent an adversary from being able to easily piece together the code necessary to run the application. Strata can apply obfuscating transformations at fragment translation time. To serve as the base of a variety of dynamic transformations, we introduce the concept of a dynamic opaque predicate.

An opaque predicate is a predicate that is known at compile-time, but is very difficult (NP-Hard) to determine statically once compilation is complete. Although these predicates provide strong resistance to static attacks, they provide little strength against dynamic attacks because once an opaque predicate is calculated dynamically, an adversary knows all the information about the predicate. By creating an opaque predicate that is known at fragment creation time, or a dynamic opaque predicate, it becomes significantly more difficult for an adversary to know which of the conditional branches are highly biased simply to provide obfuscating transformations, and which is part of the program.

Upon the concept of a dynamic opaque predicate, the dynamic translation system can apply dynamic versions of many static obfuscation techniques. Some of the most powerful are disassembly resistance and control flow graph obfuscation. One way to obfuscate the code cache is to make it difficult to determine which portions of the code cache are instructions and which portions are not. By inserting a dynamically generated opaque predicate, the translator can use the never taken direction to 1) insert instructions that branch to a location in the code cache that is not actually a valid instruction, or 2) insert partial "instructions." Inserting this information will make an automatic disassembler become out of synchronization with the actual instruction stream. By branching to a non-instruction, a recursive-descent disassembler soon has trouble determining which instructions are actual branch targets and which ones are not. By inserting partial "instructions", a linear scan disassembler quickly becomes out of sync.

If the code that is designed to confuse disassemblers has predictable placement or makes up only a small portion of the fragment cache, the security measures can easily be thwarted. On the other hand, if calculating the predicate and performing the branch is done too frequently, performance can suffer. One technique that may be useful is to place more security in less frequently executed fragments.

Dynamic opaque predicates can provide an efficient mechanism to make it more difficult to automatically disassemble the fragment cache. However, it is also important to make it difficult to extract the program's control flow graph. If each rematerialization of the fragment cache has the same control flow graph, it may be possible for an adversary to use the control flow information to stitch together many fragment, cache snapshots to gain complete knowledge of the application. To avoid any control flow graph information leakage, a technique similar to disassembly resistance is used. The invention uses a dynamically generated opaque predicate to provide a mechanism in which each fragment appears to jump to many other fragments, but only certain paths can actually be taken. These paths will contain conditional jumps, unconditional jumps, calls (including argument passing code), hard to analyze indirect jumps, returns (including stack tear-down code), and combinations of these techniques.

Such a technique provides a good, way to provide false information about the control flow graph, but does not allow the real control flow graph to be obscured. It is possible to convert some direct jumps and calls into indirect versions. By having the target of the indirect branch calculated using opaque predicates to obfuscate the actual target, we can force the adversary to observe the execution of some branches in order to accurately determine the control flow graph for even a single fragment cache snapshot.

Compiler writers have long known that there are many efficient instruction sequences to achieve a goal. For example, on the IA-32, the following instructions are equivalent: a) add %eax,#1 b) sub %eax,#−1 and c) lea %eax,%eax+1 all add the constant 1 to the register eax. There are even more options if the constant 1 or −1 is stored in memory and a complex addressing mode is used instead of an immediate addressing mode. A dynamic translation system can use an instruction set's variety to generate each fragment using different instruction opcodes and addressing modes. Since an application's instructions will be translated differently each time, it becomes more difficult for an adversary to piece together multiple fragment cache snapshots to form a complete picture of the application's code.

Unfortunately, an adversary may try to produce a canonical form for each instruction. Our example add instructions could all be converted to eax=eax+1, for example. To combat this approach, the translator can perform a many-to-many transformation on several data-dependent instructions. By moving operations between instructions it becomes significantly more difficult to form any canonical form that is equivalent to corresponding code from another fragment cache snapshot. To solve this problem, an adversary must form data dependence graphs for each fragment in a snapshot of the code cache, and try to match graphs from each snapshot. This is a difficult, NP-Hard problem for even two snapshots. With frequent flushing, there may be hundreds or thousands of code cache snapshots that need to be matched. Thus, undoing the isomorphism transformations would be extremely difficult, if not intractable.

Although many-to-many instruction isomorphisms can provide a significant resistance to revealing the application's instruction sequence, they may also be expensive to calculate or more expensive during execution. Careful consideration is needed when deciding how and when to utilize instruction isomorphisms as well as how to efficiently calculate them. One promising avenue of research is to pre-calculate the most needed many-to-many transformations at compile time and store them in the executable in encrypted form. The translator can carefully look up these isomorphisms and apply them with minimal overhead.

Compilers spend significant effort trying to eliminate dead (never executed) or useless code. An SDT system can carefully insert dead or useless code for the purposes of obfuscation. For example, the translator can insert instructions from other pails of the application to make it hard to line up fragments from multiple fragment cache snapshots. Dead code can be inserted in a critical algorithm to make the dataflow or control flow harder to understand. Furthermore, non-working versions of a critical algorithm can be intermixed with other code that, is less important in order to distract an adversary into analyzing the wrong portions of code or being unable to determine which version of the code is the correct version.

Another way to make fragment cache snapshots appear different and force an adversary to perform NP-hard data dependence graph matching is to dynamically reschedule the code. The dynamic translation system can perform traditional instruction scheduling on each fragment as it is created, but use different evaluation criteria (including a pseudo-random number generator) for making scheduling decisions during each time frame. Perhaps of more importance is that any dynamically generated code for obfuscation or anti-tampering will be dispersed within the application's instructions.

Dynamically generating and using opaque predicates and other obfuscation* can make it more difficult for an adversary to understand how many snapshots of the fragment cache may work together, but does not directly protect the fragment cache from changes being applied. To provide more direct protection for the fragment cache, the invention alters Strata to insert self-checksumming code into the fragment cache. This code performs checksums on the fragment cache directly. Like static self-checksums, the code in the fragment cache calculates and verifies that portions of the code (the original application's code, Strata's code, and most importantly code within the fragment cache) are unmodified. Also like static self checksumming, when a guard fails, it must alter the program's execution in such a way that the program is no longer usable. However, unlike static self checksumming, since guards are generated dynamically and randomly during dynamic translation, revealing the guard's location once a failure occurs is of little concern: the guard will be different on future executions of the program. An important aspect may be, however, that the guard cannot be revealed until it has failed, thus it must not simply execute an instruction sequence to abort the program. Instead, the guard will use a dynamic opaque predicate to help calculate an indirect branch target, such that it is not clear that an abort is going to happen until the guard fails.

Considering the importance of tamper resistance, much work has been done in this area. Perhaps the most widely known is self-checksumming. Horne, et al. describe how guards or testers are inserted throughout the application [See 12, B. Horne. L. R. Matheson, C. Sheehan, and R. E, Tarjan. Dynamic self-checking techniques for improved tamper resistance. Digital Rights Management Workshop, pages 141-159, 2001, of which is hereby incorporated by reference in its entirety.]. Each guard checksums a portion of the application's code (including other guards) and fails subtly if a modification is detected. Wurster. et al. quickly noted a simple work around to the guards: separate program and data memory [See 34, G. Wurster, P C van Oorschot, and A. Somayaji. A generic attack on checksumming-based software tamper resistance. Proceedings of the 2005 IEEE Symposium on Security and Privacy, pages 127-138, 2005, and See 32, P. C. van Oorschot, A. Somayaji, and O. Wurster. Hardware-assisted circumvention of self-hashing software tamper resistance, IEEE Transactions on Dependable and Secure Computing, 2(2):82-92,2005, both of which are hereby incorporated by reference in their entirety.]. Giffin noted a way to prevent this attack with the addition of self-modifying guard code [See 10, J. T, Giffin, M. Christodorescu, and L. Kroger. Strengthening software self-checksumming via self-modifying code. Proceedings of the 21st Annual Computer Security Applications Conference, pages 23-32, 2005, of which is hereby incorporated by reference in its entirety]. Neither technique, however, provides resistance to dynamic techniques that identify guards and remove them. Indeed, the self-modifying code may make the guards harder to disguise as most programs do not use any form of self modification.

Many other tamper-resistance techniques rely on special hardware [see 19, D. Lie, C. Thekkath, M. Mitchell, P. Lincoln, D. Boneh, J. Mitchell, and M. Horowitz. Architectural support for copy and tamper resistant software. ACM STOP LAN Notices, 35(11):16H-I77. 2000, See 24, T. Maude and D, Maude. Hardware protection against software piracy. Communications of the ACM, 27(9):950 959, 1984, Sec 1, D. J. Albert and S. P. Morse. Combatting software piracy by encryption and key management. Computer. 17(4):68-73, 1984, See 27, A. Seshadri, M. Luk. E. Shi, A. Perrig, L. van Doorn, and P. Khosla. Pioneer: verifying code integrity and enforcing untampered code execution on legacy systems. Proceedings of the 20th ACM symposium on Operating Systems Principles, pages 1-16, 2005, and See, 28, G. F. Suh, D. Clarke, B. Gassend, M. van Dijk, and S. Devadas. AEGIS: architecture for tamper-evident and tamper-resistant processing. Proceedings of the 17th Annual International Conference on Supercomputing, pages 160-171, 2003, all of which are hereby incorporated by reference in their entirety]. For example, Suh, et al. propose hardware to enable temper-evident software [See 28, G. E. Suh, D. Clarke, B. Gassend, M. van Dijk, and S. Devadas. AEGIS: architecture for tamper-evident and tamper-resistant processing. Proceedings of the 17th Annual International Conference on Supercomputing, pages 160-171,2003, of which is hereby incorporated by reference in its entirety]. The Pioneer system proposed by Seshadri, et al. requires that the system have secure and reliable network connections and all details of the system are known at software creation time [See 27, A. Seshadri, M, Luk, E. Shi, A. Perrig, L, van Doorn, and P. Khosla. Pioneer: verifying code integrity and enforcing untampered code execution on legacy systems. Proceedings of the 20th AC-M symposium on Operating Systems Principles, pages 1-16, 2005, of which is hereby incorporated by reference in its entirety]. Although these systems may provide stronger security guarantees, the threat model requires more knowledge than our threat model requires. Namely, the threat model requires some form of hardware. Unfortunately, it is non-trivial to adapt such systems to the extremely challenging threat model we believe is necessary for real-world protection.

Encrypting the binary to provide resistance to tampering, obfuscation. and anti-piracy was proposed long ago but was believed to require hardware for efficiency purposes [See 19, D. Lie, C. Thekkath, M. Mitchell, P. Lincoln, D. Boneh, J. Mitchell, and M. Horowitz. Architectural support for copy and tamper resistant software. ACM SIGPLAN Notices, 35(11):168-177, 2000, and See 24, T, Maude and D. Maude. Hardware protection against software piracy. Communications of the ACM, 27(9):950-959, 1984, both of which are hereby incorporated by reference in their entirety]. The use of ultra-efficient software dynamic translation has enabled us to use encryption to prevent code injection attacks with little overhead [See 13, Wei Hu, Jason D. Hiser, Daniel Williams, Adrian Filipi, Jack W. Davidson, David Evans, John C. Knight, Anh Nguyen-Tuong, and Jonathan Rowanhill. Secure and practical defense against code-injection attacks using software dynamic translation. In Proceedings of the 2nd International Conference on Virtual Execution Environments, pages 2-12, ACM Press New York, N.Y., USA, 2006, of which is hereby incorporated by reference in its entirety]. Our proposed techniques use SDT to help provide a system that uses encryption without sacrificing efficiency.

The largest, portion of tamper-resistance research involves making the program difficult to understand. It is widely believed that some level of understanding of the program is necessary in order to make meaningful modifications. For example, if self-checksumming is used, it is necessary to understand which instructions are needed for the self checksumming and which are needed for execution of the program before changes can be made. Techniques that make it difficult to understand a program may actually be best described as obfuscations, Previous obfuscation work can be classified into two types: static and dynamic.

Static obfuscation techniques aim to make the program difficult to statically analyze [See 8, C. Collberg. C. Thomborson, and D. Low. Manufacturing cheap, resilient, and stealthy opaque constructs, in Proceedings of the 25th ACM SIGPLAN-SIGACT Symposium on Principles of Programming Languages, pages 184-196. ACM Press New York, N.Y., USA, 1998, See 17, C. Kruegel. W. Robertson, F. Valeur, and G. Vigna. Static disassembly of obfuscated binaries. In Proceedings of the 13th USENIX Security Symposium, Berkeley, Calif., USA. 2004. USENIX Association. See 22, C. Linn, S. Debray. and J. Kececioglu. Enhancing software tamper-resistance via stealthy address computations. Proceedings of the 19th Annual Computer Security Applications Conference (ACSAC 2003), 2003, and See 33, C. Wang, J. Hill, J. Knight, and J. Davidson. Software tamper resistance: Obstructing static analysis of programs. University of Virginia, Charlottesville, Va., 2000, all of which are hereby incorporated by reference in their entirety]. This can be done by using problems that are known to be NP-Hard to solve statically. One example is using alias analysis to create opaque constructs [See 8, C. Collberg, C. Thomborson, and D. Low. Manufacturing cheap, resilient, and stealthy opaque constructs. In Proceedings of the 25th ACM SIGPLAN-SIGACT Symposium on Principles of Programming Languages, pages 184-196. ACM Press New York, N.Y., USA, 1998, of which is hereby incorporated by reference in its entirety] to prevent easy disassembly of the program [See 21, C. Linn and S. Debray. Obfuscation of executable code to improve resistance to static disassembly. Proceedings of the 10th ACM conference on Computer and Communications Security, pages 290-299, 2003, of which is hereby incorporated by reference in its entirety.]. Another example is using aliases to obscure the program's control flow graph [See 33, C. Wang, J. Hill, J. Knight, and J. Davidson. Software tamper resistance: Obstructing static analysis of programs. University of Virginia, Charlottesville, Va., 2000. of which is hereby incorporated by reference in its entirety.]. Although these techniques provide very powerful guarantees about the information that can be gamed from static analysis, they provide little strength against attacks that observe the execution of the program. For example, tracing the instruction sequence with a simulator provides exact information for disassembling the program. An aim was to provide resistance against all forms of attacks, including attacks that combine static and dynamic information.

Another class of obfuscation techniques are dynamic obfuscations which make static attacks difficult by using self-modifying code to obscure where the program s instructions are located [See 23, M. Madou, R. Anckaert, P. Moseley, S. Debray. B. De Sutter, and K. De Bosschere. Software protection through dynamic code mutation. Proceedings of the 6th International Workshop on Information Security Applications (WISA, pages 194 -206,2005. See 2, D. Aucsmith. Tamper resistant software: an implementation. In Proceedings of the First International Workshop on Information Hiding, pages 317-333. Springer-Verlag London, UK., 1996, and See 15, V. Kanzaki, A. Monden, M, Nakamura, and K. Matsumoto. Exploiting self-modification mechanism for program protection. Proceedings of the 27th Annual International Computer Software and Applications Conference, pages 170-179, 2003, all of which are hereby incorporated by reference in their entirety.]. One example uses edit scripts [See 23, M. Madou, B. Anckaert, P. Moseley, S. Debray, B. De Sutter, and K. De Bosschere. Software protection through dynamic code mutation. Proceedings of the 6th International Workshop on Information Security Applications (WISA, pages 194-206, 2005, of which is hereby incorporated by reference in its entirety.]. The edit scripts are run by an editing engine that patches functions just before execution and hides the function after execution. For efficiency, the replacement is done "in place." Again, an adversary that is observing the dynamic instruction trace may be able to remove the editing scripts and place the correct functions in the proper place. Our work strives to make this impossible by continually performing obfuscations and applying tamper-resistant guards. Perhaps the strongest, dynamic technique was proposed by Aucsmith, et al. [See 2, D. Aucsmith. Tamper resistant software: an implementation. In Proceedings of the First International Workshop on Information Hiding, pages 317-333. Springer-Verlag random UK, 1996, of which is hereby incorporated by reference in its entirety.]. This technique involves the creation and execution of "integrity verification kernels" that each use and generate cryptographic keys. Multiple threads are executed in a nondeterministic manner to make it difficult for an adversary to trace the execution of the program. Unfortunately, it is unclear how to implement this technique, especially if program efficiency is a concern.

An interesting, but related subject is software aging or evolution [See 6, F. B. Cohen. Operating system protection through program evolution. Computers and Security, 12(6): 565-584,1993, and See 14, M. Jakobsson and M. Reiter. Discouraging software piracy using software aging. Digital Rights Management Workshop, pages 1-12. 2001. both of which are hereby incorporated by reference in their entirety.]. Software aging techniques attempt to mitigate the cost of piracy by continually updating software with new cryptographic keys. Pirated software fails to get the updates, and soon becomes significantly less useful, or incurs large performance overhead. Unfortunately, these techniques are only applicable to document-centric applications. Furthermore, by themselves, they provide little resistance to tampering with a system.

A description of anti-tampering, obfuscation, and de-obfuscation technology is provided in cited references [See 25, G. Naumovich and N. Memon. Preventing piracy, reverse engineering, and tampering. Computer, 36(7):64-71, 2003, See 9, C S Collberg and C Thomborson. Watermarking, tamper-proofing, and obfuscation-tools for software protection. IEEE Transactions on Software Engineering, 28(8):735-746, 2002, See 7, C. Collberg, C. Thomborson, and D. Low. A taxonomy of obfuscating transformations. University of Auckland Technical Report, 170, 1997, See 23, M. Madou, B. Anckaert, P. Moseley, S. Debray, B. De Sutter, and K. De Bosschere. Software protection through dynamic code mutation. Proceedings of the 6th International Workshop on Information Security Applications (WISA, pages 194-206. 2005, and See 31, S K Udupa, S K Debray, and Matias Madou. Deobfuscation: Reverse engineering obfuscated code. Reverse Engineering, 12th Working Conference on, pages 45-54, 2005, all of which are hereby incorporated by reference in their entirety.].

The following patents, applications and publications as listed below are hereby incorporated by reference in their entirety herein.

The devices, systems, compositions, computer program products, processors, means and methods of various embodiments of the Invention disclosed herein may utilize aspects disclosed in the following references, applications, publications and patents and which are hereby incorporated by reference herein in their entirety:

1. U.S. Pat. No. 7,366,914, Apr. 29, 2008, "Source Code Transformation Based on Program Operators", Graunke, Gary L.
2. U.S. Patent Application Publication 2003/0018906 A1, Jan. 23, 2003, "Method and System for Protecting Software Applications Against Static and Dynamic Software Piracy Techniques", Smith, Michael D.
3. U.S. Patent Application Publication 2005/0050355 A1, Mar. 3, 2005, "Securing Distributable Content Against Hostile Attacks", Graunke, Gary L.
4. European Patent Application No. ep 1 947 584 al, Jul. 23, 2007, "Obfuscating Computer Program Code", Bjora, Johansson.
5. International Application No. PCT/CA02/000754, Nov. 28, 2002, "Tamper Resistant Software Encoding and Analysts", Chow, Stanley T.
6. International Application No. PCT/CA08/000333, Aug. 28, 2008, "System and Method for Interlocking to Protect Software-Mediated Program and Device Behaviours", Johnson, Harold J.
7. International Application No. PCT/CA08/000331, Feb. 21, 2008, "The System and Method for Interlocking to Protect Software-Mediated Program and Device Behaviours", Johnson, Harold Joseph.
8. U.S. Patent Application Publication US 2003/0163718, Aug. 28, 2003, "Tamper Resistant Software-Mass Data Encoding" Johnson, Harold J.
9. U.S. Patent Application Publication US 2003/0221121, Nov. 27, 2003, "Tamper Resistant Software Encoding". Chow, Stanley T.
10. U.S. Pat. No. 6,594,761, Jul. 15, 2003, "Tamper Resistant Software Encoding", Chow. Stanley T.
11. U.S. Pat. No. 6,770,114, Aug. 17, 2004, "Tamper Resistant Software Control Flow Encoding", Chow, Stanley T,
12. U.S. Pat. No. 6,842,862, Jan. 11, 2005, "Tamper Resistant Software Encoding", Chow, Stanley T.
13. U.S. Pat. No. 7,325,141, Jan. 29, 2008, "Method and System for Secure Access", Chow. Stanley T.
14. U.S. Pat. No. 7,350,085, Mar. 25, 2008, "Tamper Resistant Software-Mass Data Encoding". Johnson, Harold J.
15. U.S. Patent Application Publication No. US 2003/0163718, Aug. 28, 2003, "Tamper Resistant Software-Mass Data Encoding", Johnson, Harold J.
16. International Application No. PCT/CA99/00633, Feb. 24, 2000, "Internet Authentication Technology", Chow. Stanley T.
17. International Application No. PCT/US05/012835, Nov. 24, 2005, "System and Method for Creating Tamper-Resistant Code", Baston, James D.
18. International Application No. PCT/US06/026932, Jan. 18, 2007, "Method and System for Software Protection Using Binary Encoding", Davidson, Jack.
19. U.S. Patent Application Publication No. US 2005/0246554, Nov. 3, 2005, "System and Method for Creating Tamper-Resistant Code", Batson, James D.
20. U.S. Patent Application Publication US 2006/0048223, Mar. 2, 2006, "Method and System for Providing Tamper-Resistant Software", Lee, Michael Chin-To.
21. U.S. Patent Application Publication US 2006/0107070, May 18, 2006, "Method and System tor Secure Computational Outsourcing and Disguise", Rice, John R.
22. U.S. Pat. No. 6,957,341, Oct. 18, 2005, "Method and System for Secure Computational Outsourcing and Disguise", Rice, John R.
23. U.S. Pat. No. 6,006,328, Dec. 21, 1999, "Computer Software Authentication, Protection and Security System", Drake, Christopher N.
24. U.S. Pat. No. 6,941,463, Sep. 6, 2005, "Secure Computational Outsourcing Techniques", Atallah, Mikhail J.
25. U.S. Patent Application Publication US 2006/0031686, Feb. 9, 2006, "Method and System for Tamperproofing Software", Atallah, Mikhail J.
26. U.S. Pat. No. 8,842,862, Jan. 11, 2005, "Tamper Resistant Software Encoding", Chow, Stanley T.
27. Dec. 31, 2007, "Protecting Media Players via Software Dynamic Translation", Hiser, Jason D.
28. "Strata: A Software Dynamic Translation Infrastructure", Scott, Kevin and Davidson, Jack.

The following references as listed below and throughout this document are hereby incorporated by reference herein in their entirety:

[1] D. J. Albert and S. P. Morse. Combatting software piracy by encryption and key management. *Computer,* 17(4): 68-73, 1984.

[2] D. Aucsmith. Tamper resistant software: an implementation. In *Proceedings of the First International Workshop on Information Hiding,* pages 317-333. Springer-Verlag London. UK, 1996.

[3] O. Billet, U. Gilbert, and C. Ech-Chatbi. Cryptanalysis of a white box AES implementation, 2004.

[4] H. Chang and M. J. Atallah. Protecting software code by guards. *Proceedings of the ACM Workshop on Security and Privacy in Digital Rights Management,* pages 160-175, 2000.

[5] S. Chow, P. Eisen, H. Johnson, and P. C. van Oorschot. White-box cryptography and an AES implementation. *Proceedings of the Ninth Workshop on Selected Areas in Cryptography (SAC 2002),* 2002.

[6] F. B. Cohen. Operating system protection through program evolution. *Computers and Security,* 12(6):565-584, 1993.

[7] C. Collberg, C. Thomborson, and D. Low. A taxonomy of obfuscating transformations. *University of Auckland Technical Report,* 170, 1997.

[8] C. Collberg, C. Thomborson, and D. Low. Manufacturing cheap, resilient, and stealthy opaque constructs. In *Proceedings of the 25th ACM SIGPLAN-SIGACT Symposium on Principles of Programming languages,* pages 184-196. ACM Press New York, N.Y., USA, 1998.

[9] C S Collberg and C Thomborson. Watermarking, tamper-proofing, and obfuscation-tools for software protection. *IEEE Transactions on Software Engineering,* 28(8): 735-746, 2002.

[10] J. T. Giffin, M. Christodorescu, and L. Kruger. Strengthening software self-checksumming via self-modifying code, *Proceedings of the 21st Annual Computer Security Applications Conference,* pages 23-32, 2005.

[11] Jason D. Riser, Daniel Williams, Adrian Pilipi, Jack W. Davidson, and Bruce Childers, Evaluating fragment creation policies for SDT systems. In *Proceedings of the Second International Conference on Virtual Execution Environments,* Ottawa, Canada, June 2006. ACM Press.

[12] B. Home, L. R. Matheson, C. Sheehan, and R. E. Tarjan. Dynamic self-checking techniques for improved tamper resistance. *Digital Rights Management Workshop,* pages 141-159, 2001.

[13] Wei Hu, Jason D. Hiser, Daniel Williams, Adrian Filipi, Jack W. Davidson, David Evans, John C. Knight, Anh Nguyen-Tuong, and Jonathan Rowanhill. Secure and practical defense against code-injection attacks using software dynamic translation. In *Proceedings of the 2nd International Conference on Virtual Execution Environments*, pages 2-12. ACM Press New York, N.Y., USA, 2006.

[14] M. Jakobsson and M. Reiter. Discouraging software piracy using software aging. *Digital Rights Management Workshop*, pages 1-12,2001.

[15] Y. Kanzaki, A. Monden, M. Nakamura, and K. Matsumoto. Exploiting self-modification mechanism for program protection. *Proceedings of the 27th Annual International Computer Software and Applications Conference*, pages 170-179,2003.

[16] Gaurav S. Kc, Angelos D. Keromytis, and Vassilis Prevelakis. Countering code-injection attacks with instruction-set randomization. In *Proceedings of the 10th ACM Conference on Computer and Communications Security*, pages 272-280, New York. N.Y., USA, 2003. ACM Press.

[17] C. Kruegel, W. Robertson, F. Valeur, and G. Vigna. Static disassembly of obfuscated binaries. In *Proceedings of the 13th USE NIX Security Symposium*, Berkeley, Calif., USA, 2004. USENIX Association.

[18] B. A. Kuperman, C. E. Brodley, H, Ozdoganoglu, T N Vijaykumar, and A. Jalote. Detection and prevention of stack buffer overflow attacks. *Communications of the ACM*, 48(11):50-56, 2005.

[19] D. Lie, C. Thekkath, M. Mitchell, P. Lincoln, D. Boneh, J. Mitchell, and M. Horowitz. Architectural support for copy and tamper resistant software. *ACM SIGPLAN Notices*, 35(11168-177, 2000.

[20] H. E. Link and W. D. Neumann. Clarifying obfuscation: Improving the security of white-box encoding. Sandia National laboratories, Albuquerque, N. Mex., downloaded from eprint.iacr.org/2004/025.pdf, 2004.

[21] C. Linn and S. Debray. Obfuscation of executable code to improve resistance to static disassembly. *Proceedings of the 10th ACM conference on Computer and Communications Security*, pages 290-299, 2003.

[22] C. Linn, S. Debray, and J. Kececioglu. Enhancing software tamper-resistance via stealthy address computations. *Proceedings of the 19th Annual Computer Security Applications Conference (ACSAC 2003)*, 2003.

[23] Madou, B. Anckaert, P. Moseley, S. Debray, B. De Sutter, and K. De Bosschere. Software protection through dynamic code mutation. *Proceedings of the 6th International Workshop on Information Security Applications (WISA*, pages 194-206, 2005.

[24] T, Maude and D. Maude. Hardware protection against software piracy. *Communications of the ACM*, 27(9): 950-959, 1984.

[25] O. Naumovich and N. Memon. Preventing piracy, reverse engineering, and tampering. *Computer*, 36(7):64-71, 2003.

[26] Kevin Scott and Jack Davidson. Strata: A software dynamic translation infrastructure. In *IEEE Workshop on Binary Translation*, September 2001.

[27] A. Seshadri, M. Luk, E. Shi, A. Perrig, L. van Doorn, and P. Khosla. Pioneer: verifying code integrity and enforcing untampered code execution on legacy systems. *Proceedings of the 20th ACM symposium on Operating Systems Principles*, pages 1-16, 2005.

[28] G. E. Suh, D. Clarice, B. Gassend, M. van Dijk, and S. Devadas. AEGIS: architecture for tamper-evident and tamper-resistant processing. *Proceedings of the 17th Annual International Conference on Supercomputing*, pages 160-171, 2003.

[29] Joan Daemen and Vincent Rijmen, "The Design of Rijndael: AES—The Advanced Encryption Standard." Springer-Verlag, 2002.

[30] D. L. C. Thekkath, M. Mitchell, P. Lincoln, D. Boneh, J. Mitchell, and M. Horowitz. Architectural support for copy and tamper resistant software. *ACM SIGARCH Computer Architecture News*, 28(5):168-177, 2000.

[31] S K Udupa, S K Debray, and Matias Madou. Deobfuscation: Reverse engineering obfuscated code. *Reverse Engineering, 12th Working Conference on*, pages 45-54, 2005.

[32] P. C. van Oorschot. A. Somayaji, and G. Wurster. Hardware-assisted circumvention of self-hashing software tamper resistance. *IEEE Transactions on Dependable and Secure Computing*, 2(2):82-92, 2005.

[33] C. Wang. J. Hill, J. Knight, and J. Davidson. Software tamper resistance: Obstructing static analysis of programs. University of Virginia, Charlottesville, Va., 2000.

[34] G. Wurster, P C van Oorschot, and A. Somayaji. A generic attack on checksumming-based software tamper resistance. *Proceedings of the 2005 IEEE Symposium on Security and Privacy*, pages 127-138, 2005.

Unless clearly specified to the contrary, there Is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including ail modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or dement can he excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

The invention claimed is:

1. A computer method of increasing the tamper-resistance and/or obscurity of computer software code, said method comprising:
    one or more first preparation transformations;
    preparing, by a computer processor, designated computer software code for execution in a designated execution environment by applying the one or more first preparation transformations, wherein said preparation makes it difficult to execute the designated computer software code independently from the designated execution environment, the designated software code being inextricably tied to the designated execution environment;
    one or more second preparation transformations;
    preparing, by the computer processor, the designated execution environment by applying the one or more second preparation transformations, wherein the one or more second preparation transformations allow only the designated computer software code to execute within the designated execution environment;
    one or more execution transformations; and
    applying, by the computer processor, the one or more execution transformations during execution of the designated computer software code, wherein the one or more execution transformations are applied to the designated computer software code and to the designated execution environment,
    wherein said designated execution environment comprises at least one of: software dynamic translation (SDT), virtual machine (VM), Java VM, Strata VM, program simulators, program emulators, and virtualization systems.

2. The method of claim 1, where the one or more first preparation transformations comprise at least one of:
    encrypting the designated computer software code, wherein the encryption uses a plurality of hidden keys that are hidden within the designated execution environment and/or the designated computer software code;
    adding additional codes and/or data to the computer software to verify the integrity of the designated execution environment;
    providing additional codes and/or data to the computer software to verify the integrity of the prepared software code; and
    altering the designated computer software code such that proper execution is difficult without undoing the alterations.

3. The method of claim 1, wherein the one or more first preparation transformations comprise altering the designated computer software code such that proper execution is difficult without undoing the alterations, and the altering comprises at least one of:
    altering constant operands, program control flow, program data layout, data initialization information, instruction encoding, file format, or any combination thereof.

4. The method of claim 1, wherein the one or more execution transformations comprise at least one of:
    changing the layout of the designated computer software code data;
    conditions generated during execution and used by the designated execution environment, wherein the conditions are difficult to programmatically decipher;
    relocating operational locations to increase the difficulty of determining operation locations;
    inserting additional software code and/or data;
    rearranging, eliminating, or adding execution flow;
    creating software code that has operations that are difficult to determine;
    inserting operations that cannot be feasibly executed, but appear as though execution is possible;
    inserting incorrect codes that are intentionally similar to other correct software codes;
    randomizing operation order; and
    insert operations to verify the integrity of software code and/or software data.

5. The method of claim 4, wherein the one or more execution transformations further comprise at least one of:
    control flow flattening,
    guards,
    disassembly resistance,
    self-check summing codes,
    dynamic disassembly resistance,
    control flow obfuscations,
    ABI transforms,
    API transforms,
    sequence transforms,
    calling convention transforms or data transform, or
    any combination thereof.

6. The method of claim 5, further comprising applying the one or more execution transformations continuously throughout the execution of the designated computer software code.

7. The method of claim 4, wherein the one or more execution transformations undoes the one or more first preparation transformations on the prepared designated software code.

8. A system that increasing the tamper-resistance and/or obscurity of computer software code, comprising:
    a processor in communication with one or more memory devices;
    one or more first preparation transformations;
    preparation means for preparing a designated computer software code for execution in a designated execution environment by applying the one or more first preparation transformations, wherein said preparation makes it difficult to execute the designated computer software code independently from the designated execution environment, the designated software code being inextricably tied to the designated execution environment;
one or more second preparation transformations;
preparation means for preparing the designated execution environment by applying the one or more second preparation transformations, wherein the one or more second preparation transformations allow only the designated computer software code to execute within the designated execution environment;
one or more execution transformations; and
an execution transformer that applies, the one or more execution transformations during execution of the designated computer software code, wherein the one or more execution transformations are applied to the designated computer software code and to the designated execution environment,
wherein said designated execution environment comprises at least one of: software dynamic translation (SDT), virtual machine (VM), Java VM, Strata VM, program simulators, program emulators, and virtualization systems.

9. The system of claim 8, where the one or more first preparation transformations comprise at least one of:
encrypting the designated computer software code, wherein the encryption uses a plurality of hidden keys that are hidden within the designated execution environment and/or the designated computer software code;
adding additional codes and/or data to the computer software to verify the integrity of the designated execution environment;
providing additional codes and/or data to the computer software to verify the integrity of the prepared software code; and
altering the designated computer software code such that proper execution is difficult without undoing the alterations.

10. The system of claim 9, wherein the one or more first preparation transformations comprise altering the designated computer software code such that proper execution is difficult without undoing the alterations, and the altering comprises at least one of:
altering constant operands, program control flow, program data layout, data initialization information, instruction encoding, file format, or any combination thereof.

11. The system of claim 8, wherein the one or more execution transformations comprises at least one of:
changing the layout of the designated computer software code data;
conditions generated during execution and used by the designated execution environment, wherein the conditions are difficult to programmatically decipher;
relocating operational locations to increase the difficulty of determining operation locations;
inserting additional software code and/or data; rearranging, eliminating, or adding execution flow;
creating software code that has operations that are difficult to determine;
inserting operations that cannot be feasibly executed, but appear as though execution is possible;
inserting incorrect codes that are intentionally similar to other correct software codes; randomizing operation order; and
insert operations to verify the integrity of software code and/or software data.

12. The method of claim 11, wherein the one or more execution transformations further comprise at least one of:
control flow flattening,
guards,
disassembly resistance,
self-check summing codes,
dynamic disassembly resistance,
control flow obfuscations,
ABI transforms,
API transforms,
sequence transforms,
calling convention transforms or data transform, or
any combination thereof.

13. The system of claim 12, further comprising applying the one or more execution transformations continuously throughout the execution of the designated computer software code.

14. The system of claim 11, wherein the one or more execution transformations undoes the one or more first preparation transformations on the prepared designated software code.

15. A computer program product embodied on a non-transitory computer readable medium that when executed by a processor increases the tamper-resistance and/or obscurity of computer software code, said computer program product comprising:
one or more first preparation transformations;
preparing a designated computer software code for execution in a designated execution environment by applying the one or more first preparation transformations, wherein said preparation makes it difficult to execute the designated computer software code independently from the designated execution environment, the designated software code being inextricably tied to the designated execution environment;
one or more second preparation transformations;
preparing the designated execution environment by applying the one or more second preparation transformations, wherein the one or more second preparation transformations allow only the designated computer software code to execute within the designated execution environment;
one or more execution transformations; and
applying the one or more execution transformations during execution of the designated computer software code, wherein the one or more execution transformations are applied to the designated computer software code and to the designated execution environment,
wherein said designated execution environment comprises at least one of: software dynamic translation (SDT), virtual machine (VM), Java VM, Strata VM, program simulators, program emulators, and virtualization systems.

16. The computer program product of claim 15, where the one or more first preparation transformations comprise at least one of:
encrypting the designated computer software code, wherein the encryption uses a plurality of hidden keys that are hidden within the designated execution environment and/or the designated computer software code;
adding additional codes and/or data to the computer software to verify the integrity of the designated execution environment;
providing additional codes and/or data to the computer software to verify the integrity of the prepared software code; and
altering the designated computer software code such that proper execution is difficult without undoing the alterations.

17. The computer program product of claim 16, wherein the one or more first preparation transformations comprise altering the designated computer software code such that proper execution is difficult without undoing the alterations, and the altering comprises at least one of:
- altering constant operands, program control flow, program data layout, data initialization information, instruction encoding, file format, or any combination thereof.

18. The computer program product of claim 15, wherein the one or more execution transformations comprises at least one of:
- changing the layout of the designated computer software code data;
- conditions generated during execution and used by the designated execution environment, wherein the conditions are difficult to programmatically decipher;
- relocating operational locations to increase the difficulty of determining operation locations;
- inserting additional software code and/or data;
- rearranging, eliminating, or adding execution flow;
- creating software code that has operations that are difficult to determine;
- inserting operations that cannot be feasibly executed, but appear as though execution is possible;
- inserting incorrect codes that are intentionally similar to other correct software codes; randomizing operation order; and
- insert operations to verify the integrity of software code and/or software data.

19. The computer program product of claim 18, wherein the one or more execution transformations further comprise at least one of:
- control flow flattening,
- guards,
- disassembly resistance,
- self-check summing codes,
- dynamic disassembly resistance,
- control flow obfuscations,
- ABI transforms,
- API transforms,
- sequence transforms,
- calling convention transforms or data transform, or
- any combination thereof.

20. The computer program product of claim 18, further comprising applying the one or more execution transformations continuously throughout the execution of the designated computer software code.

* * * * *